(12) United States Patent
Kobayashi et al.

(10) Patent No.: US 6,554,497 B2
(45) Date of Patent: Apr. 29, 2003

(54) COMPACT CAMERA

(75) Inventors: Kiyotaka Kobayashi, Saitama (JP); Yoji Naka, Saitama (JP); Yutaka Yoshida, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/891,261

(22) Filed: Jun. 27, 2001

(65) Prior Publication Data

US 2001/0051045 A1 Dec. 13, 2001

Related U.S. Application Data

(62) Division of application No. 09/238,475, filed on Jan. 28, 1999, now Pat. No. 6,278,846.

(30) Foreign Application Priority Data

| Jan. 28, 1998 | (JP) | ............................................. 10-15986 |
| Feb. 12, 1998 | (JP) | ............................................. 10-30166 |
| Feb. 12, 1998 | (JP) | ............................................. 10-30167 |
| Feb. 12, 1998 | (JP) | ............................................. 10-30241 |
| Feb. 12, 1998 | (JP) | ............................................. 10-30242 |

(51) Int. Cl.⁷ ............................................. G03B 17/04
(52) U.S. Cl. ...................................... 396/348; 396/543
(58) Field of Search ............................... 396/348, 349, 396/176, 177, 178, 543

(56) References Cited

U.S. PATENT DOCUMENTS

| 3,204,542 A | | 9/1965 | Strasser et al. |
| 4,493,542 A | | 1/1985 | Ohmura et al. |
| 4,557,574 A | * | 12/1985 | Kohno et al. ................ 396/448 |
| 4,601,562 A | * | 7/1986 | Yoneyama et al. .......... 396/535 |
| 4,723,140 A | | 2/1988 | Whiteside et al. |
| 5,107,287 A | * | 4/1992 | Swayze ....................... 396/424 |
| 5,155,512 A | | 10/1992 | Leonard |
| 5,617,172 A | | 4/1997 | Ohta et al. |
| 5,640,641 A | * | 6/1997 | Balling ........................ 396/535 |
| 5,655,172 A | | 8/1997 | Omi et al. |
| 5,822,638 A | * | 10/1998 | Yoshida et al. .............. 396/448 |
| 5,930,534 A | | 7/1999 | Stephenson, III |
| 5,943,520 A | | 8/1999 | Komatsuzaki et al. |

FOREIGN PATENT DOCUMENTS

| EP | 563658 | 10/1993 |
| GB | 2136978 | 9/1984 |
| JP | 6060731 | 4/1985 |
| JP | 7295048 | 11/1995 |

* cited by examiner

Primary Examiner—David M. Gray
(74) Attorney, Agent, or Firm—Young & Thompson

(57) ABSTRACT

A compact camera has a camera case that covers up more than half of a camera body in a resting position where the camera case covers a taking lens, a flash projector, a battery chamber and a cartridge chamber. By sliding the camera case to a working position uncovering the taking lens and the flash projector, the flash projector springs up to a flashing position, and a main switch is turned on. Then, a lens barrel is protruded out of the camera body. Locking mechanisms are provided to stop the camera case at the working position. The camera case is allowed to move from the working position to the resting position by stowing the flash projector into the camera body. The camera case is allowed to move from the working position in an uncoving direction by operating a knob that is mounted in a room provided inside the battery chamber. The battery chamber is located behind the flash projector in the stowed position, and a battery chamber lid and the flash projecotr are mounted rotatable about the same axis. A door opening mechanism is provided for opening and closing a door member of a photo film cartridge loaded in the cartridge chamber in cooperation with sliding movement of the camera case. The door opening mechanism is interconnected with a ratchet lever such that the ratchet lever stops the camera case at a safety lock position where it is impossible to open the cartridge chamber, so long as the door member is open.

36 Claims, 36 Drawing Sheets

COMPACT CAMERA

This application is a division of application Ser. No. 09/238,475, filed on Jan. 28, 1999, now U.S. Pat. No. 6,278,846, the entire contents of which are hereby incorporated by reference.

BACKGROUND OF THE INVENTION

1. Field of the Invention

The present invention relates to a compact camera, and more particularly to a compact camera having a case which is slidable on a camera body and protects a taking lens and other elements while the camera is not used.

2. Description of the Related Art

A new type photo film cartridge, called IX240-type, has been developed and marketed. The IX240-type photo film cartridge can contain the entire length of a photo filmstrip in its shell and thereafter advance the filmstrip out of the shell by rotating its spool in an unwinding direction. The cartridge shell of the IX240-type also has a door member at its film port, to close the interior of the cartridge shell light-tightly. Correspondingly, cameras for use with the IX240-type photo film cartridge are provided with devices for opening the door member and rotating the spool of the cartridge in the unwinding direction after the photo film cartridge is put in a cartridge chamber. Thereby, the photo filmstrip is automatically loaded to make the camera ready for photography.

The photo filmstrip contained in the IX240-type cartridge has a smaller frame area and uses a thinner film base compared to a conventional 135-type photo filmstrip. Accordingly, the IX240-type photo film cartridge is smaller than a 135-type photo film cartridge.

Miniaturization of cameras is one of requirements for improving portability and handiness of the cameras. Even among those cameras using the 135-type photo film cartridge, some are so small as a cigarette pack. Therefore, cameras for use with the IX240-type photo film cartridge can be made smaller than a cigarette pack.

Although portability is improved with a size reduction of the camera, very small cameras are not easy to hold properly for photography. Photographer can sometimes unconsciously rest a finger on a taking lens or a flash window. As a measure to solve this problem, protrusions are provided around the taking lens and the flash unit so as the photographer can keep the finger from the taking lens and the flash window. However, those protrusions around the taking lens and the flash window are bad for the appearance.

A camera having a cap-like slide case is disclosed in Japanese Utility Model Laid-Open Application No. 60-60731. The slide case is slidable on a camera body having photographic mechanisms incorporated thereinto, and cover a taking lens, a flash window and a shutter button. Thus, the taking lens and the flash window are protected while the camera is not used. When the slide case is slid to a position uncovering the taking lens and the flash window, the slide case serves as a grip to hold the camera for photography. Because the slide case provides a sufficient gripping space, the taking lens and the flash window are prevented from being blocked by the finger during photography. However, the slide case of this prior art is provided with an opening for exposing the flash window at a center thereof, so dust or the like can be put in between the camera body and the slide case.

U.S. patent application Ser. No. 08/941,571, filed on Sep. 30, 1997, discloses a compact camera having a cap-like slide case. The camera body of this prior art has a plane box shape, whereas its slide case has a shape of square tube, and tightly covers up more than half of the camera body in the closed position. Also, a flash projector and a battery chamber are located in a middle area of the camera body above a taking lens, so the flash projector and the taking lens are simultaneously exposed when the slide case is slid to a working position uncovering the camera body by a certain amount. Therefore, there is no need for providing a specific opening through the slide case for exposing a flash window of the flash projector when the taking lens is uncovered. Thus, this compact camera is efficiently protected against dust. Also, a shutter button is mounted on the slide case, whereas a shutter switch is mounted in the camera body. The shutter button is placed right above the shutter switch when the slide case is set at the working position, so the shutter switch is actuated by depressing the shutter button only while the slide case is in the working position.

Since the red-eye phenomenon is more likely to occur where a flash window is located right above the taking lens, the flash projector of this prior art is designed to pop up away from the taking lens when the flash projector is uncovered from the slide case. In addition, when the slide case reaches the working position, a power switch is turned on, and then a lens barrel of the taking lens is protruded forward from the camera body. When the power switch is turned off, the lens barrel is stowed into the camera body.

Locating the battery chamber above the taking lens contributes to reducing the height of the camera body. However, to provide both the flash projector and the battery chamber in a small room above taking lens involves so many restrictions that it the flash projector and the battery chamber of the prior art are not sufficiently handy, but rather affect adversely on the layout of other elements.

According to this prior art, if the battery runs out while the slide case is in the working position, the lens barrel is left in the protruded position until a new battery is loaded. The slide case is left opened and cannot protect the taking lens then.

Since the shutter button is to be placed right above the shutter switch and the power switch is to be turned on when the slide case comes to the working position, it is necessary to click-stop the slide case precisely at the working position. In addition, because the flash projector and the lens barrel protrude out of the camera body when the slide case is opened up to the working position, if the slide case is not securely held at the working position, the slide case may loosely slide and crash into the flash projector or the lens barrel. It is possible to electrically check if the slide case reaches the working position, to electrically turn on the power switch and activate a device for holding the slide case at the working position. However, it is preferable in view of cost and mounting space to have the slide case held at the working position without any electricity. In order to improve the workability of the camera, it is also desirable to provide locking mechanisms for holding the slide case at appropriate positions on the camera body.

On the other hand, since the IX240-type photo film cartridge has the door member at its film port, if the photo film cartridge with the door member open is exposed to ambient light, the photo filmstrip contained in the cartridge shell is fogged. Therefore, the IX240-type camera for use with the IX240-type photo film cartridge conventionally has a latching mechanism incorporated into a lid of the cartridge chamber, such that the latching mechanism stops the lid from opening so long as the door member is open. However, the latching mechanism has been an obstacle to the miniaturization of the IX240-type camera, and also a factor that increase the cost.

SUMMARY OF THE INVENTION

In view of the foregoing, an object of the present invention is to provide a compact camera which is very compact and handy especially when loading or unloading a battery.

A second object of the present invention is to provide a compact camera which makes it possible to protect a taking lens even while a battery is unloaded.

A third object of the present invention is to provide a compact camera having a slidable camera case and simple locking mechanisms for automatically stopping the slidable case at an appropriate working position while the camera case is sliding on a camera body.

A fourth object of the present invention is to provide an IX240-type compact camera for use with the IX240-type photo film cartridge having the door member, wherein the compact camera has a camera case slidable on a camera body between a first position preventing a lid of a cartridge chamber from opening and a second position allowing the cartridge chamber lid to open, and wherein the door member is opened when the camera case slides from the second position to the first position, and the camera case is prevented from moving from the first position to the second position so long as the door member is open.

A further object of the present invention is to provide a compact camera which is easy and convenient to operate.

To achieve the first object, a compact camera according to the present invention is comprised of a camera case attached to a camera body and slidable on the camera body between a resting position covering a taking lens, and a working position uncovering the taking lens;

a battery chamber provided in the camera body for holding a battery as a power source of the camera; a battery chamber lid rotatable about a rotational axis between an open position opening the battery chamber to the outside of the camera body and a closed position closing the battery chamber; and a flash projector rotatable about the same rotational axis as the battery chamber lid is rotatable about, between a flashing position where a front face of the flash projector is directed toward a photographic subject, and a stowed position where the flash projector is stowed in a recess of the camera body, the flash projector being in the stowed position and covered with the camera case at the resting position, and uncovered at the working position.

Because the flash projector and the battery chamber lid are rotatable about the same axis, the space efficiency of the camera is improved and the number of parts is reduced.

To achieve the second object, according to a preferred embodiment of the present invention, a power switch is turned on to start supplying power from the battery when said flash projector moves in said flashing position, and is turned off when said flash projector is stowed, and the flash projector is pushed into the stowed position by the battery chamber lid when the battery chamber lid is opened. Also, the taking lens is retracted into the camera body when the power switch is turned off.

Since the flash projector is pushed in the stowed position and thus the power switch is turned off by opening the battery chamber lid, and thereby the taking lens is retracted into the camera body, it is possible to cover up the taking lens with the camera case after the battery is unloaded.

To achieve the third object, a compact camera according to the present invention is comprised of a camera body having a taking lens and a cartridge chamber for holding a photo film cartridge; a cartridge chamber lid for opening and closing the cartridge chamber to outside of the camera body; a flash projector mounted on the camera body to be movable between a stowed position where the flash projector is stowed in a recess formed above the taking lens, and a flashing position where a front face of the flash projector is directed toward a photographic subject, the flash projector being urged to move to the flashing position; a camera case attached to a camera body and slidable on the camera body between a resting position covering the taking lens, the flash projector and the lid, a working position uncovering the taking lens and the flash projector but covering the lid, and a cartridge changing position uncovering the cartridge chamber lid to enable loading or unloading the photo film cartridge; a first locking mechanism for locking the camera case to stop at the working position while the camera case is moving from the resting position to the cartridge changing position;

a first unlocking mechanism for unlocking the camera case from the first locking mechanism; a second locking mechanism for locking the camera case to stop at the working position while the camera case is moving from the cartridge changing position to the resting position; and a second unlocking mechanism for unlocking the camera case from the second locking mechanism.

To achieve the fourth object, a compact camera according to the present invention is comprised of a camera body having a taking lens and a cartridge chamber for holding a photo film cartridge, the photo film cartridge having a door member to open and close a film exit of the photo film cartridge; a cartridge chamber lid for opening and closing the cartridge chamber to outside of the camera body; a camera case attached to the camera body and slidable on the camera body between a resting position covering the taking lens and the cartridge chamber lid, a working position uncovering the taking lens but at least partly covering the cartridge chamber lid, and a cartridge changing position uncovering the cartridge chamber lid to enable loading or unloading the photo film cartridge; a door operating mechanism mounted in the camera body and coupled to the door member, the door operating mechanism being urged in a closing direction to close the door member and actuated by the camera case to open the door member when the camera case is moved from the cartridge changing position to the working position; and a stopping mechanism for stopping the camera case from moving to the cartridge changing position in cooperation with the door operating mechanism if the door member is not closed while the camera case is moving from the working position to the cartridge changing position.

According to the present invention, a compact camera is provided with a camera case movable on a camera body at least between a resting position covering a taking lens and a working position uncovering the taking lens; a flash projector urged to move from a position stowed in the camera body to a flashing position protruding out of the camera body, the flash projector being confined in the stowed position by the camera case in the resting position, and allowed to move to the flashing position when the camera case moves in the working position; a main switch that is turned on to set the camera to a photo mode when the flash projector moves in the flashing position, and is turned off to set the camera to a sub mode when the flash project is moved in the stowed position; a shutter switch for effecting a photo-taking operation when operated in the photo mode; and an operation device manually operated to enter signals for setting up the camera to appropriate conditions, wherein different functions are assigned to the operation device in the sub mode from those assigned in the photo mode, and any operation on the shutter switch is ignored in the sub mode.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein:

FIG. 34 is a flow chart illustrating a process executed upon a main switch being turned on;

FIG. 36 is a flow chart illustrating a process executed upon a door opening detection switch being turned on;

DETAILED DESCRIPTION OF THE PREFERRED EMBODIMENT

Figure 1:
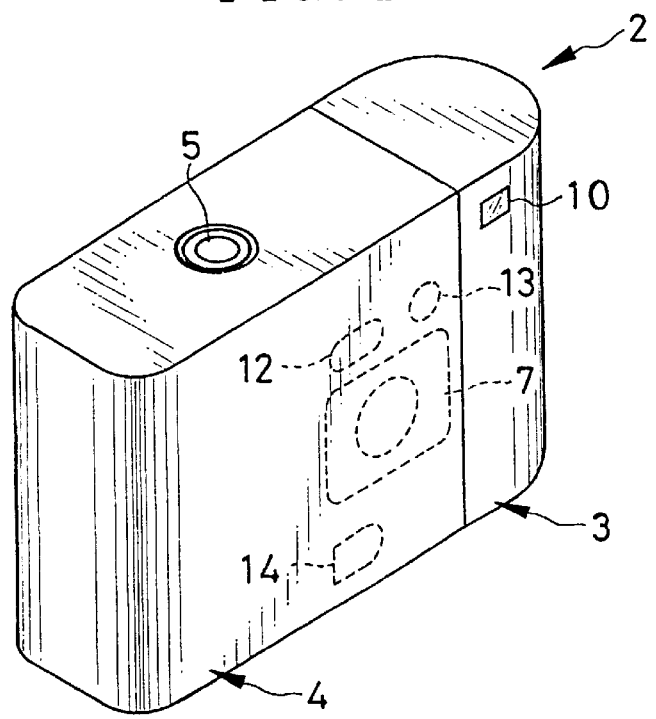
FIG. 1 is a front perspective view of a compact camera with a camera case in a resting position, according to a preferred embodiment of the invention.
Figure 2:
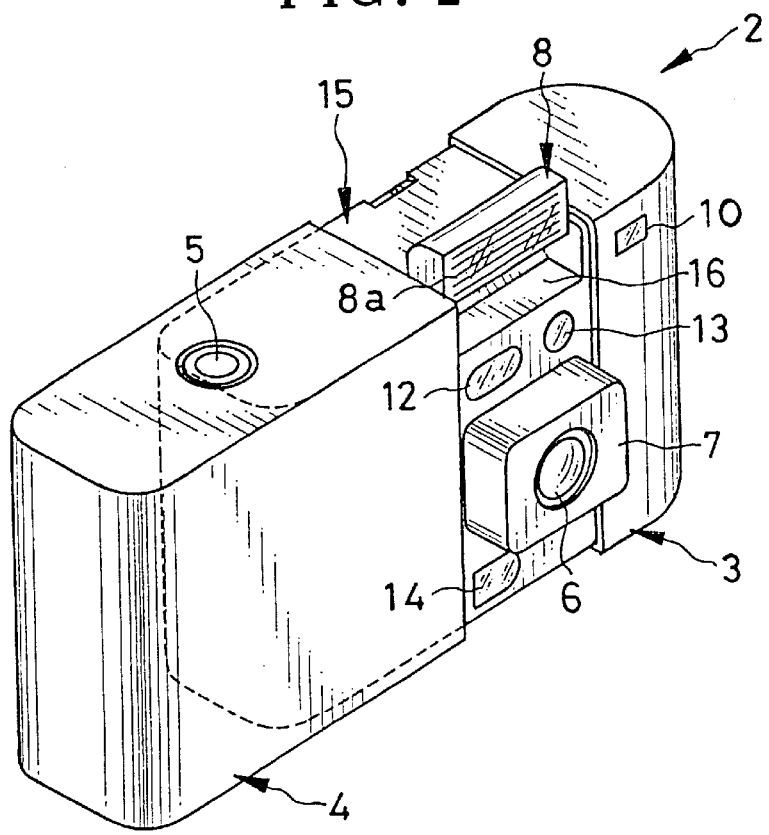
FIG. 2 is a front perspective view of the compact camera in a working position.

FIGS. 1 and 2 show a compact camera 2 according to an embodiment of the invention in its resting position and working position respectively. The camera 2 consists of a substantially box-shaped camera body 3, and a camera case 4 that is slidable to the left and right on the camera body 3. In the resting position as shown in FIG. 1, the camera case 4 covers up all sides of the camera body 3 except a right end portion in FIG. 1, shielding almost all photographic elements of the camera 2, including a taking lens 6, a lens barrel 7, and a flash projector 8 of a built-in flash device. A shutter button 5 is mounted on a top wall of the camera case 4, and a viewfinder objective window 10 is located in the right end portion. In this embodiment, the camera case 4 covers about three-fourth of the camera body 3 in the resting position. The camera case 4 and a housing of the camera body 3 are made of a light metal like titanium or aluminum, or a plastic material. All sides of the camera case 4 are plane and flat, so that the camera 2 in the resting position is very compact and handy to carry about.

When the camera case 4 is opened to the working position as shown in FIG. 2, the lens barrel 7, the flash projector 8, a photometric window 12 of an automatic exposure control (AE) device, and light emitting and light receiving windows 13 and 14 of an active range finding device of an automatic focusing (AF) device are exposed. Designated by 15 is a lid of a battery chamber that is located behind a recess 16. The flash projector 8 is rotatable between a flashing position directing its face window 8a to the front, as shown in FIG. 2, and a stowed position accommodated in the recess 16. The flash projector 8 is urged by a spring force toward the flashing position, so that the flash projector 8 moves up to the flashing position when released from the confinement by the camera case 4, as set forth in detail later. When the camera case 4 comes to the working position, a main switch and a flash charge switch are turned on. Then, the lens barrel 7 moves out from the camera body 3 and the flash device starts charging.

Figure 3:
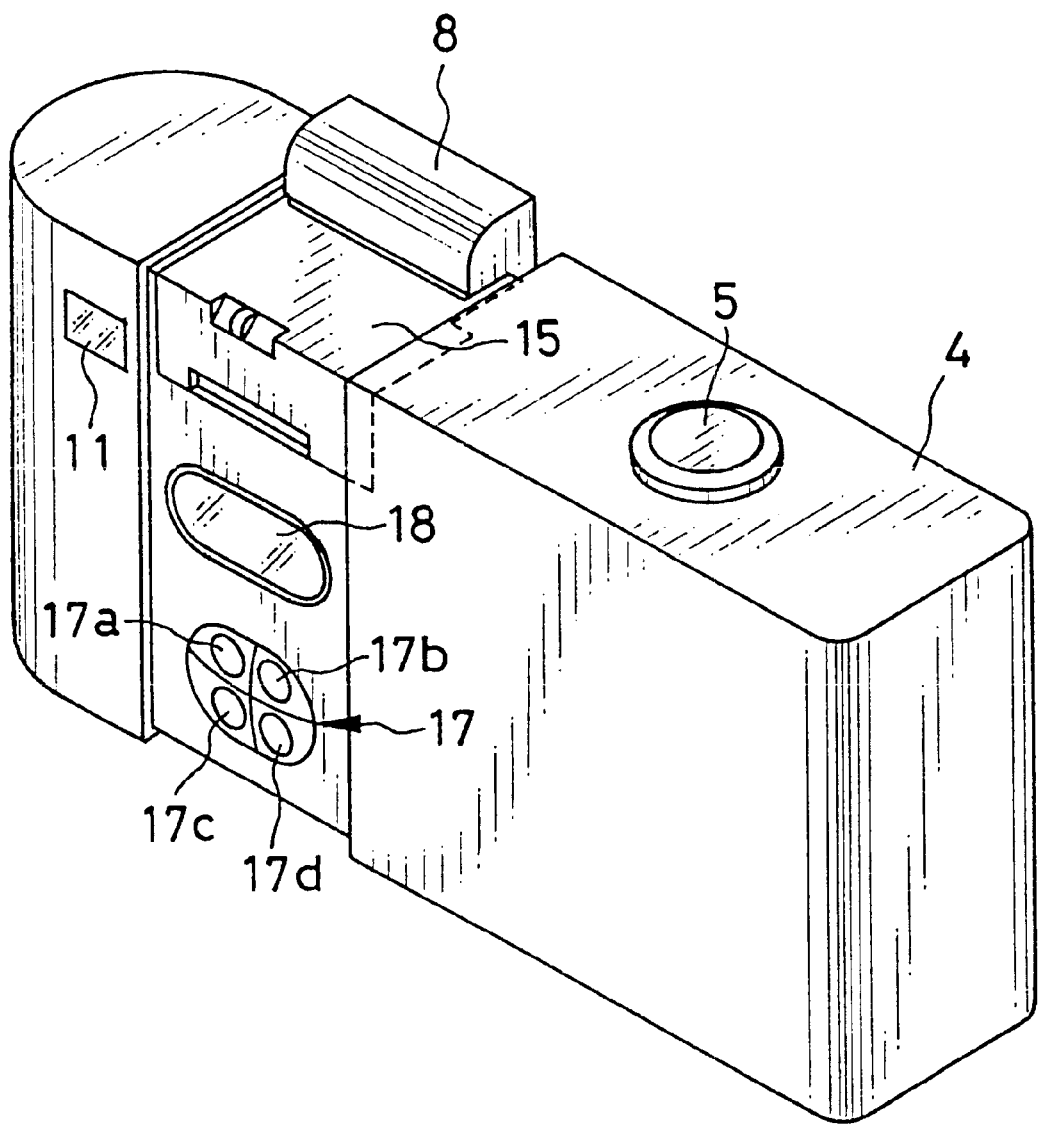
FIG. 3 is a rear perspective view of the compact camera in the working position.

As shown in FIG. 3, a finder eyepiece window 11, a control panel 17 and a console LCD (liquid crystal display) 18 are provided on the rear side of the camera 2. The control panel 17 and the console LCD 18 are disclosed when the camera case 4 is slid to the working position. The control panel 17 is operated to set up the camera 2 in various modes, and the console LCD 18 displays information on the set mode, the number of available frames, and other conditions of the camera 2, as set forth in detail later.

Figure 4:
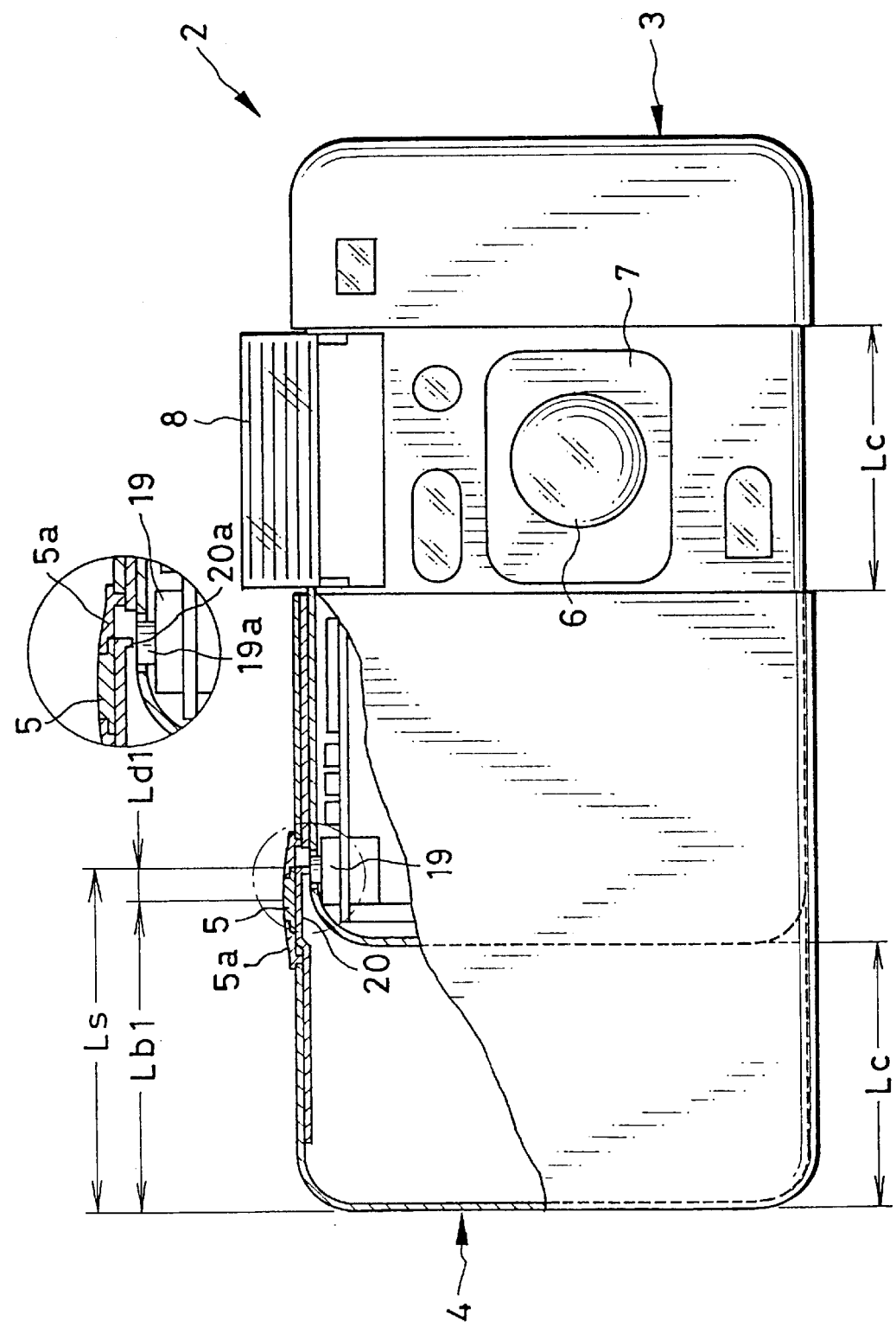
FIG. 4 is a front view, partly in cross section, of the compact camera in the working position.
Figure 5:
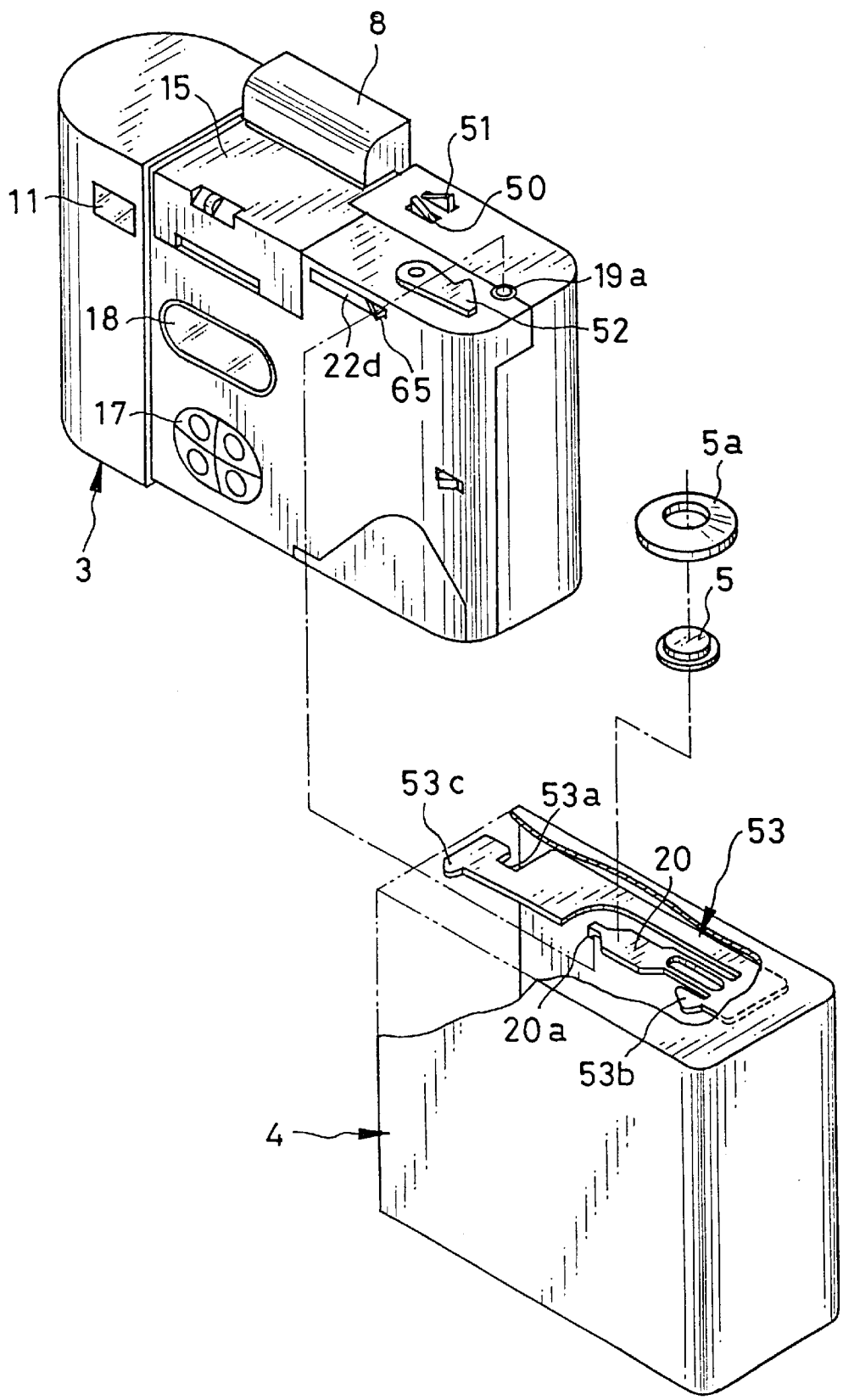
FIG. 5 is a rear perspective view of the compact camera with parts broken away and exploded.
Figure 6:
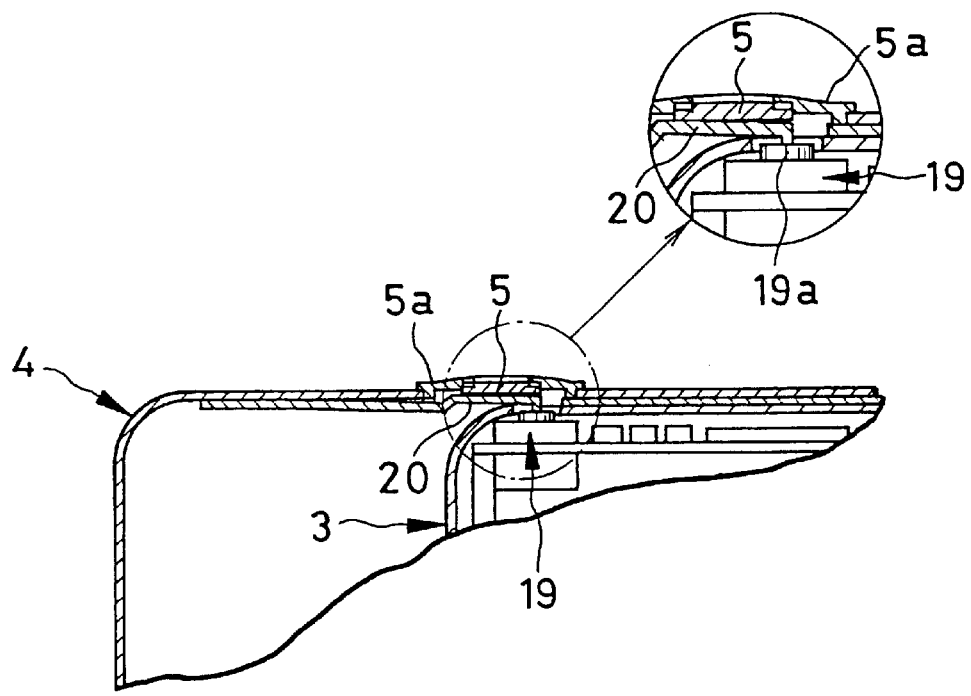
FIG. 6 is a fragmentary sectional view of the compact camera, illustrating a relationship between a shutter button and a shutter switch.

As shown in FIG. 4, the shutter button 5 is placed over a shutter switch 19 in the working position. The shutter switch 19 is a micro switch which is turned on when a button member 19a is pressed down. The button member 19a is exposed through a hole formed through a top wall portion of a camera housing 22 of the camera body 3. The shutter button 5 is round and is surrounded by a ring-like supporting member 5a, as shown in FIG. 5. The shutter button 5 is secured onto a resilient blade 20 whose base portion is secured to the inside of the top wall of the camera case 4. The resilient blade 20 has a projection 20a that is opposed to the button member 19a of the shutter switch 19 when the camera case 4 moves in the working position. Thus, the shutter button 5 can be resiliently pressed down to press the button member 19a, as is shown in FIG. 6. Where the camera case 4 is out of the working position, the projection 20a of the resilient blade 20 is not opposed to the button member 19a, so that the shutter switch 19 is not turned on even if the shutter button 19 is pressed.

Figure 39:
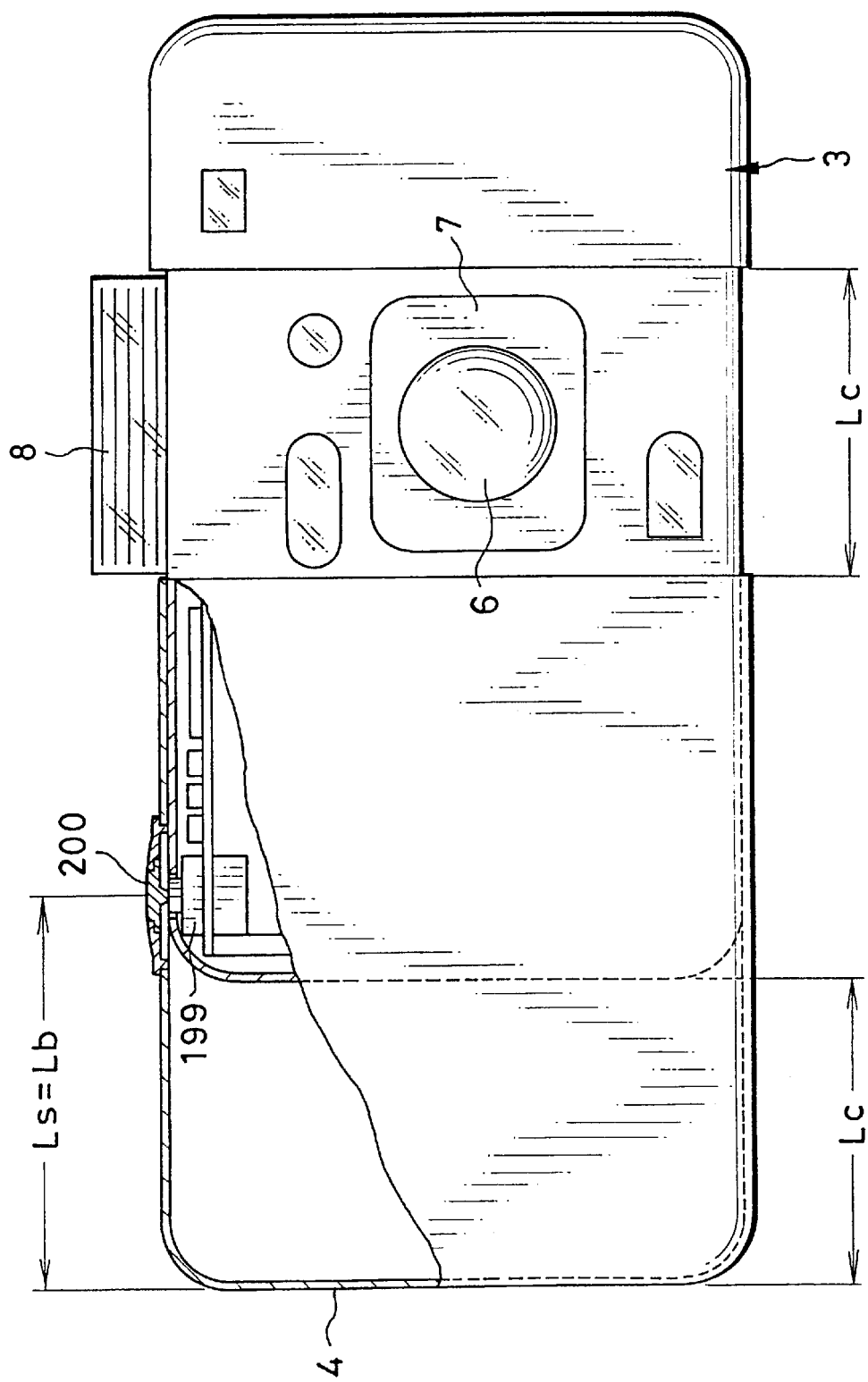
FIG. 39 is a front view of a prior art camera in its working position, with parts broken away.

In the working position, the camera case 4 provides a sufficiently large space for gripping the camera 2. This is effective to keep the photographer's finger out of an optical path of the taking lens 6. As shown in FIG. 4, the camera case 4 needs to slide by a length Lc from the resting position to the working position. Since the length Lc is determined by the horizontal lengths of the lens barrel 6 and the flash projector 8, the length Lc is relatively large. As a result, where a shutter button 200 is designed to be centered with a shutter switch 199 in the working position, as shown in FIG. 39, a distance Lb from a left end of a camera case 4 to the center of the shutter button 200 is equal to a distance Ls from the left end of the camera case 4 to the center of the shutter switch 199. In that case, the distance Lb can be too large for those photographers who have small hands.

On the contrary, according to the embodiment shown in FIG. 4, since the projection 20a is located in a peripheral portion of the shutter button 5 that is farthest from a left end of the camera case 4, a distance Lb1 from the left end to the center of the shutter button 5 is shorter than the distance Ls from the left end to the center of the button member 19a of the shutter switch 19 by a length Ld1 that is about the radius of the shutter button 5. Thus, the shutter button 5 is easier to handle even for those having a small hand.

Figure 7:
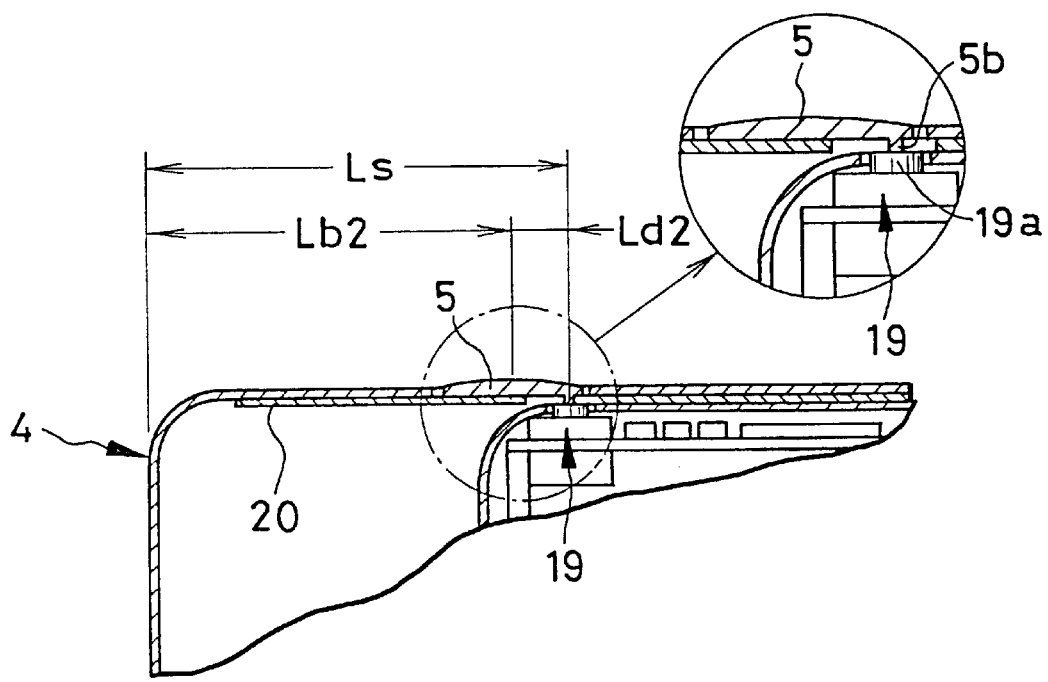
FIG. 7 is a fragmentary sectional view of a shutter button according to another embodiment of the invention.

Instead of providing the projection 20a on the resilient blade 20, it is possible to form a projection 5b integrally with the shutter button 5, as is shown in FIG. 7. Also in this embodiment a distance Lb2 from the left end of the camera case 4 to the center of the shutter button 5 is shortened by a distance Ld2 of the projection 5b from the center of the shutter button 5, compared to the distance Ls from the left end of the camera case 4 to the center of the button member 19a of the shutter switch 19.

Figure 8:
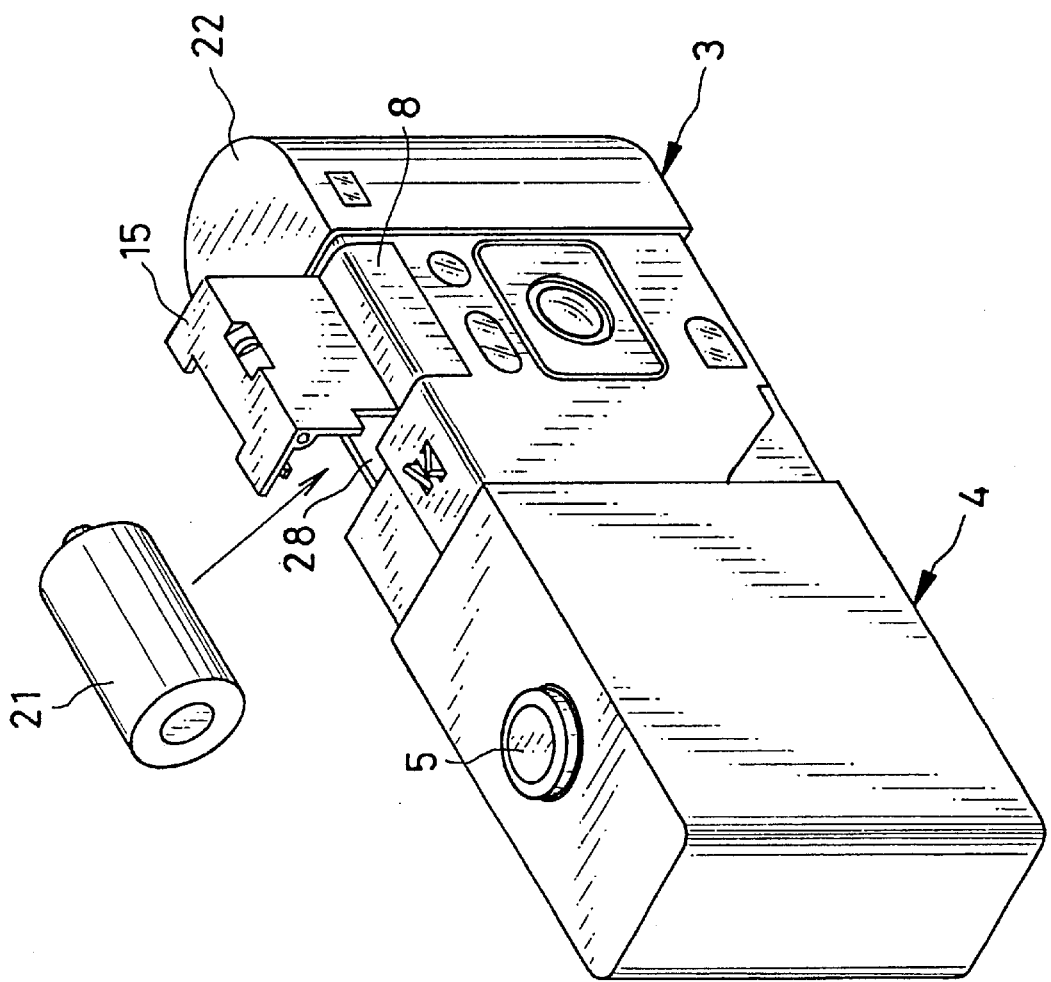
FIG. 8 is a front perspective view of the compact camera in a safety lock position, with its battery chamber lid open.

As shown by dashed lines in FIG. 3, the battery chamber lid 15 is partly covered with the camera case 4 and is not allowed to open in the working position. To open the battery chamber lid 15 for loading or exchanging a battery 21, the camera case 4 is moved further to the left from the working position to a safety lock position as shown in FIG. 8. In cooperation with the battery chamber lid 15 being opened, the flash projector 8 automatically rotates into the recess 16, according to a mechanism as set forth below with reference to FIGS. 9 to 13. When closing the camera case 4 to the resting position, the flash projector 8 is manually pushed into the stowed position as shown in FIG. 8.

Figure 9:
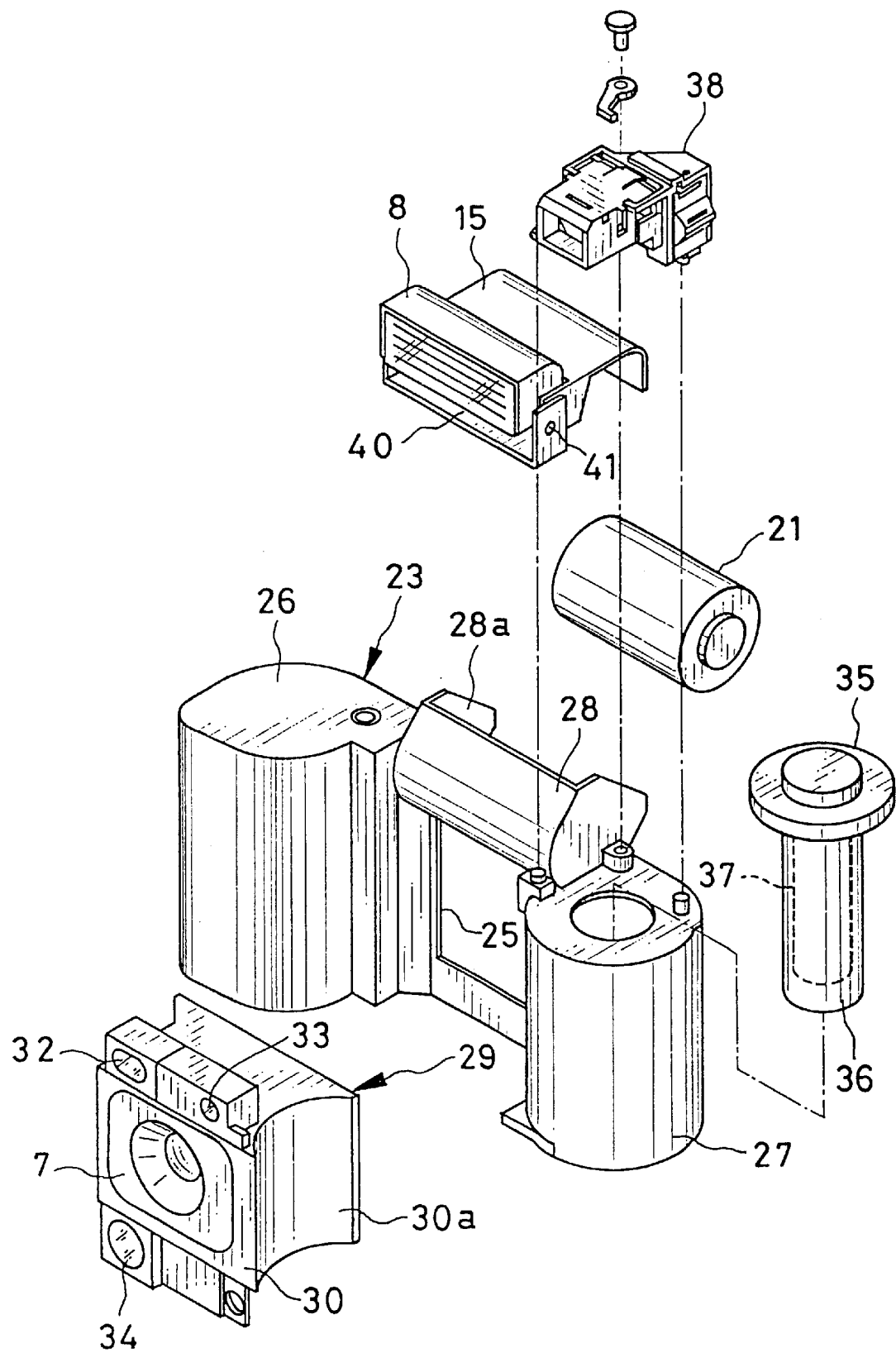
FIG. 9 is an exploded perspective view illustrating internal constructions of the compact camera.

FIG. 9 shows an internal construction of the camera body 3 inside the camera housing 22. A base frame 23 has an exposure aperture 25 defining an exposure range on a photo film, a cartridge chamber 26, a film take-up chamber 27 and the battery chamber 28 as an integral body. A lens barrel unit 29 is attached to the front of the exposure aperture 25. The lens barrel unit 29 consists of a fixed barrel 30 and the movable barrel 7. A side wall 30a of the fixed lens barrel 30 on the side of the film take-up chamber 27 is concave such that the side wall 30a constitutes a part of a cylindrical inner wall of the film take-up chamber 27.

The lens barrel unit 28 also has a photometric element 32 for measuring a subject brightness, a light emitting diode (LED) 33 and a light receiving element 34 of the active range finding device of the AF device. The photometric element 32 is placed behind the photometric window 12, whereas the LED 33 and the light receiving element 34 are placed behind the light emitting and light receiving windows 13 and 14 respectively. A take-up spool 36 is mounted in the film take-up chamber 27 through a motor holder 35, and a film winding motor 37 is mounted in the take-up spool 36. A finder unit 38 is mounted above the film take-up chamber 27.

Figure 10:
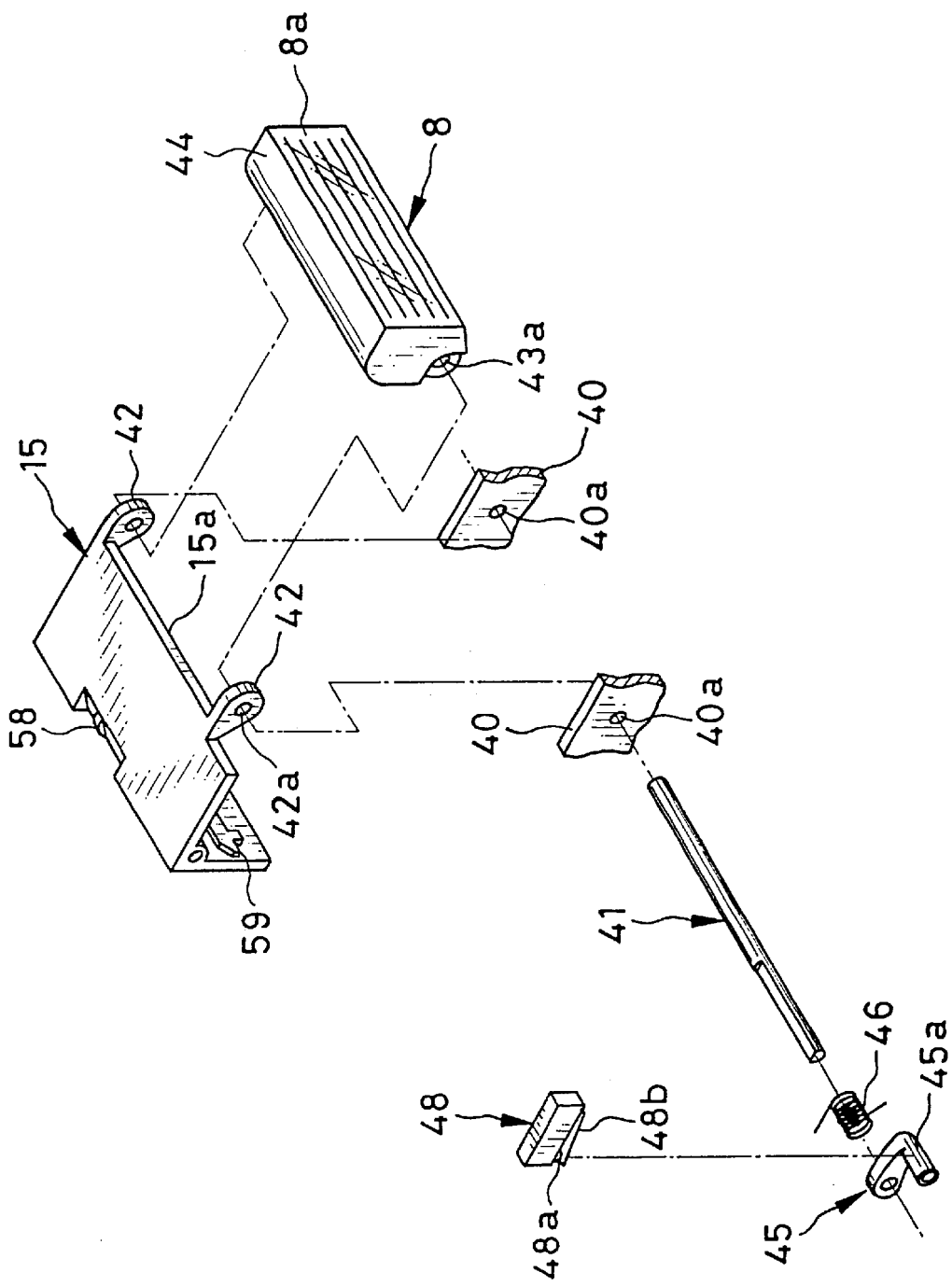
FIG. 10 is an exploded perspective view illustrating a flash projector and the battery chamber lid of the compact camera.

As shown in detail in FIG. 10, the flash projector 8 and the battery chamber lid 15 are held by a supporting frame 40 so as to pivot on a common rotary shaft 41. The supporting frame 40 is secured to the camera housing 22 of the camera body 3 in a position above the lens barrel unit 29, and thereby provide the recess 16 for accommodating the stowed flash projector 8. The battery chamber lid 15 has an L-shape to cover top and rear sides of the battery chamber 28.

Figure 11:
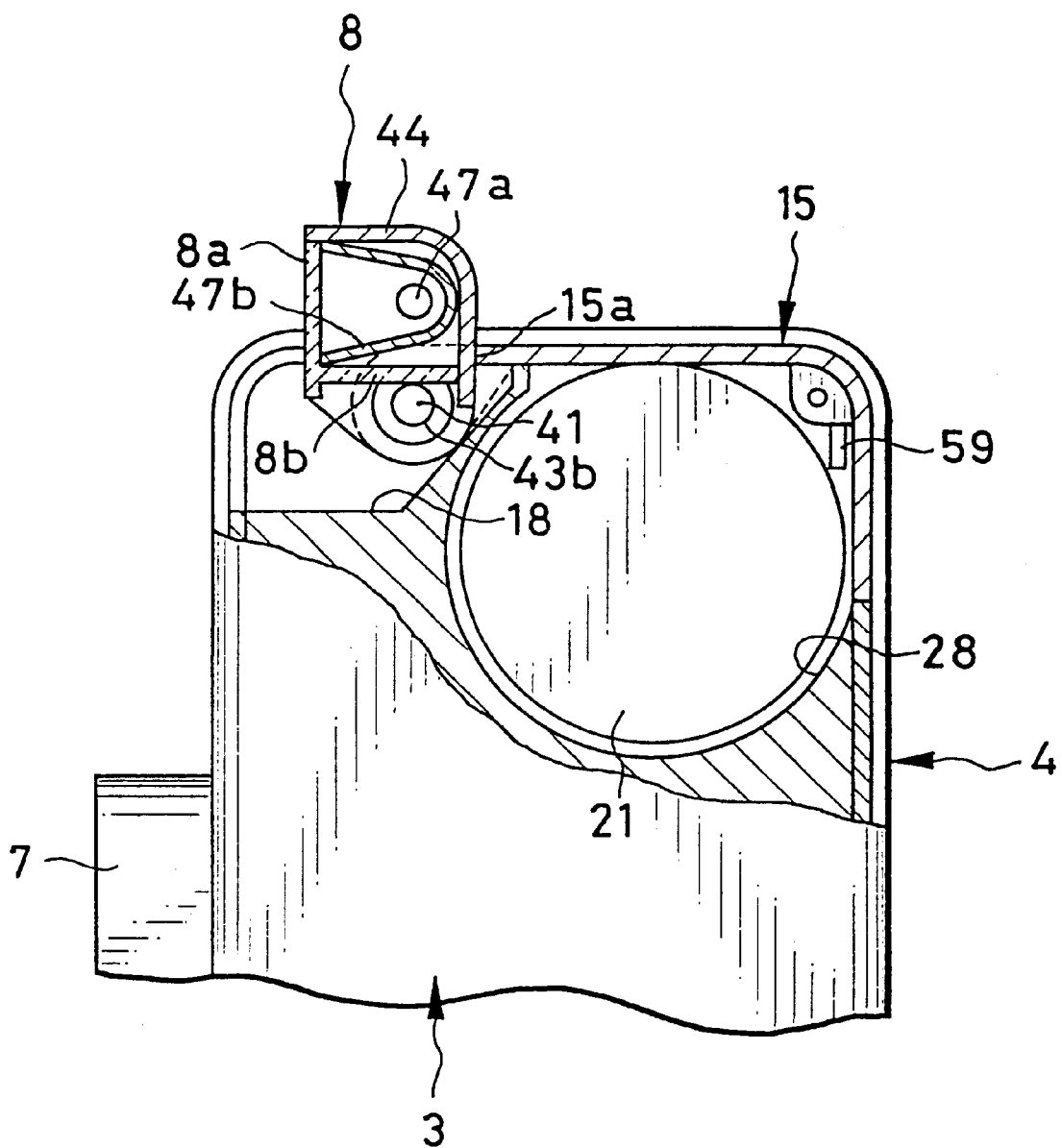
FIG. 11 is a side view in partial cross section of the flash projector in its flashing position and the battery chamber lid in its closed position.

The battery chamber lid 15 has a pair of pivoting arms 42, whereas the flash projector 8 has a pair of pivoting holes 43a and 43b through its housing 44, as shown in FIGS. 10 and 11. Pivoting holes 42a of the pivoting arms 42 are aligned with the pivoting holes 43a and 43b of the flash projector 8, and then the rotary shaft 41 is inserted into the holes 42a, 43a and 43b through pivoting holes 40a of the supporting frame 40. The rotary shaft 41 has a semi-cylindrical portion 41a in one end thereof. Corresponding to a D-shaped section of the semi-cylindrical portion 41a, one pivoting hole 38a of the flash projector 8 is formed to have a D-shape. Because of this configuration, the flash projector 8 rotates together with the rotary shaft 41, whereas the battery chamber lid 15 rotates relative to the rotary shaft 41.

A crank lever 45 is fitted on the semi-cylindrical portion 41a of the rotary shaft 41, and a coiled spring 46 is mounted near the crank lever 45 for urging the crank lever 45 to rotate in a counterclockwise direction in FIG. 10. That is, the coiled spring 46 urges the rotary shaft 41 to rotate in the counterclockwise direction, and thus urges the flash projector 8 to rotate toward the flashing position shown in FIG. 11. Therefore, the flash projector 8 automatically moves in the flashing position when the camera case 4 is slid away from the flash projector 8.

Figure 12:
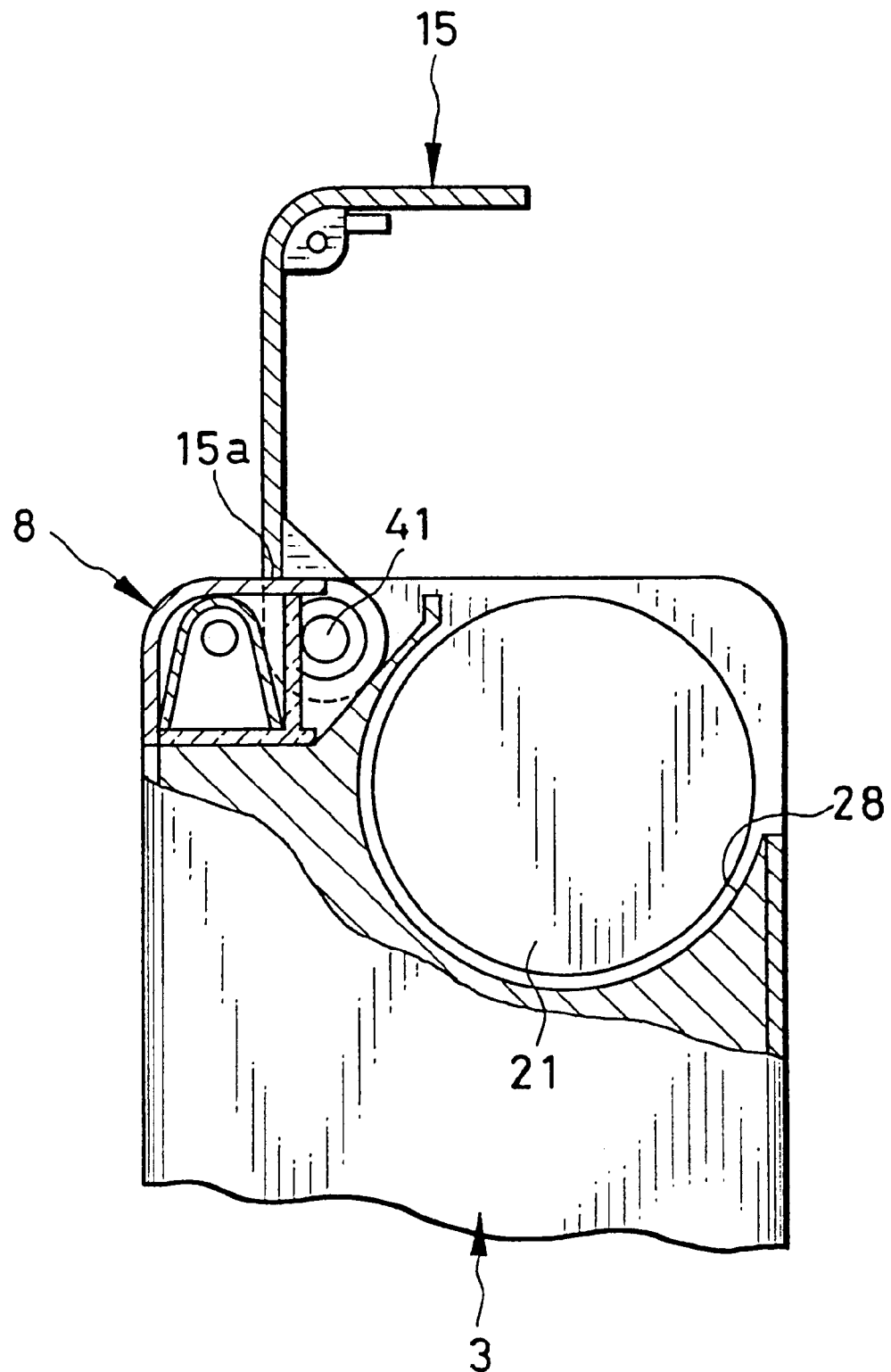
FIG. 12 is a view similar to that of FIG. 11 and illustrates the battery chamber lid in its opened position and the flash projector in its stowed position.
Figure 13:
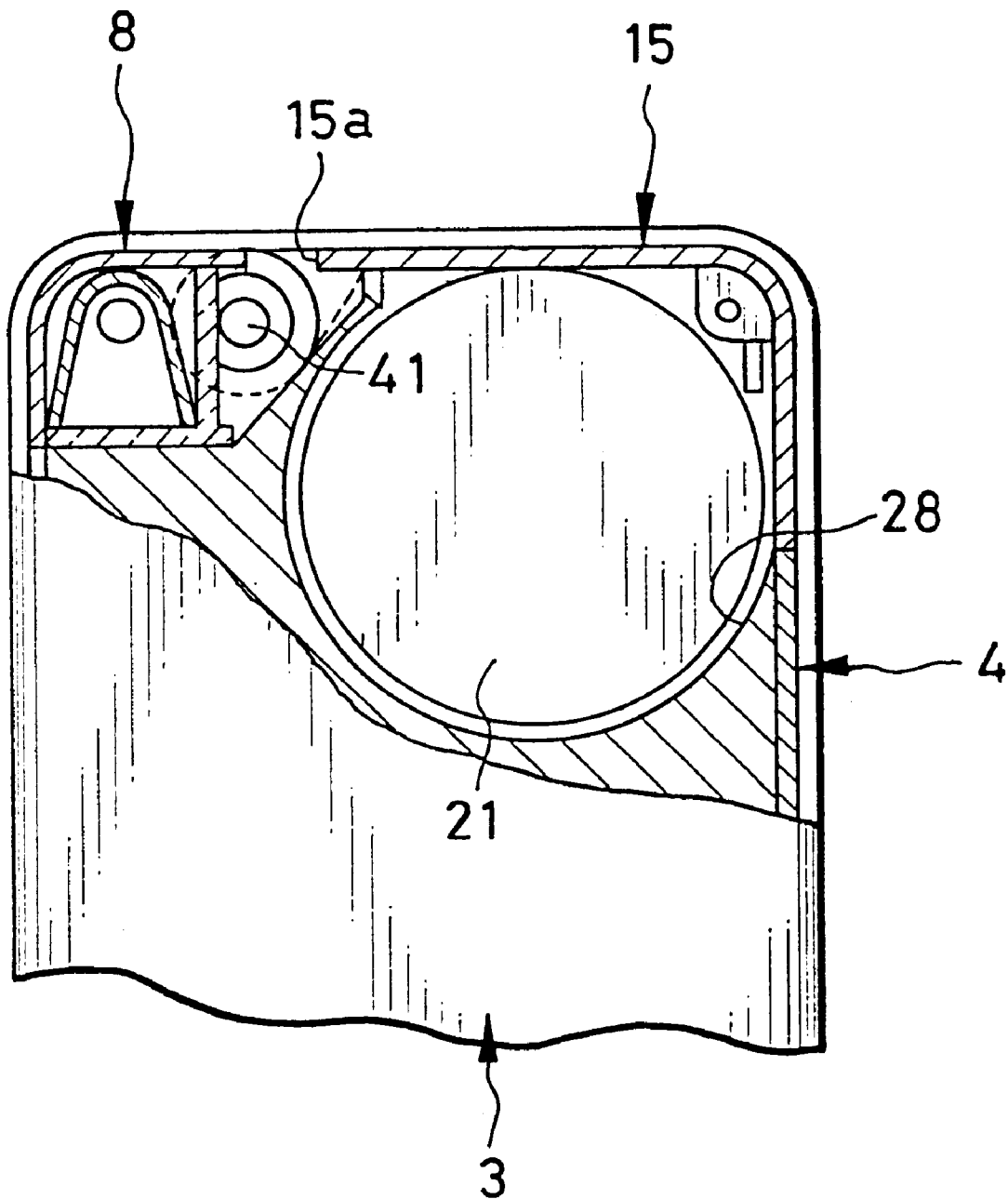
FIG. 13 is a view similar to that of FIG. 11 and illustrates the flash projector and the battery chamber lid covered with the camera case in the resting position of the compact camera.

A front edge 15a of the battery chamber lid 15 extends to the flash projector 8 such that the front edge 15a almost reaches the housing 44 when the flash projector 8 is in the flashing position. As the battery chamber lid 15 is opened, as shown in FIG. 12, the front edge 15a pushes the flash projector 8 to rotate to the stowed position against the force of the coiled spring 46. When closing the camera case 4 to the resting position, the flash projector 8 is manually pushed into the stowed position as shown in FIG. 13.

Inside the housing 44 of the flash projector 8, there are provided a flash discharge tube 47a and a light reflector 47b. The face window 8a of the flash projector 8 is covered with a transparent plastic plate having a surface contour for diffusing light from the flash discharge tube 47a. A bottom side 8b of the flash projector 8 in the flashing position is also covered with a transparent plate that is formed integrally with the transparent plastic plate of the face window 8a.

In proximity to the crank lever 45 is disposed the main switch 48 of the camera 2. The main switch 48 may be a micro switch consisting of a fixed switch contact 48a and a movable switch contact 48b. The movable switch contact 48b is opposed to an arm 45a of the crank lever 45. As the flash projector 8 rotates to the flashing position, the arm 45a pushes the movable switch contact 48b and brings it into contact with the fixed switch contact 48a, turning on the main switch 48. As the flash projector 8 rotates to the stowed position, the movable switch contact 48b removes off the fixed switch contact 48a, turning off the main switch 48.

When the main switch 48 is turned on, the movable lens barrel 7 moves out from the fixed lens barrel 30 and thus protrudes forward from the camera body 3. Accordingly, the lens barrel 7 automatically moves out in response to the rotation of the flash projector 8 to the flashing position when the camera case 4 is opened to the working position. When the main switch 48 is turned off, the lens barrel 7 is retracted into the camera body 3. Since the flash projector 8 is pushed into the stowed position by opening the battery chamber lid 15, the main switch 48 is turned off whenever the battery 21 is taken out of the battery chamber 28. Therefore, the camera 2 can be set to the resting position for shielding the taking lens 6 with the camera case 4 even while the battery 21 is loaded in the battery chamber 28.

In the resting position or in the working position, the battery chamber lid 15 is held in its closed position by being entirely or partly covered by the camera case 4 respectively. Also in the safety lock position, as shown in FIG. 8, the battery chamber lid 15 is also held in its closed position because the flash projector 8 is urged by the coiled spring 46 toward the front edge 15a of the battery chamber lid 15. Therefore, it is unnecessary to provide a latching device for latching the battery chamber lid 15 in its closed position. This makes it easy to make the camera 2 more compact and simple. Of course, it is possible to provide a latching device for latching the battery chamber lid 15 in its closed position.

As shown in FIG. 5, first and second locking claws 50 and 51 and a ratchet lever 52 are provided on the top side of the camera body 3. The first and second locking claws 50 and 51 are provided for locking the camera case 4 at the working position. The ratchet lever 52 is provided for holding the camera case 4 at the resting position and at the safety lock position. The locking claws 50 and 51 and the ratchet lever 52 cooperate with a locking plate 53 that is secured to the inside of the top wall of the camera case 4. The locking plate 53 has a notch 53a and two protuberances 53b and 53c, and is formed integrally with the resilient blade 20.

Since the engaging portions necessary for locking the camera case 4 at appropriate positions on the camera body 3 are formed integrally with each other and with the resilient blade 20 that supports the shutter button 5, space efficiency of the compact camera 2 is improved, and the number of parts is reduced. Instead of cementing the locking plate 53 to the inside of the camera case 4, it is possible to form a stepped portion integrally on the inside of the camera case 4. In that case, the resilient blade 20 should be provided as a separate member.

Figure 14:
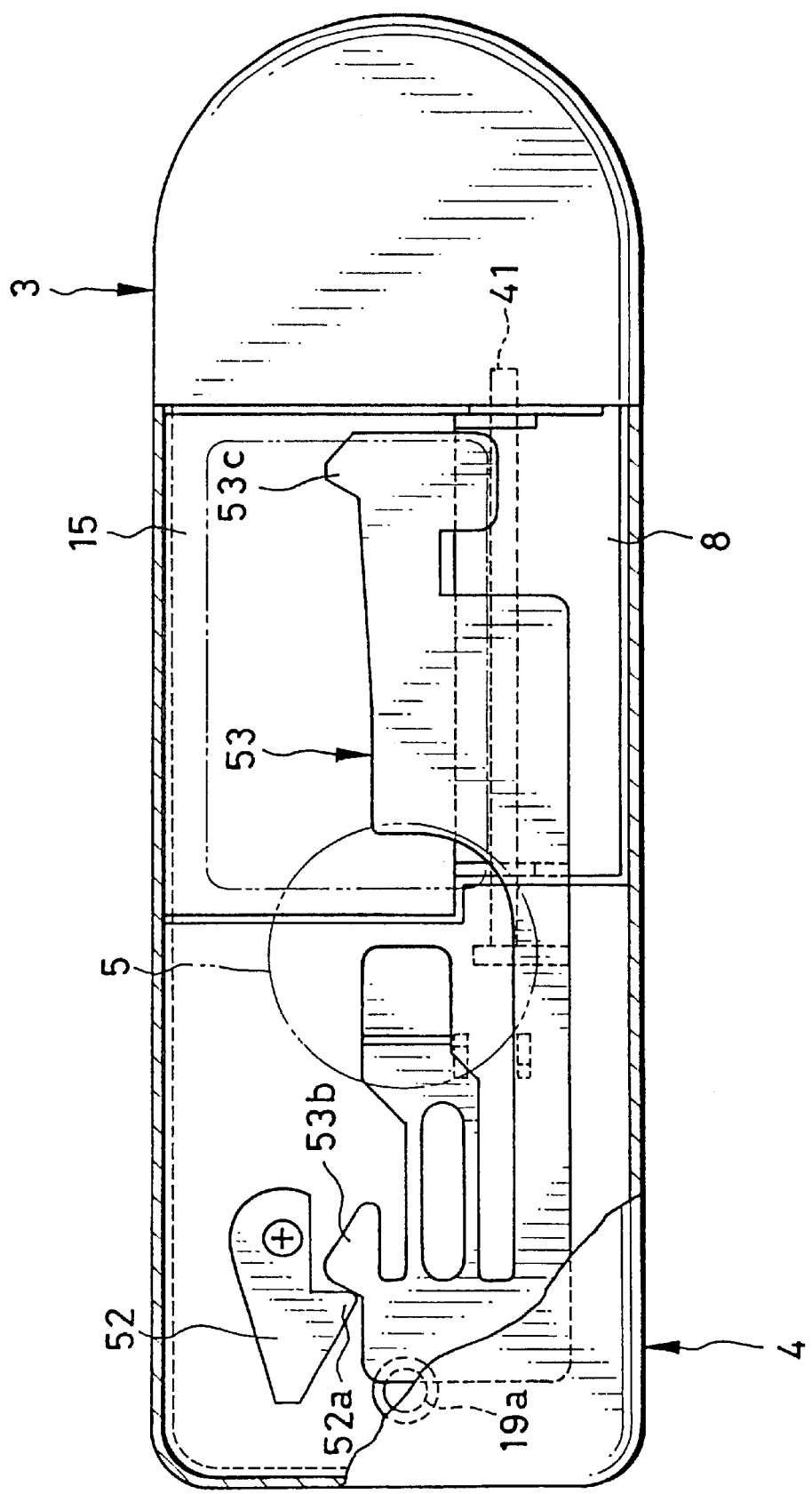
FIG. 14 is a top plan view, with parts broken away, of the compact camera.

The ratchet lever 52 is rotatable through a limited angle, and is urged by a spring force to rotate in a counterclockwise direction in FIG. 5. When the camera case 4 is in the resting position, a ratchet 52a of the ratchet lever 52 is engaged with the inner protuberance 53b, as shown in FIG. 14. Accordingly, the camera case 4 does not open unless the camera case 4 is pulled off with a larger force than the spring force applied to the ratchet lever 52.

The first locking claw 50 is integrally formed on one distal end of a lever 55. The lever 55 is rotatable about an axis 55a that extends in the horizontal direction of the camera 2, i.e., the sliding direction of the camera case 4. The axis 55a of the lever 55 is mounted to a side wall 28a of the battery chamber 28 (see FIG. 9). The lever 55 is urged by a spring 56 to rotate in a counterclockwise direction in FIG. 15, so that the locking claw 50 is urged to protrude out of the camera housing 22 through a slot 22b.

Figure 16:
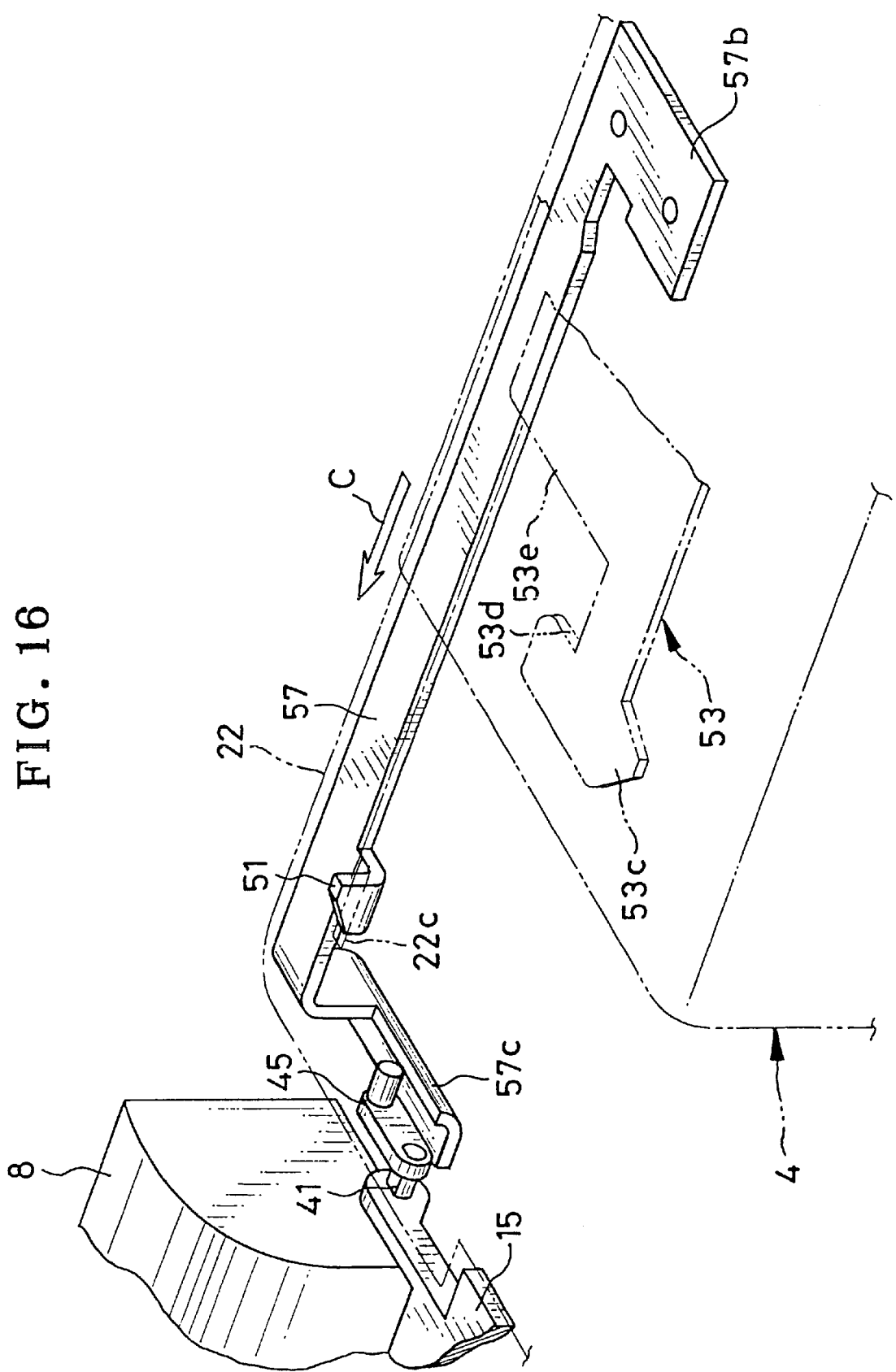
FIG. 16 is an enlarged rear perspective view of the compact camera, with parts broken away, illustrating a second locking mechanism and a second unlocking mechanism therefor.

On the other hand, as shown in FIG. 16, the second locking claw 51 is integrally formed with a leaf spring 57 whose base portion 57b is secured to the inside of the top wall of the camera housing 22. According to the spring force of the leaf spring 57, the second locking claw 51 is also urged to protrude out of the camera housing 22 through a slot 22c. In the resting position, both of the locking claws 50 and 51 are depressed into the camera body 3 by the camera case 4.

Figure 15:
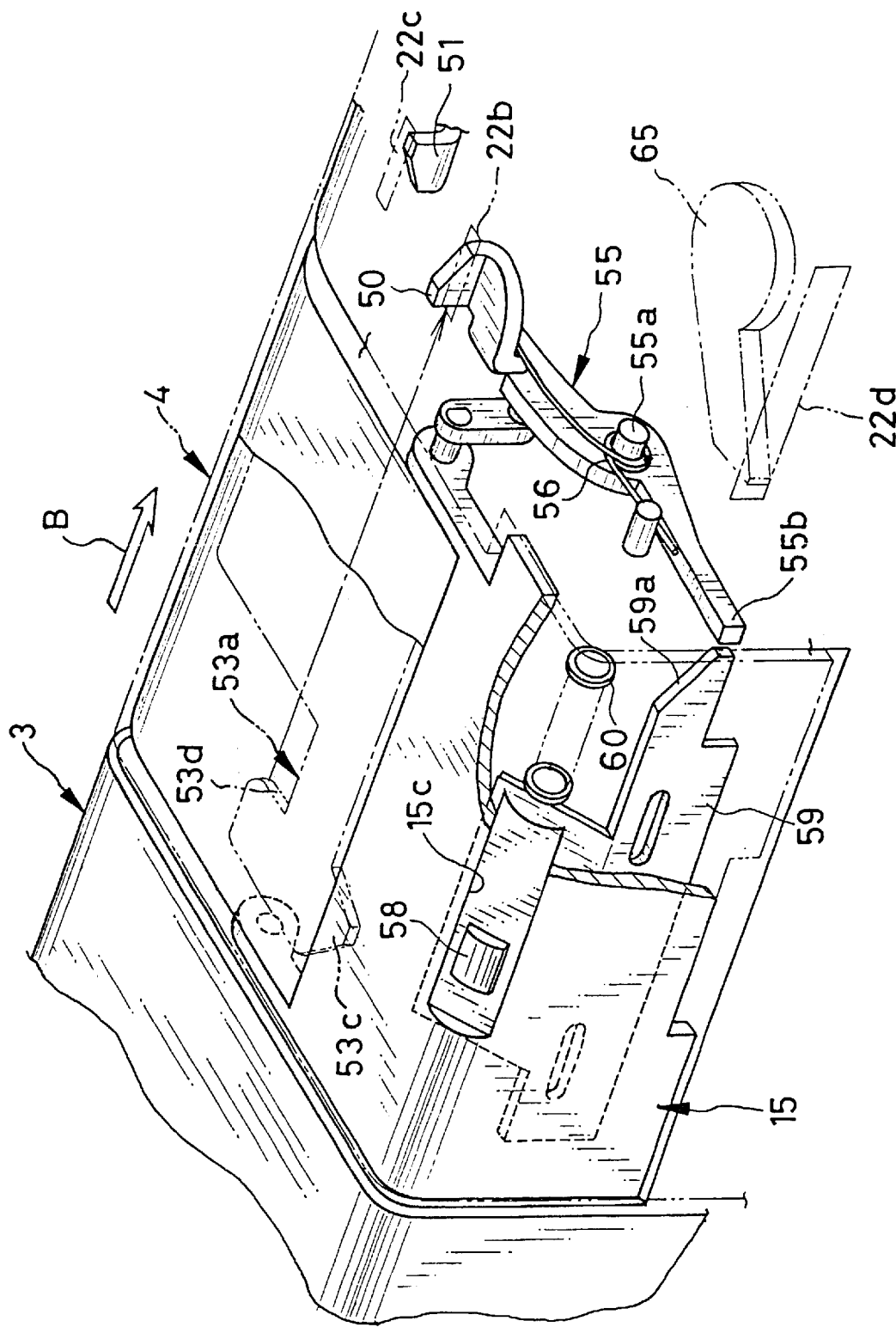
FIG. 15 is an enlarged rear perspective view of the compact camera, with parts broken away, illustrating a first locking mechanism and a first unlocking mechanism therefor.

When the camera case 4 comes to the working position, one edge 53d of the notch 53a of the locking plate 53 strikes against a vertical edge of the first locking claw 50, as implied by phantom lines in FIG. 15. Therefore, the first locking claw 50 stops the camera case 4 from moving past the working position in an uncovering direction indicated by an arrow B. When the first locking claw 50 comes to contact with the edge 53d, a vertical edge of the second locking claw 51 is confronted with an opposite edge 53e of the notch 53a from the edge 53d. Therefore, the second locking claw 51 stops the camera case 4 from moving from the working position in a covering direction as indicated by an arrow C in FIG. 16.

In order to slide the camera case 4 from the working position in the uncovering direction B, the first locking claw 50 must be retracted from the edge 53d. The first locking claw 50 is moved down into the camera body 3 by pushing an unlock knob 58 to the right in FIG. 15. The unlock knob 58 is formed integrally with an unlocking plate 59 that is mounted to the inside of the battery chamber lid 15 so as to be slidable in the horizontal direction of the camera 2 in a room between a corner of the L-shaped battery chamber lid 15 and a cylindrical periphery of the battery 21. The unlock knob 58 is exposed through a slot 15c formed along the corner of the L-shaped battery chamber lid 15. The unlock knob 58 does not protrude outward from the obverse surface of the battery chamber lid 15, so that the unlock knob 58 does not interfere with the camera case 4.

When the unlock knob 58 is pushed to the right, a tapered surface 59a of the unlocking plate 59 pushes up a distal end 55b of the lever 55, so that the first locking claw 50 formed on the opposite distal end of the lever 55 moves down, allowing the camera case 4 to move further in the uncovering direction B. The unlocking plate 59 is urged by a coiled spring 60 to the left in FIG. 15, so that the unlocking plate 59 and thus the unlock knob 58 automatically move back to an initial position as shown in FIG. 15 after being pushed to the right.

As shown in FIG. 16, the leaf spring 57 is coupled at its free end portion 57c to the crank lever 45. By rotating the flash projector 8 to the stowed position, the crank lever 45 rotates together with the flash projector 8, pushing down the free end portion 57c of the leaf spring 57 as shown in FIG. 15. As a result, the second locking claw 51 moves down into the camera body 3. That is, the flash projector 8 needs to be pushed into the recess 16 in order to close the camera case 4 to the resting position. Therefore, the camera case 4 is prevented from crashing into the flash projector 8. As the flash projector 8 automatically moves up to the flashing position with the camera case 4 being opened to the working position, the free end portion 57a of the leaf spring 57 moves upward according to its own resiliency, so the second locking claw 51 automatically protrudes out through the slot 22c in the working position.

Each of the first and second locking claws 50 and 51 has an inclined edge, and the inclination of the inclined edge of the second locking claw 51 is opposite to that of the inclined edge of the first locking claw 50. Thus, the camera case 4 rides over the first locking claw 50 in the covering direction C, and rides over the second locking claw 51 in the uncovering direction B.

Figure 17:
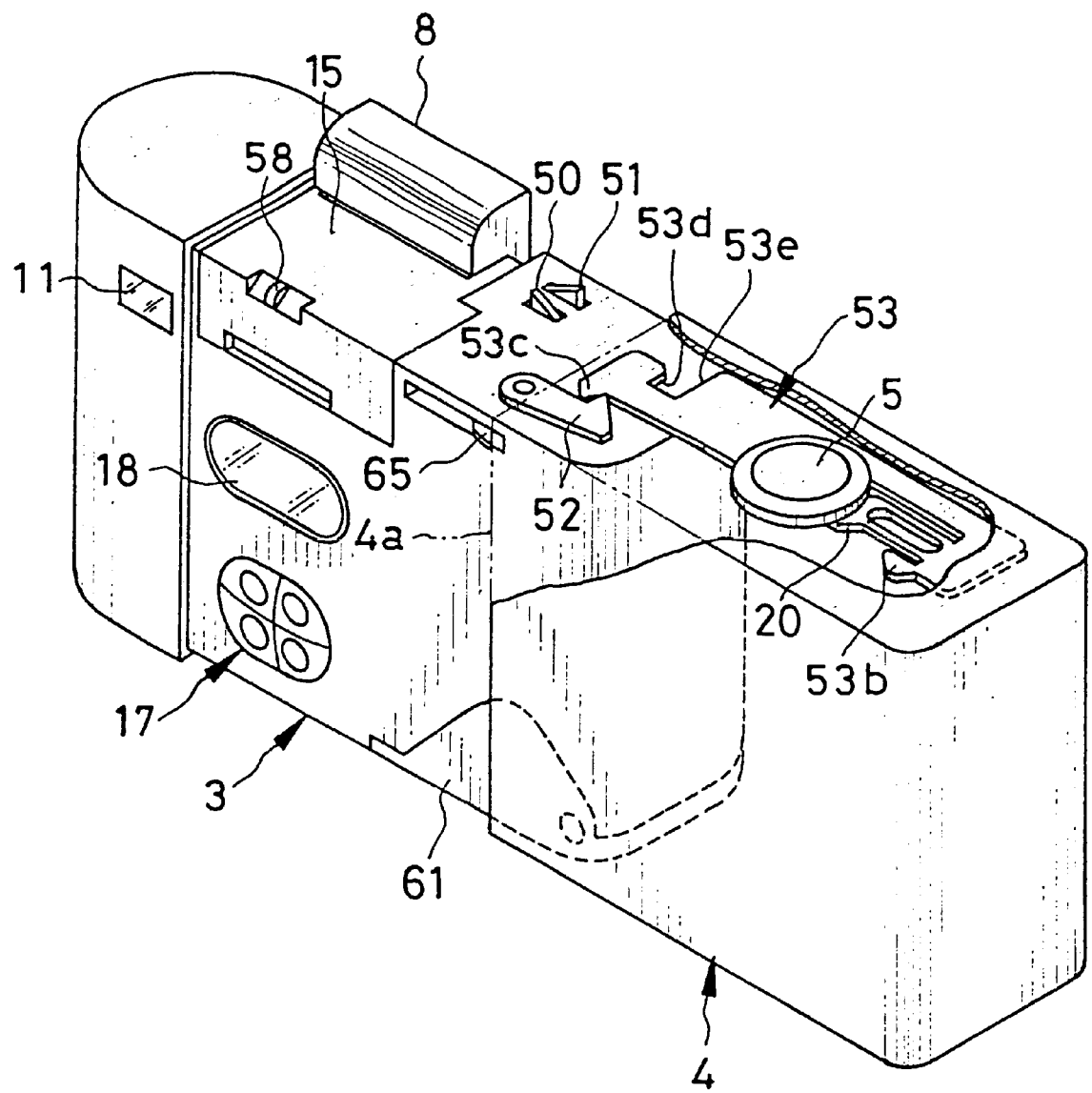
FIG. 17 is a rear perspective view of the compact camera, with parts broken away, illustrating the camera case locked in the safety lock position.

After the unlock member 58 is operated to release the camera case 4 from the arrest of the locking claw 50, the camera case 4 can move in the uncovering direction B beyond the working position. When the camera case 4 comes to the safety lock position, the protuberance 53c of the locking plate 53 strikes against the ratchet 52, as shown in FIG. 17. If there is any filmstrip placed behind the exposure aperture 25, the ratchet lever 52 is not allowed to rotate a sufficient amount in the clockwise direction in FIG. 17 enough to remove away from the protuberance 53c. Therefore, the camera case 4 is locked at the safety lock position as shown in FIG. 17. In the safety lock position, the camera case 4 covers more than half a bottom lid 61 of the cartridge chamber 26, so that it is impossible to open the bottom lid 61.

Figure 18:
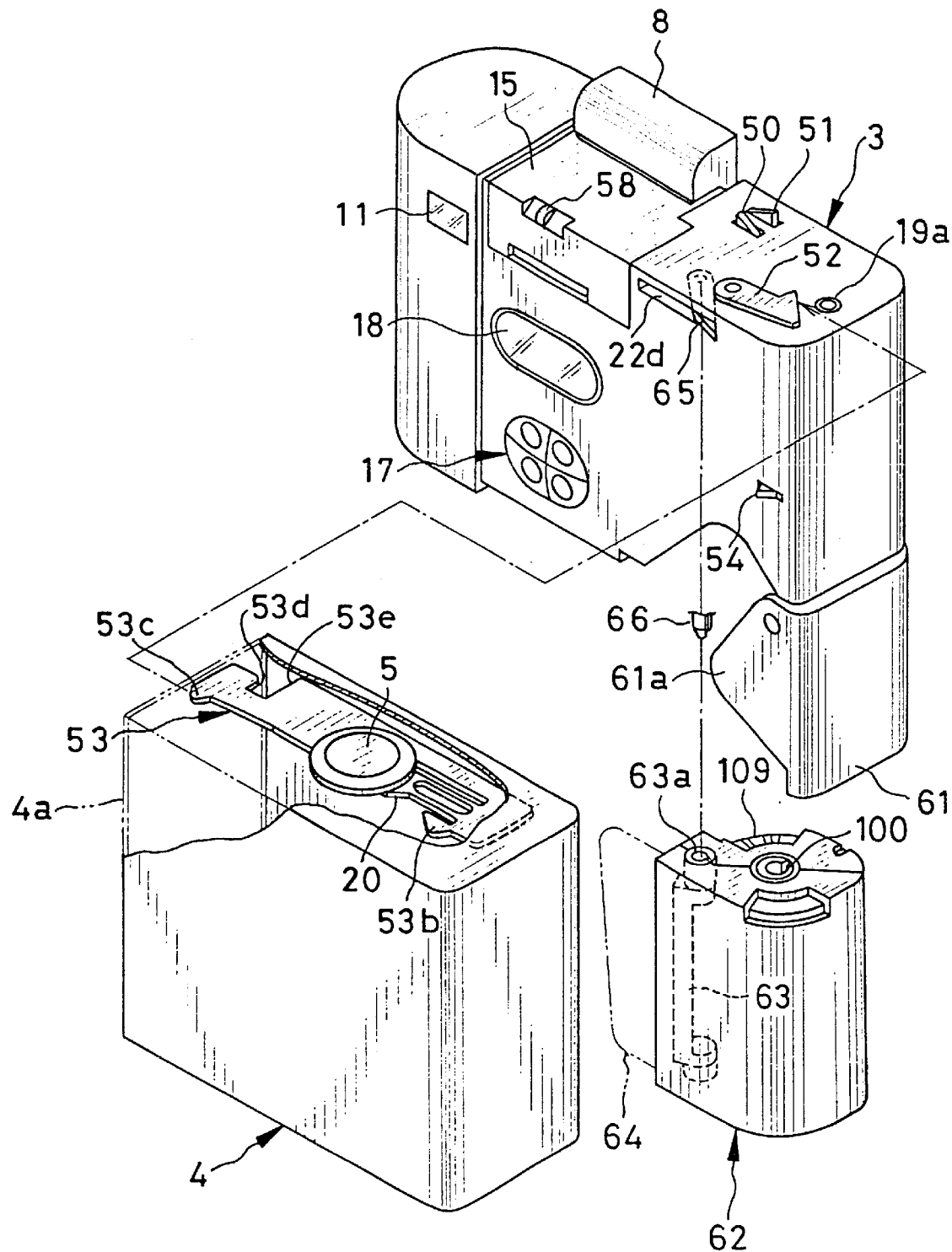
FIG. 18 is a rear perspective view of the compact camera, with parts broken away, illustrating a cartridge changing position for loading or unloading a photo film cartridge.

As shown in FIG. 18, the camera 2 is designed to load an IX240 type photo film cartridge 62. The IX240 type photo film cartridge 62 has a door member 63 in its film port. The door member 63 closes the interior of the cartridge 62 in a light-tight fashion, and is opened to let a filmstrip 64 out of the cartridge 62. The door member 63 has a key hole 63a at either face end of its pivot that is exposed to the outside. When the photo film cartridge 62 is loaded in the cartridge chamber 26, the key hole 63a is fitted on a key shaft 66 that protrudes into the cartridge chamber 26 through its top wall. Thus, the door member 63 is opened or closed by rotating the key shaft 66.

A door operating lever 65 is mounted in the camera body 3 as a part of a door operating mechanism for opening and closing the door member 63 in cooperation with the camera case 4. The door operating lever 65 is urged to rotate in a counterclockwise direction in FIG. 18, and is connected coaxially to the key shaft 66 such that the key shaft 66 rotate along with the door operating lever 65.

Where the camera case 4 is separated from the camera body 3, the door operating lever 65 is set at a terminal position under the spring force, and slightly protrudes out of the camera housing 22 through a slot 22d, as shown in FIG. 18. In this terminal position, the door member 63 closes the film port. When the camera case 3 is put on the camera body 3 and slid in the covering direction C to the working position, the camera case 4 pushes the door operating lever 65 at its rear edge 4a, and thereby rotates the door operating lever 65 in the clockwise direction against the spring force. As a result, the key shaft 66 rotates the door member 63 to open the film port.

On the contrary, when the camera case 4 slides in the uncovering direction B and goes past the door operating lever 65, the door operating lever 65 and hence the key shaft 66 rotate in the counterclockwise direction according to the spring force. The counterclockwise rotation of the key shaft 66 causes the door member 63 to rotate in its closing direction to close the film port. Accordingly, when the camera case 4 is separated from the camera body 3, the door member 63 is automatically closed.

If the filmstrip 64 is not completely located inside the photo film cartridge 62, the filmstrip 64 hinders the door member 63 from rotating further in the closing direction. As a result, the key shaft 66 and hence the door operating lever 65 stop at a rotational position before returning to the terminal position. The ratchet lever 52 is interconnected to the door operating mechanism such that the ratchet lever 52 is locked in the safety lock position as shown in FIG. 17 when the door member 63 is not completely closed.

Only when the door member 63 is completely closed, the ratchet lever 52 is allowed to rotate away from the protuberance 53c of the locking plate 53 against the spring force and permits the camera case 4 moving beyond the safety lock position in the uncovering direction B. Accordingly, only after the entire length of the filmstrip 64 is wound into the photo film cartridge 62, it is possible to remove the camera case 4 from the camera case 3 by pulling it off with a larger force than the spring force applied to the ratchet lever 52, and thereby close the door member 63. Needless to say, when the photo film cartridge 62 is not loaded, the camera case 4 is not locked at the safety lock position because the door operating lever 65 can rotate to the terminal position.

Since it is impossible to open the bottom lid 61 unless the camera case 4 is separated from the camera body 3, the filmstrip 64 is prevented from being fogged in case the bottom lid 61 opens by accident while the filmstrip 64 is out of the photo film cartridge 62. Besides that, it is unnecessary to provide a mechanism for holding the bottom lid 61 in its closed position so long as the door member 63 opens. The bottom lid 61 has a pair of wings 61a that extend to the front and rear sides of the camera body 3, so that it is easy to nip the bottom lid 61 at the wings 61a when opening or closing the bottom lid 61. A simple click-stop device is enough to hold the bottom lid 61 in the closed position. By covering the bottom lid 61, the camera case 4 also improves the light-tightness of the cartridge chamber 26.

Designated by 54 is a projection that is provided for electrically detecting whether the camera case 4 is removed from the camera body 3 or not. The projection 54 is urged by a spring force to protrude through a hole of the camera housing 22 to the outside, and is depressed by the camera case 4 when the camera case 4 is put on the camera body 3. The up-down movement of the projection 54 is detected as a detection signal, and the detection signal is used for some purpose as will be described later.

Figure 19:
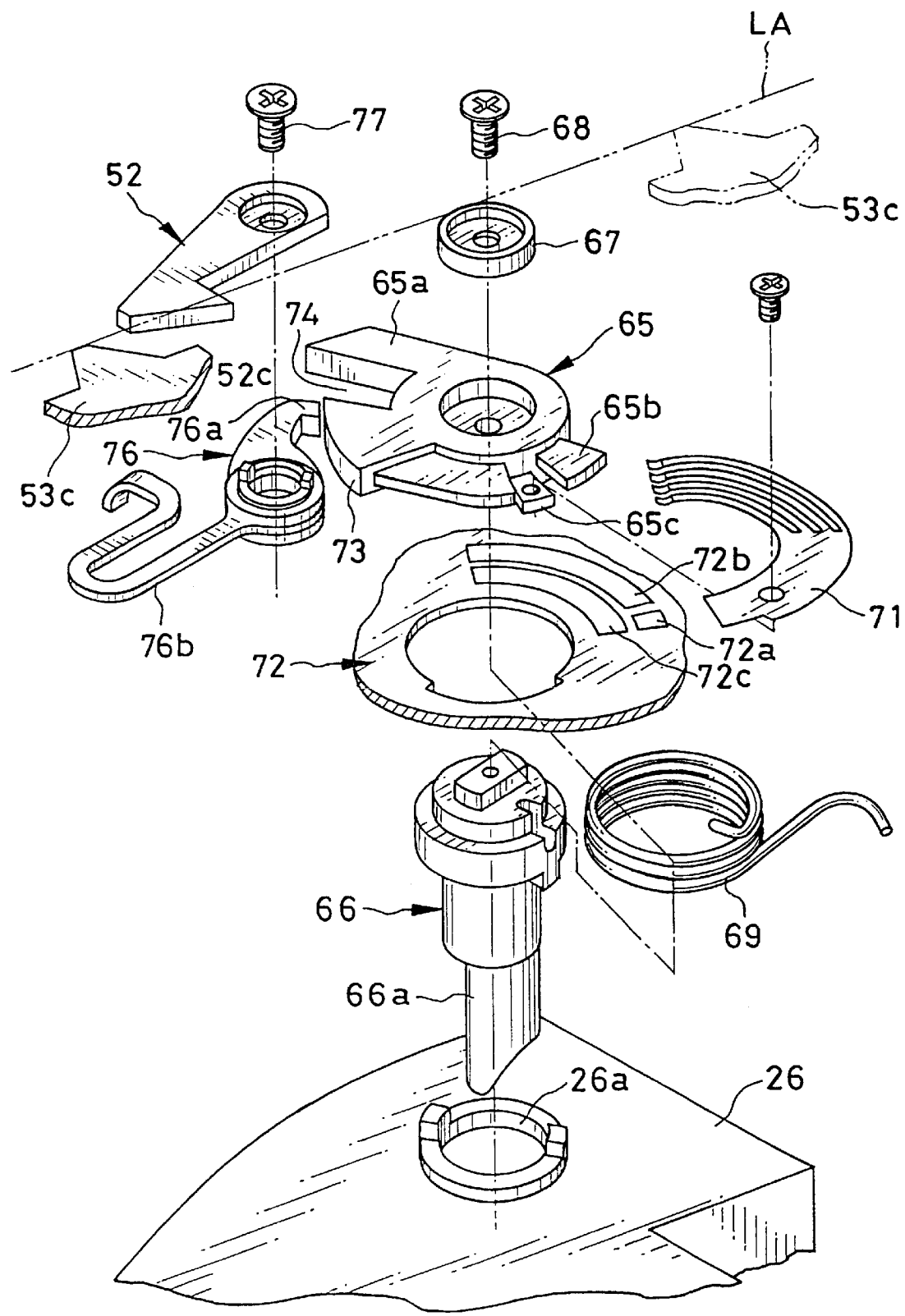
FIG. 19 is an exploded view illustrating a door operating mechanism for opening or closing a door member of the photo film cartridge in cooperation with the camera case sliding between the cartridge changing position and the working position, and a stopping mechanism for stopping the camera case at the safety lock position.

FIG. 19 shows a preferred embodiment of the door operating mechanism. A door operating lever 65 is provided with a first arm 65a whose distal end protrudes through the slot 22d of the camera housing 22 in the same way as shown in FIG. 18. The door operating lever 65 is fixedly attached to a key shaft 66 through a washer 67 and a screw 68 such that the door operating lever 65 rotates together with the key shaft 66 about the same rotational axis. The key shaft 66 is inserted from the top side into the cartridge chamber 26 through a hole 26c, and a free end 66a of the key shaft 66 is fitted in the key hole 63a of the door member 63. A coiled spring 69 is interconnected between the door operating lever 65 and the key shaft 66, for urging the door operating lever 65 and thus the key shaft 66 to rotate counterclockwise in FIG. 19, that is, in the direction to close the door member 63. Without any hinderance, the door operating lever 65 is kept in its terminal position where the first arm 65a is pressed against one terminal of the slot 22d under the force of the spring 69.

In addition to the first arm 65a, the door operating lever 65 also has second and third arms 65b and 65c for holding a contact brush 71. The brush contact 71 brushes on printed contact patterns 72a, 72b and 72c that are formed on a printed circuit board 72 that is provided above the cartridge chamber 26. The contact patterns 72a to 72c are connected to a control circuit that is integrated in the printed circuit board 72, though the control circuit is not shown in FIG. 19. The contact pattern 72c constitutes a common contact with which the contact brush 71 keeps in contact. When the door member 63 is completely closed, the contact brush 71 comes to contact with the printed contact pattern 72a. In other positions of the door member 63, the contact brush 71 is in contact with the printed contact pattern 72b. According to this configuration, it is possible to electrically detect if the door member 63 is completely closed or not.

Figure 20:
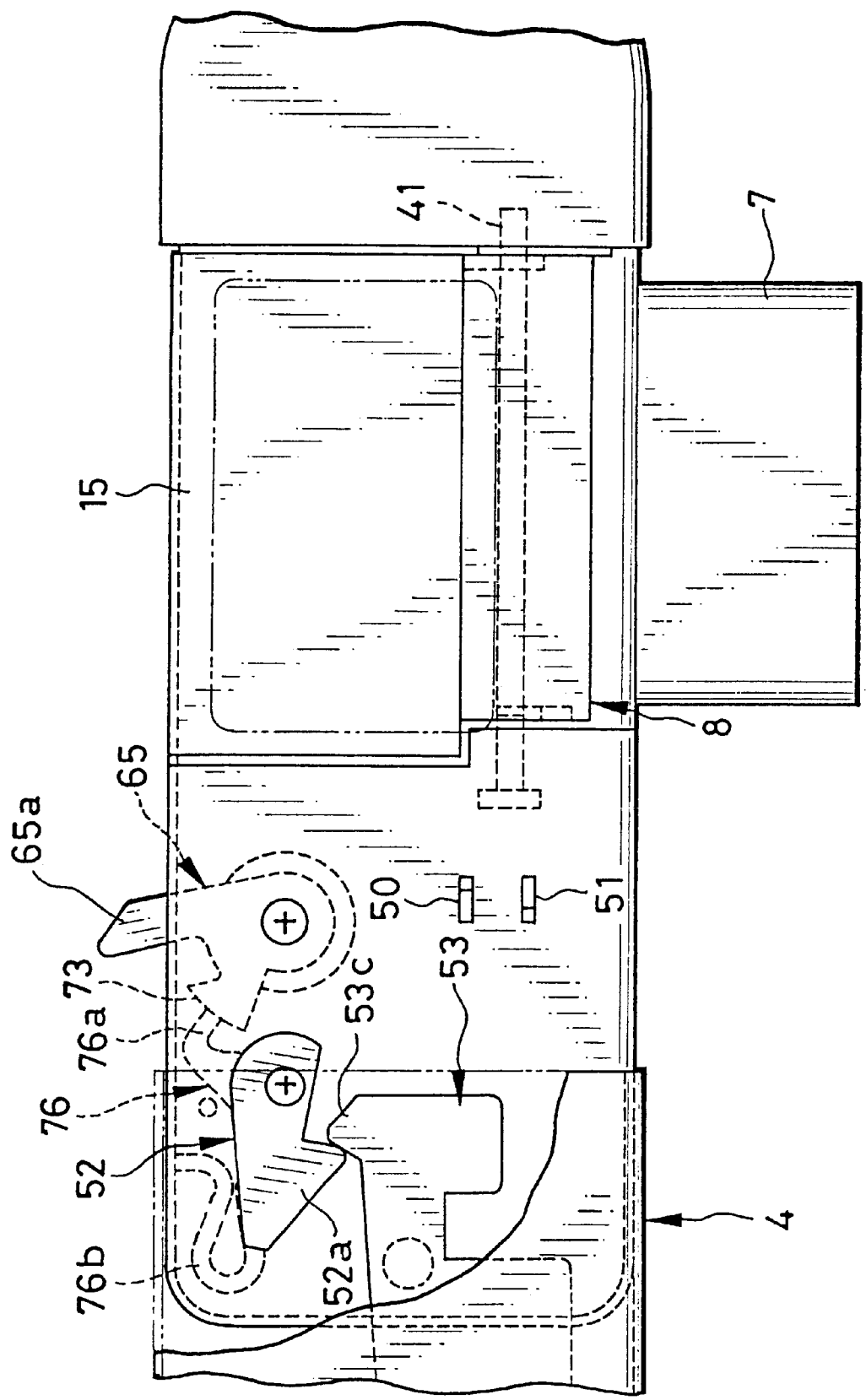
FIG. 20 is a fragmentary top plan view of the compact camera, with parts broken away, illustrating the door operating mechanism and the stopping mechanism in the safety lock position.

The door operating lever 65 is interconnected with the ratchet lever 52 through an interconnection lever 76 that is affixed to the ratchet lever 52 by a screw 77, and rotates together with the ratchet lever 52. The interconnection lever 76 has a nose 76a that confronts a cam projection 73 of the door operating lever 65 when the door operating lever 65 stops at a rotational position before its terminal position, as is shown in FIG. 20, for example when a filmstrip 64 exits in the film port of the photo film cartridge 62. The interconnection lever 76 also has a resilient tail 76b formed integrally therewith. A free end of the tail 76b is pressed against the rear wall of the camera housing 22 so as to urge the interconnection lever 76 and thus the ratchet lever 52 toward counterclockwise direction.

In an initial position of the ratchet lever 52 where no load is applied to the resilient tail 76b, the ratchet 52a of the ratchet lever 52 is in a course LA of the protrusion 53c of the locking plate 53, so that the protrusion 53c strikes against the ratchet 52a when the camera case 4 moves from the working position to the safety lock position. If a filmstrip 64 remains in the film port of the photo film cartridge 62 and stops the door member 63 from being closed, the door operating member 65 stops at a rotational position before the terminal position as shown in FIG. 20.

Because the nose 76a of the interconnection lever 76 faces the cam projection 73 of the door operating member 65 in this position, the interconnection lever 76 is stopped from rotating clockwise. Therefore, the ratchet lever 52 cannot rotate clockwise even if the photographer tries to slide the camera case 4 further in the uncovering direction B in this condition, and thereby a force to rotate the ratchet lever 52 in the clockwise direction is applied through the protrusion 53c. In this way, the camera case 4 is locked in the safety lock position when the filmstrip 64 is not completely wound into the photo film cartridge 62.

Figure 21:
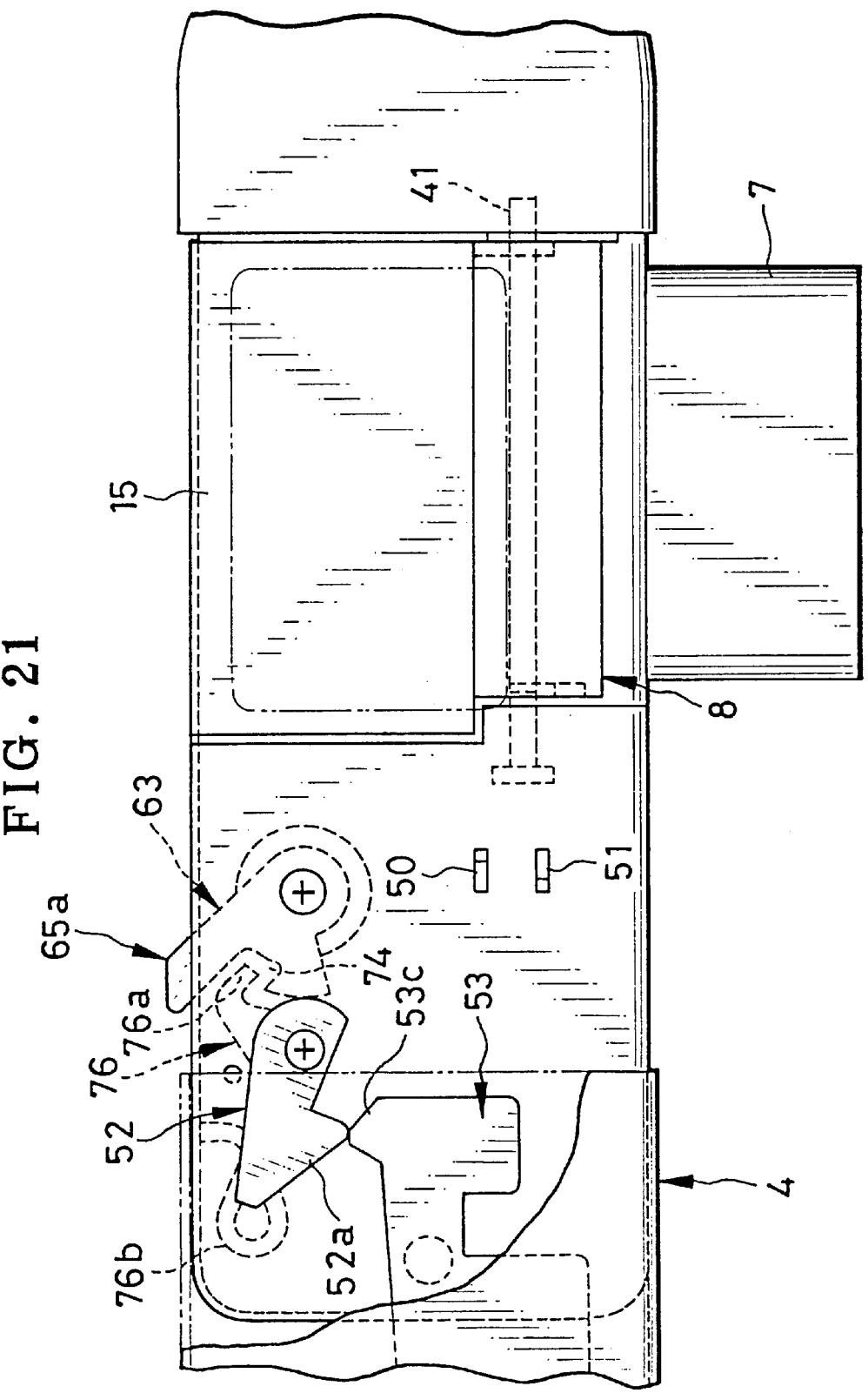
FIG. 21 is a view similar to that of FIG. 20 and illustrates a position where the camera case is released from the safety lock position.

After the filmstrip 64 is completely wound into the photo film cartridge 62, the door operating member 65 returns to its terminal position as shown in FIG. 21. In this position, the cam projection 73 is set away from the front of the nose 76a of the interconnection lever 76, and a cam recess 74 of the door operating lever 65 is opposed to the nose 76a. Therefore, the interconnection lever 76 and thus the ratchet lever 52 can rotate clockwise when the camera case 4 is pulled off further from the safety lock position and the protrusion 53c of the locking plate 53 pushes the ratchet lever 52 against the force of the resilient tail 76b of the interconnection lever 76. After the protrusion 53c gets past the ratchet 52a, the camera case 4 can be smoothly removed from the camera body 3.

Figure 22:
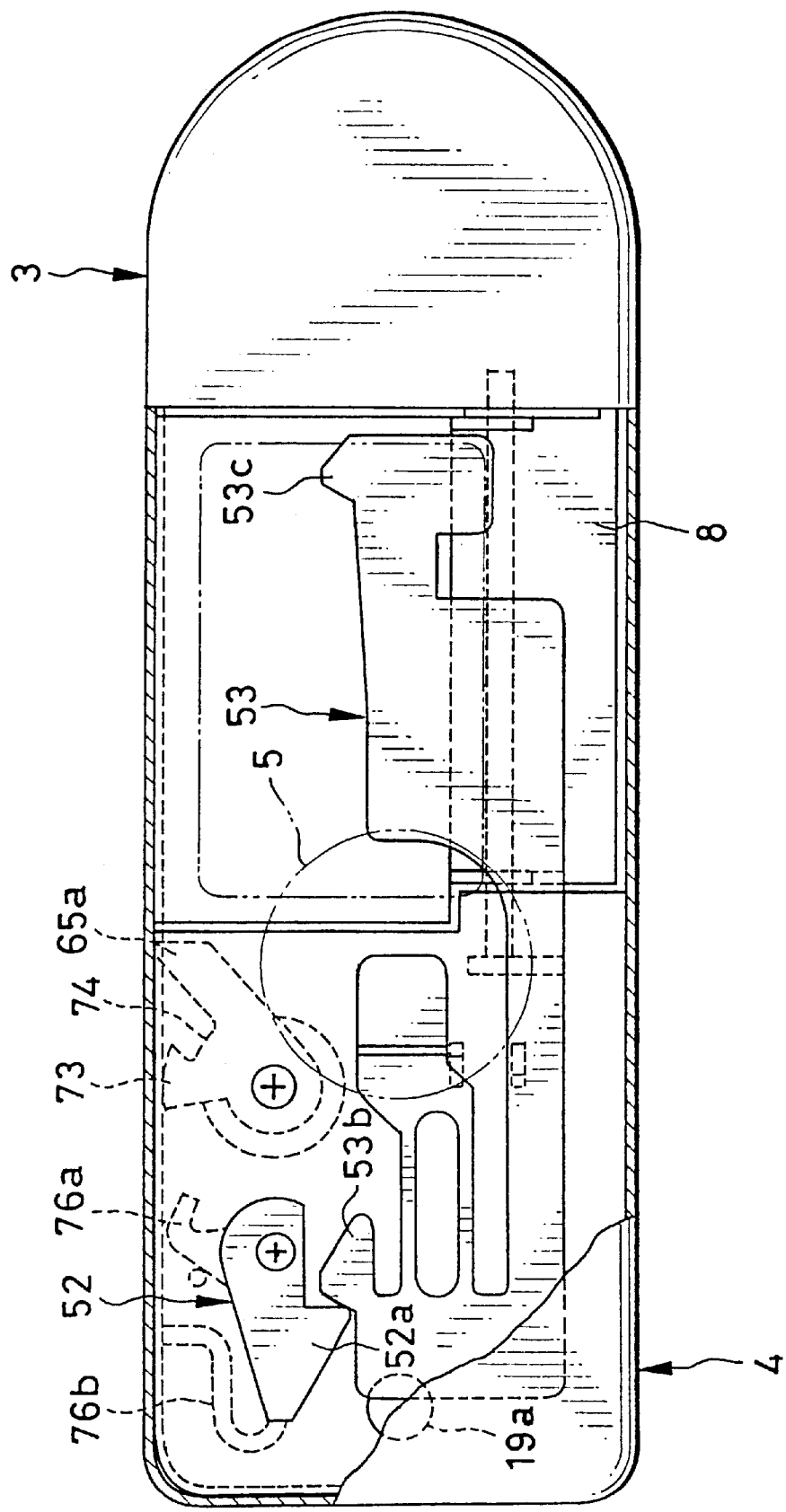
FIG. 22 is a top plan view of the compact camera, with parts broken away, illustrating the door operating mechanism and the stopping mechanism in the resting position.

FIG. 22 shows the interconnection lever 76 and the door operating lever 65 in the resting position of the camera case 4. As described above, the arm 65a of the door operating lever 65 is pushed by the edge 4a of the camera case 4 when it slides in the covering direction. As a result, the cam projection 73 of the door operating lever 65 is removed away from the nose 76a of the interconnection lever 76 in the working position and in the resting position. Therefore, the ratchet lever 52 can rotate clockwise in these positions. Therefore, the ratchet 52a gets over the inner protrusion 53b of the locking plate 53 while the camera case 4 slides from the working position to the resting position, and holds the camera case 4 in the resting position under the resiliency of the resilient tail 76b.

Figure 23:
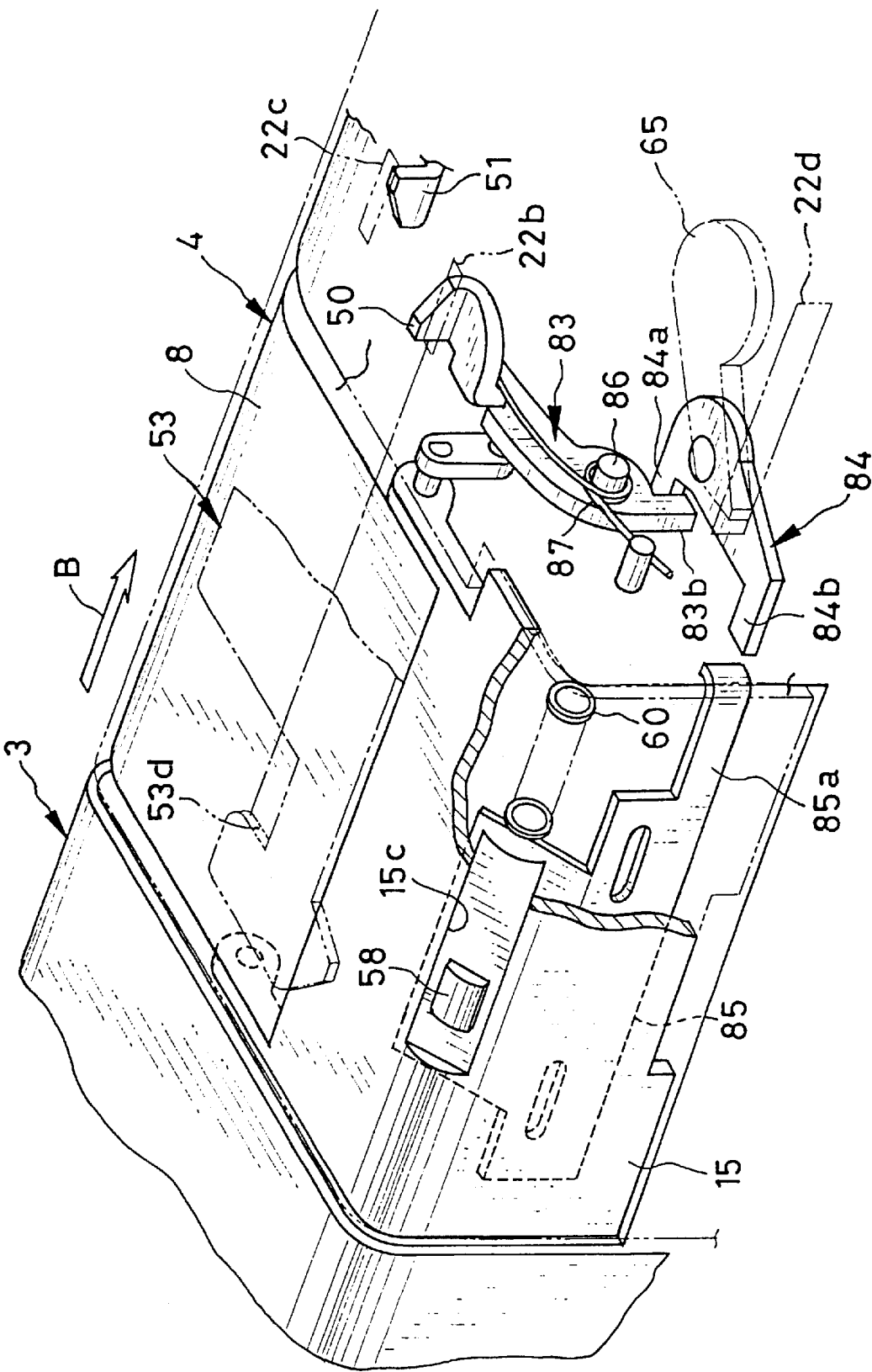
FIG. 23 is an enlarged rear perspective view of the compact camera, with parts broken away, illustrating a second embodiment of first locking mechanism and a first unlocking mechanism therefor.

FIG. 23 shows another preferred embodiment of locking mechanism for locking the camera case 4 at the working position. Also in this embodiment, a first locking claw 50, which stops the camera case 4 from moving further in the uncovering direction B, protrudes upward through a slot 22b formed through the wall of the camera housing 22. The first locking claw 50 is integrally formed on an upper distal end of a first lever 83 that is rotatable about an axis 86 in a vertical plane. The axis 86 of the first lever 83 is mounted to the side wall 28a of the battery chamber 28 (see FIG. 9). The first lever 83 is urged by a spring 87 to rotate in a counterclockwise direction in FIG. 23, so that the locking claw 50 is urged to protrude out of the camera housing 22.

A second lever 84 is mounted on the top wall of the cartridge chamber 26 so as to rotate in a horizontal plane. One distal end 84a of the second lever 84 is engaged with a lower distal end 83b of the first lever 83.

When the camera case 4 comes to the working position, one edge 53d of the notch 53a of the locking plate 53 strikes against a vertical edge of the first locking claw 50, so that the camera case 4 is stopped from moving further in the uncovering direction B.

The first locking claw 50 is moved down into the camera body 3 by pushing an unlock knob 58 to the right in FIG. 23. The unlock knob 58 is formed integrally with an unlocking plate 85 that is mounted to the inside of the battery chamber lid 15 so as to be slidable in the horizontal direction of the camera 2. The unlock knob 58 is exposed through a slot 15c formed at a corner of the L-shaped battery chamber lid 15. When the unlock knob 58 is pushed to the right, a leg 85a of the unlocking plate 85 pushes a second distal end 84b of the second lever 84, causing the second lever 84 to rotate counterclockwise. As a result, the second lever 84 pushes up the lower distal end 83b of the first lever 83, so that the first locking claw 50 moves down.

Since the first locking claw 50 is retracted from the edge 53d, the camera case 4 is allowed to slide from the working position in the uncovering direction B. The unlocking plate 85 is urged by a coiled spring 60 to the left in FIG. 23, so that the unlocking plate 85 and thus the unlock knob 58 automatically move back to an initial position as shown in FIG. 23 after being pushed to the right.

Figure 24:
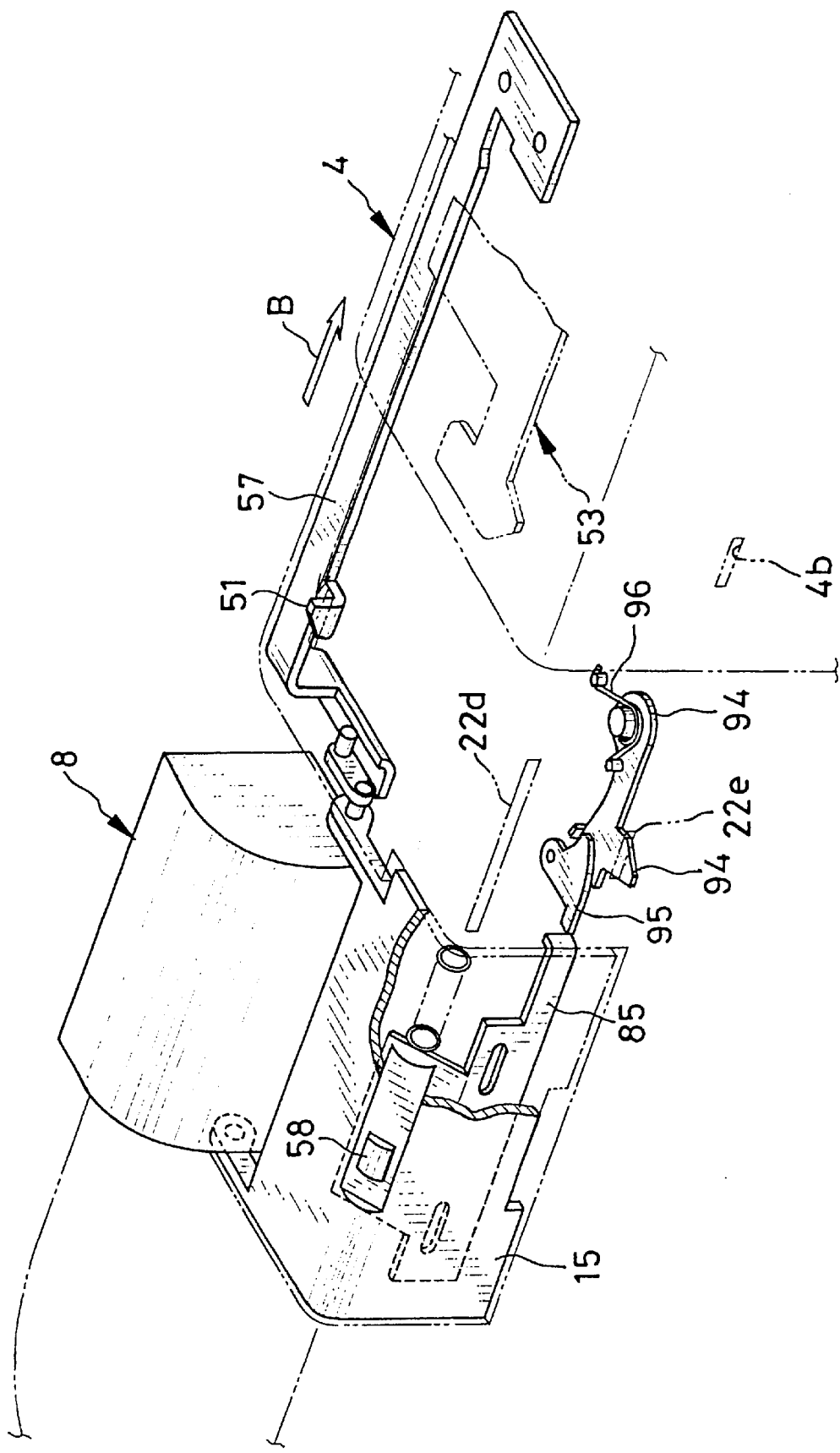
FIG. 24 is an enlarged rear perspective view of the compact camera, with parts broken away, illustrating a third embodiment of first locking mechanism.

Instead of the first locking claw 50 and the levers 83 and 84, it is possible to provide a locking lever 94 with a locking claw 94a and an interconnection lever 95, as is shown in FIG. 24. The locking lever 94 is mounted on the top wall of the cartridge chamber 23 so as to rotate in a horizontal plane. The locking lever 94 is urged by a coiled spring 96 to rotate counterclockwise in FIG. 24, that is, to protrude the locking claw 94a out through a slot 22e that is formed through the rear wall of the camera housing 22. When the camera case 4 moves from the resting position to the working position, the locking claw 94a is inserted in a slot 4b of the camera case 4. Thus, the locking claw 94a stops the camera case 4 at the working position. The locking lever 94 has a vertically bent portion 94b which is engaged with the interconnection lever 95. When the unlock knob 58 is pushed to the right, the unlock member 85 pushes the interconnection lever 95 to rotate counterclockwise. Then, the interconnection lever 95 pushes the locking lever 94 to rotate clockwise against the force of the spring 96. In this way, the locking claw 94a is disengaged from the slot 4b, and the camera case 4 is allowed to slide past the working position in the uncovering direction B. It is preferable to provide a groove inside the camera case 4 instead of the slot 4b in terms of protection against dust.

Figure 25:
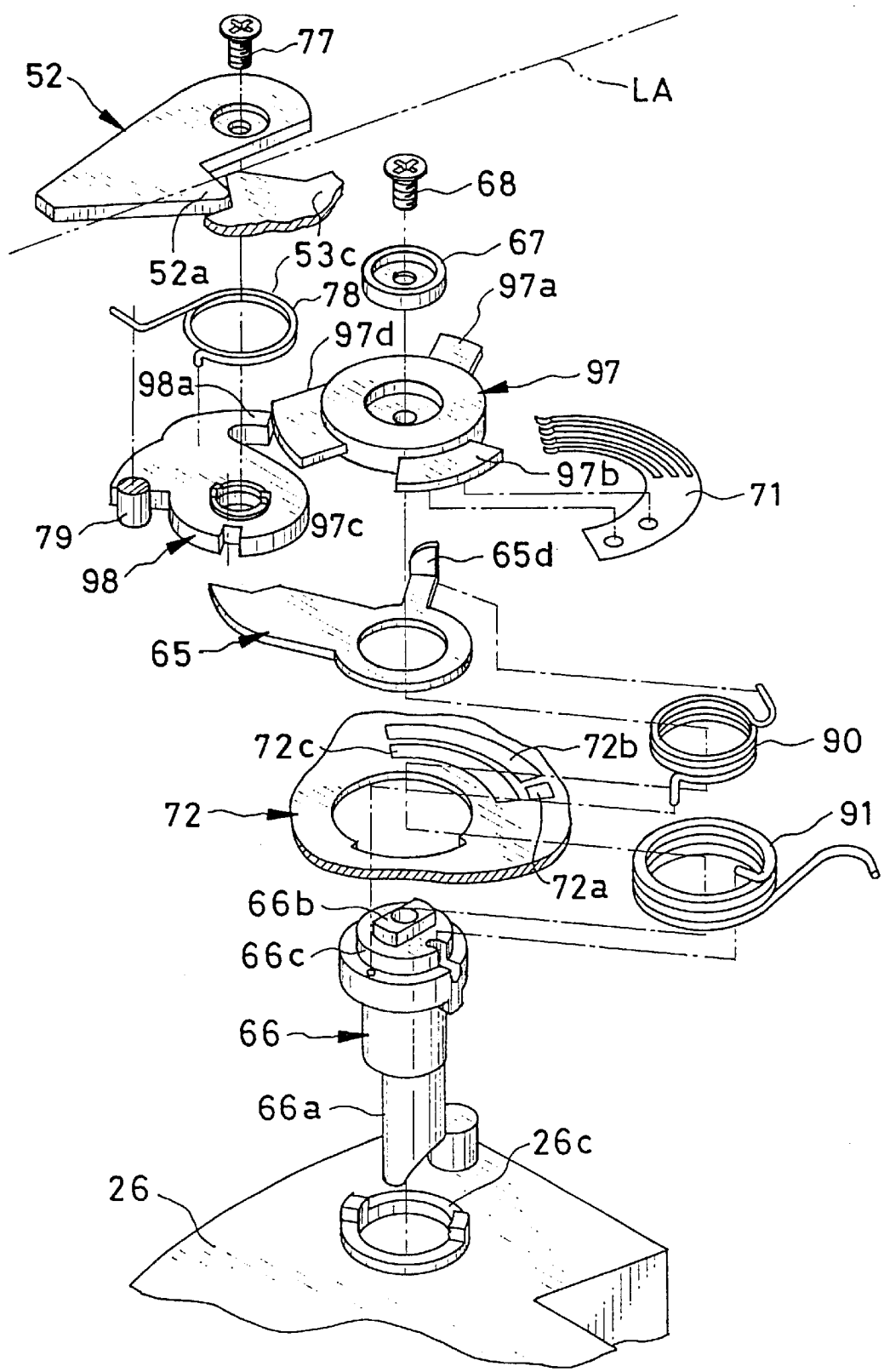
FIG. 25 is an exploded view illustrating a door operating mechanism and a stopping mechanism for stopping the camera case at the safety lock position, according to another embodiment of the invention.

FIG. 25 shows another preferred embodiment of the door operating mechanism interconnected with the ratchet lever 52. In this embodiment, a door operating lever 65 is fitted on a mounting flange 66c of a key shaft 66 such that the door operating lever 65 can rotate relative to the key shaft 66 about the same rotational axis as the key shaft 66. A cam member 97 is fixedly attached to a mounting end 66b of the key shaft 66 through a washer 67 and a screw 68. The key shaft 66 is inserted from the top side into the cartridge chamber 26 through a hole 26c, and a free end 66a of the key shaft 66 is fitted in the key hole 63a of the door member 63.

A coiled spring 90 is interconnected between the door operating lever 65 and the key shaft 66, for urging the door operating lever 65 to rotate counterclockwise in FIG. 25. A second coiled spring 91 is interconnected between the key shaft 66 and the top wall of the cartridge chamber 26, for urging the key shaft 66 rotate counterclockwise in FIG. 25, i.e., in the direction to close the door member 63. The urging force of the second spring 91 is larger than that of the first spring 90. The door operating lever 65 has an arm 65d that is bent upward from the rotational plane of the door operating lever 65. Without any confinement, the door operating lever 65 is in its terminal position where a distal end of the door operating lever 65 strikes against one terminal of the slot 22d and slightly protrudes out through the slot 22d, in the same way as shown in FIG. 5, and the arm 65d is in contact with a first sector arm 97a of the cam member 97 according to the forces of the springs 90 and 91.

When the camera case 4 is fitted onto the camera body 3 and is slid in the covering direction, the door operating lever 65 is pushed to rotate clockwise by the edge 4a of the camera case 4. When the door operating lever 65 is rotated clockwise against the force of the spring 90, the arm 65d pushes the cam member 97 at the first sector arm 97a to rotate the cam member 97 clockwise. Together with the clockwise rotation of the cam member 97, the key shaft 66 rotates clockwise against the force of the spring 91, thereby opening the door member 63. Thus, the door member 63 is opened by sliding the camera case 4 to the working position or to the resting position.

When the camera case 4 is slid in the uncovering direction B to the safety lock position, the door operating lever 65 rotates counterclockwise according to the force of the spring 90. Following the counterclockwise rotation of the door operating lever 65, the cam member 97 and hence the key shaft 66 rotate counterclockwise according to the force of the spring 91, thereby rotating the door member 63 in the closing direction. If the filmstrip 64 is still at the film port of the photo film cartridge 62 at that time, the filmstrip 64 stops the door member 63 and the key shaft 66 from rotating further in the closing direction. However, since the door operating lever 65 can rotate relative to the key shaft 66, the door operating lever 65 returns to the terminal position according to the force of the spring 90 even if the filmstrip 64 is not completely wound into the cartridge 62.

Since the distal end of the door operating lever 65 is stopped at the terminal of the slot 22d in the terminal position, it is impossible to rotate the door operating lever 65 further in the counterclockwise direction by any means. On the contrary, where the door operating lever 65 rotates together with the key shaft 66 and stops before the terminal position when the filmstrip 64 staying at the film port stops the door member 62 from being completely closed, like the embodiment shown in FIG. 19, the door operating lever 65 may be forcibly rotated further in the counterclockwise direction by hand or the like on the purpose to close the door member 63 forcibly, though the forcible rotation can damage the door member 63, the door operating mechanism or the filmstrip 64. This problem is solved by the present embodiment.

The cam member 97 further has a second sector arm 97b and a third sector arm 97c. The second sector arm 97b holds a brush contact 71 on its bottom side. The brush contact 71 brushes on printed contact patterns 72a, 72b and 72c that are formed on a printed circuit board 72 that is provided above the cartridge chamber 26. The contact patterns 72a to 72c are connected to a control circuit that is integrated in the printed circuit board 72, though the control circuit is not shown in FIG. 25. The contact pattern 72c constitutes a common contact with which the contact brush 71 keeps in contact. When the door member 63 is completely closed, the contact brush 71 comes to contact with the printed contact pattern 72a. In other positions of the door member 63, the contact brush 71 is in contact with the printed contact pattern 72b. According to this configuration, it is possible to electrically detect if the door member 63 is completely closed or not.

Figure 26:
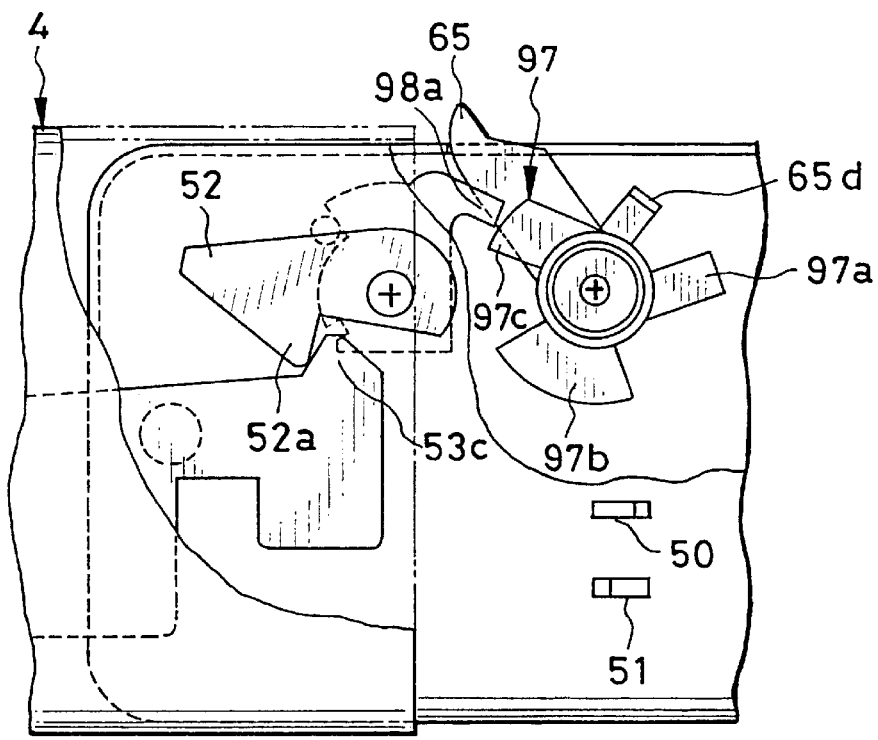
FIG. 26 is a fragmentary top plan view of the compact camera, with parts broken away, illustrating the door operating mechanism and the stopping mechanism of FIG. 25 in the safety lock position.

Adjacent to the cam member 97 is provided an interconnection lever 98 for interconnecting the door operating mechanism with the ratchet lever 52. The interconnection lever 98 is affixed to the ratchet lever 52 by a screw 77 to rotate together about the same axis. A stopper pin 79 is formed on the inside surface of the top wall of the camera housing 22, and limits counterclockwise rotation of the interconnection lever 98. A coiled spring 78 is connected between the interconnection lever 98 and the stopper pin 79 to urge the interconnection lever 98 to rotate counterclockwise, so that the interconnection lever 98 is in contact with the stopper pin 79 without any external force other than the force of the spring 78, as shown in FIG. 26. This position will be called an initial position of the interconnection lever 98. In the initial position, the ratchet 52a of the ratchet lever 52 is in a course LA of the protrusion 53c of the locking plate 53, so that the protrusion 53c strikes against the ratchet 52a when the camera case 4 moves from the working position to the safety lock position.

The interconnection lever 98 has a nose 98a extending toward the cam member 97. When the camera case 4 is slid to a position to uncover the door operating lever 65, if a filmstrip remains in the film port and stops the door member 63 from being closed, the cam member 97 stops at a position as shown in FIG. 26, though the door operating lever 65 reaches its terminal position. In this position, the nose 98a of the interconnection lever 98 faces a distal end of the third arm 97c of the cam member 97, so that the interconnection lever 98 is stopped by the third arm 97c from rotating clockwise. Therefore, the ratchet lever 52 cannot rotate clockwise even if a force to rotate the ratchet lever 52 in the clockwise direction is applied through the protrusion 53c as the photographer tries to slide the camera case 4 further in the uncovering direction B in this condition. In this way, the camera case 4 is locked in the safety lock position when the filmstrip is not completely wound into the photo film cartridge 62.

Figure 27:
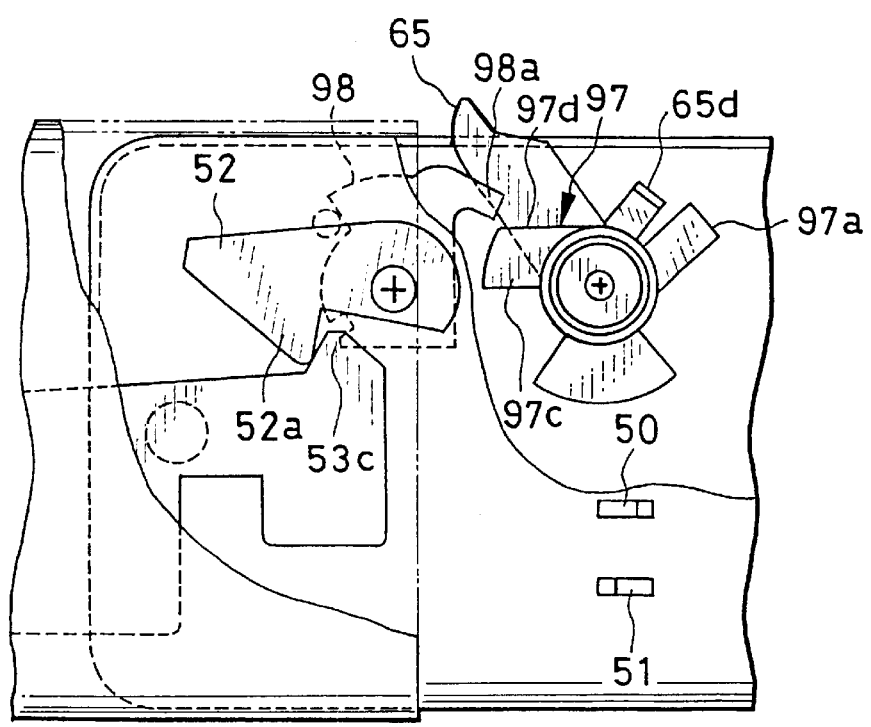
FIG. 27 is a view similar to that of FIG. 26 and illustrates the parts in a position where the camera case is released from the safety lock position.

After the filmstrip is completely wound into the cartridge 62, the door member 63 and thus the cam member 97 rotates further in the counterclockwise direction from the position shown in FIG. 26, when the camera case 4 uncovers the door operating lever 65. As the third arm 97c of the cam member 97 is set away from the nose 98a as shown in FIG. 27, the interconnection lever 98 is allowed to rotate clockwise. Therefore, when the camera case 4 is pulled off from the safety lock position against the force of the spring 78, the ratchet lever 52 rotates clockwise and lets the protrusion 53c past the ratchet 52a. Thereafter the camera case 4 can smoothly separate from the camera body 3.

Figure 28:
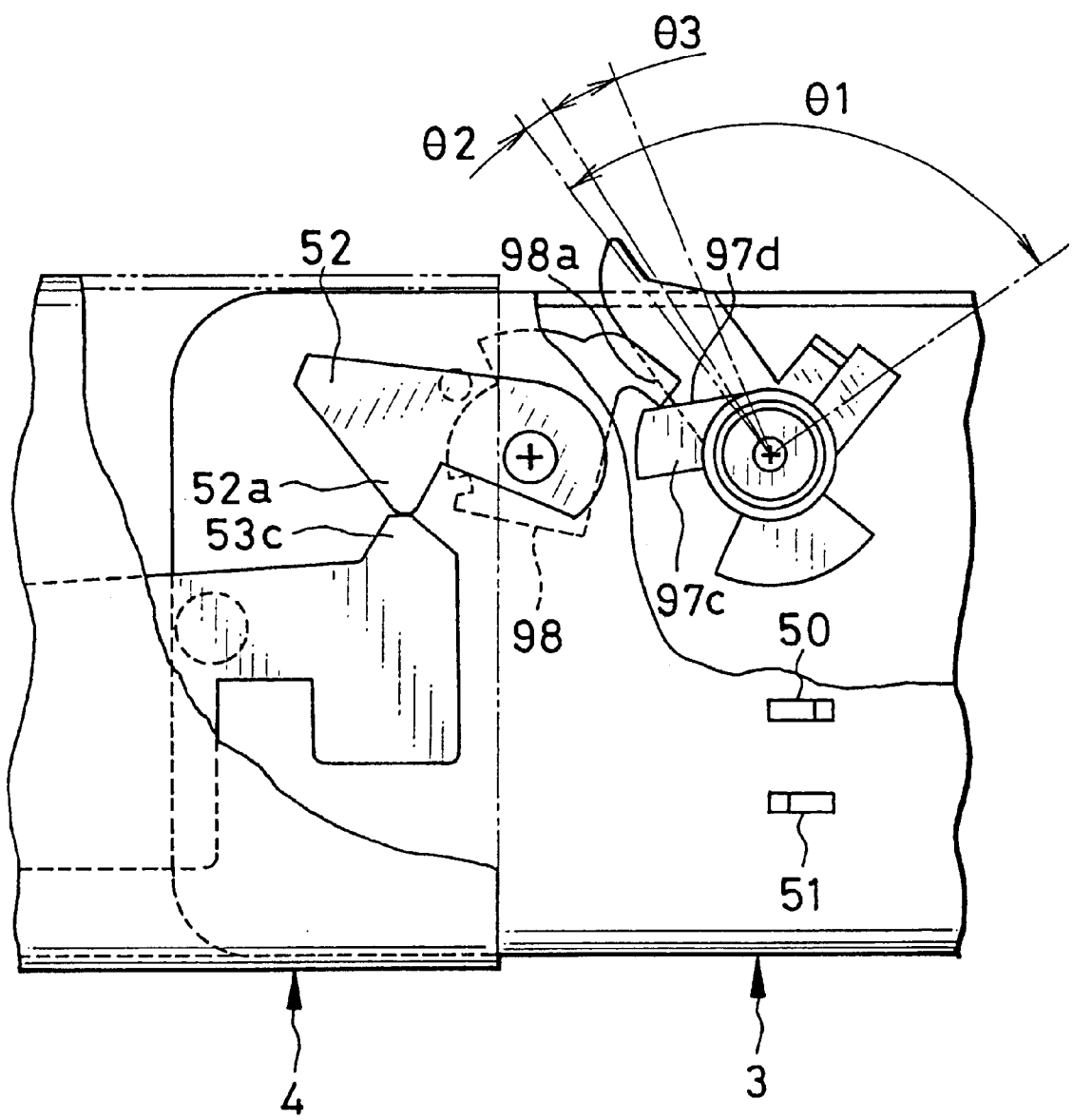
FIG. 28 is a view similar to that of FIG. 26 and illustrates the parts in a position where the door operating mechanism is rotated in a closing direction to close the door member of the photo film cartridge in cooperation with the camera case sliding from the safety lock position to the cartridge changing position.

The door member 63 may not reach the completely closed position for some reasons when the camera case 4 reaches the safety lock position even though the filmstrip is completely located inside the cartridge 62. In that case, since the interconnection lever 98 rotates clockwise together with the ratchet lever 52 as the camera case 4 is pulled away from the safety lock position, the nose 98a pushes the third arm 97c at its one side 97d to cause the cam member 97 to rotate in the counterclockwise direction and thus close the door member 63, as shown in FIG. 28. Thus, the door member 63 is forcibly closed in cooperation with the camera case 4 being pulled away from the safety lock position, if only the filmstrip does not interfere with the door member 63.

For example, the door member 63 is designed to rotate through a rotational range θ1 of about 90 degrees, within which a rotational range θ2 from 0 degrees to about 4 degrees is regarded as the completely closed position. If the door member 63 is in a rotational range θ3 from 4 degrees to about 10 degrees, the nose 98a of the interconnection lever 98 can push the side edge 97d of the third arm 97 of the cam member 97, and thus bring the door member 63 to the completely closed position when the camera case 4 is pulled off the camera body 3. Accordingly, the photo film cartridge 62 is closed light-tightly before the bottom lid 61 of the cartridge chamber 26 is opened.

Figure 29:
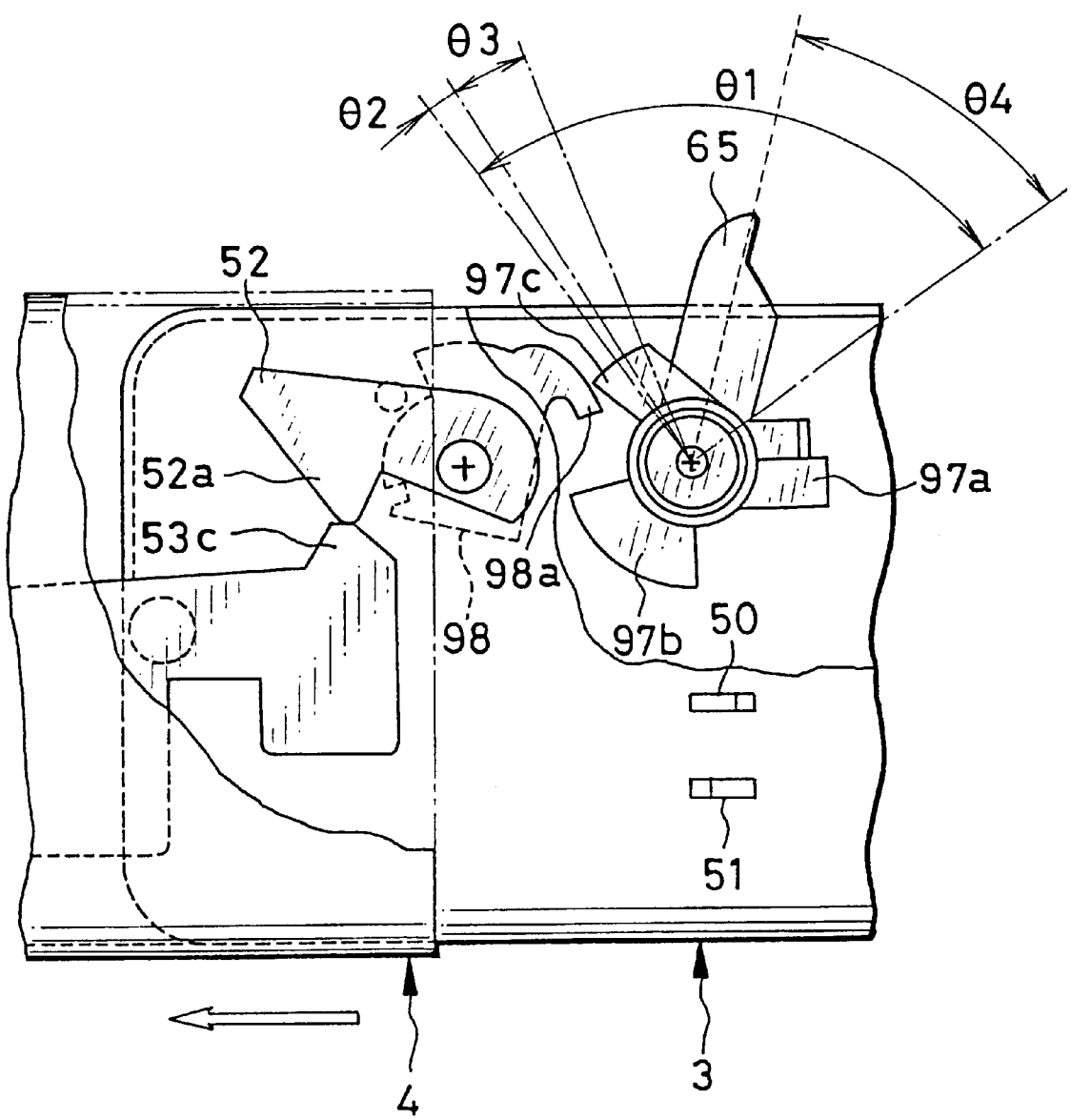
FIG. 29 is a view similar to that of FIG. 26 and illustrates the parts in a position where the door operating mechanism is forcibly rotated in an opening direction to open the door member in order to release the camera case from the safety lock position.

It is possible to manually unlock the camera case 4 from the ratchet lever 52 in the safety lock position for mending or the like, even where the door member 63 is open and the cam member 97 stops at the position as shown in FIG. 26. That is, the door operating lever 65 may be manually rotated clockwise into an unlocking range θ4 as shown in FIG. 29. In this position, the arm 65d pushes the first arm 97a of the cam member 97 in the clockwise direction, so that the third arm 97c is displaced from the nose 98a of the interconnection lever 98, and the nose 98a confronts a recess between the third arm 97c and the second arm 97b of the cam member 97. Thus, the interconnection lever 98 is allowed to rotate clockwise, and the ratchet lever 52 is allowed to disengaged from the protrusion 53c. Since the clockwise rotation of the door operating lever 65 corresponds to the opening direction of the door member 63, this manual unlocking operation does not damage the door member 63, the key shaft 66 or the filmstrip.

Figure 30:
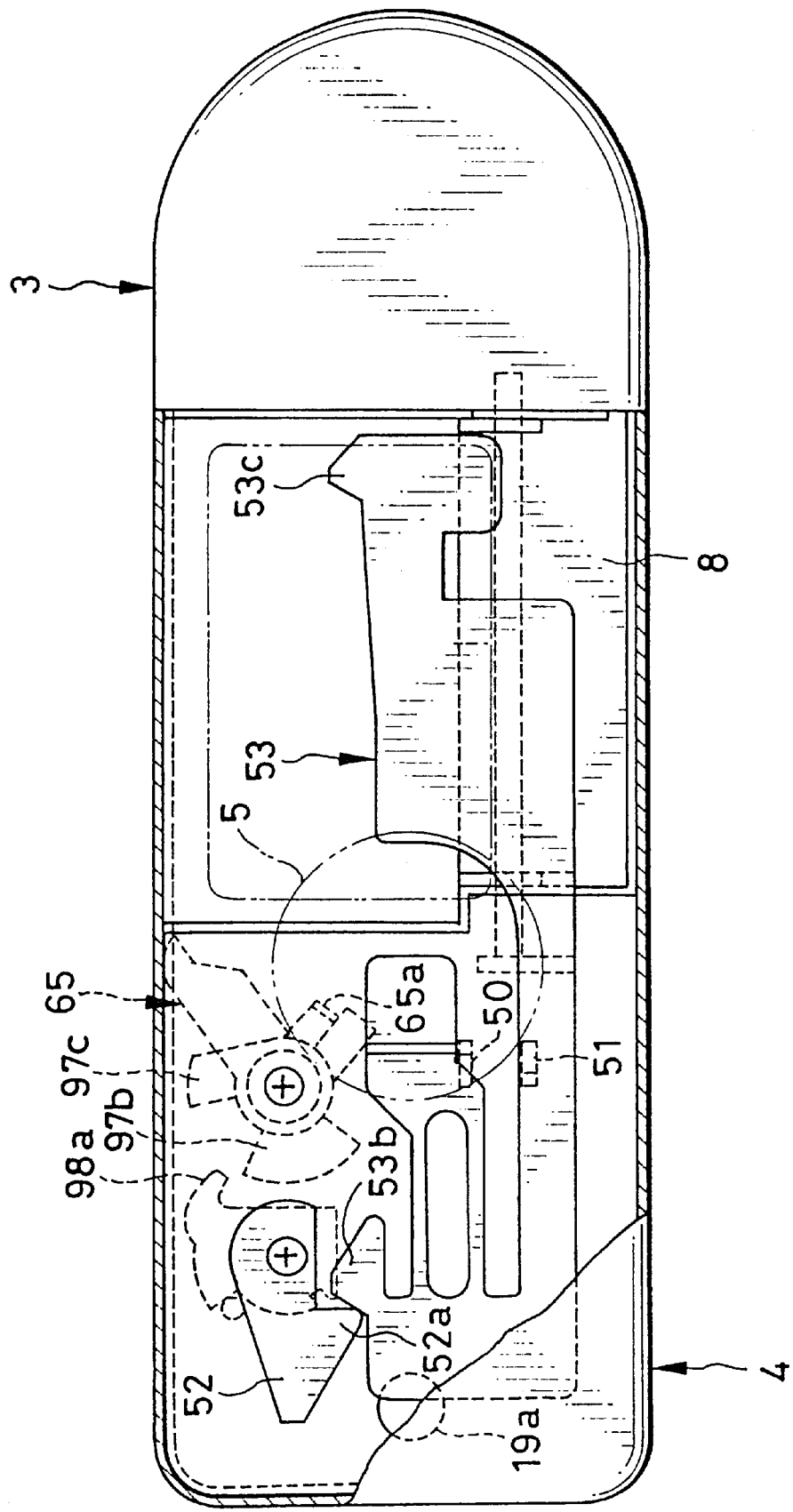
FIG. 30 is a top plan view of the compact camera, with parts broken away, illustrating the door operating mechanism and the stopping mechanism in the resting position, according to the embodiment shown in FIG. 26.

FIG. 30 shows the relationship between the interconnection lever 98 and the cam member 97 in the resting position of the camera case 4. As described above, the cam member 97 is pushed by the arm 65d of the door operating lever 65 to rotate in the clockwise direction when the door operating lever 65 is pushed by the edge 4a of the camera case 4 sliding in the covering direction. As a result, the nose 98a of the interconnection lever 98 confronts the recess between the third arm 97c and the second arm 97b of the cam member 97 in the working position and in the resting position. Therefore, the ratchet lever 52 can rotate clockwise in these positions. Therefore, the ratchet 52a gets over the inner protrusion 53b of the locking plate 53 while the camera case 4 slides from the working position to the resting position, and holds the camera case 4 in the resting position under the force of the spring 78.

Figure 31:
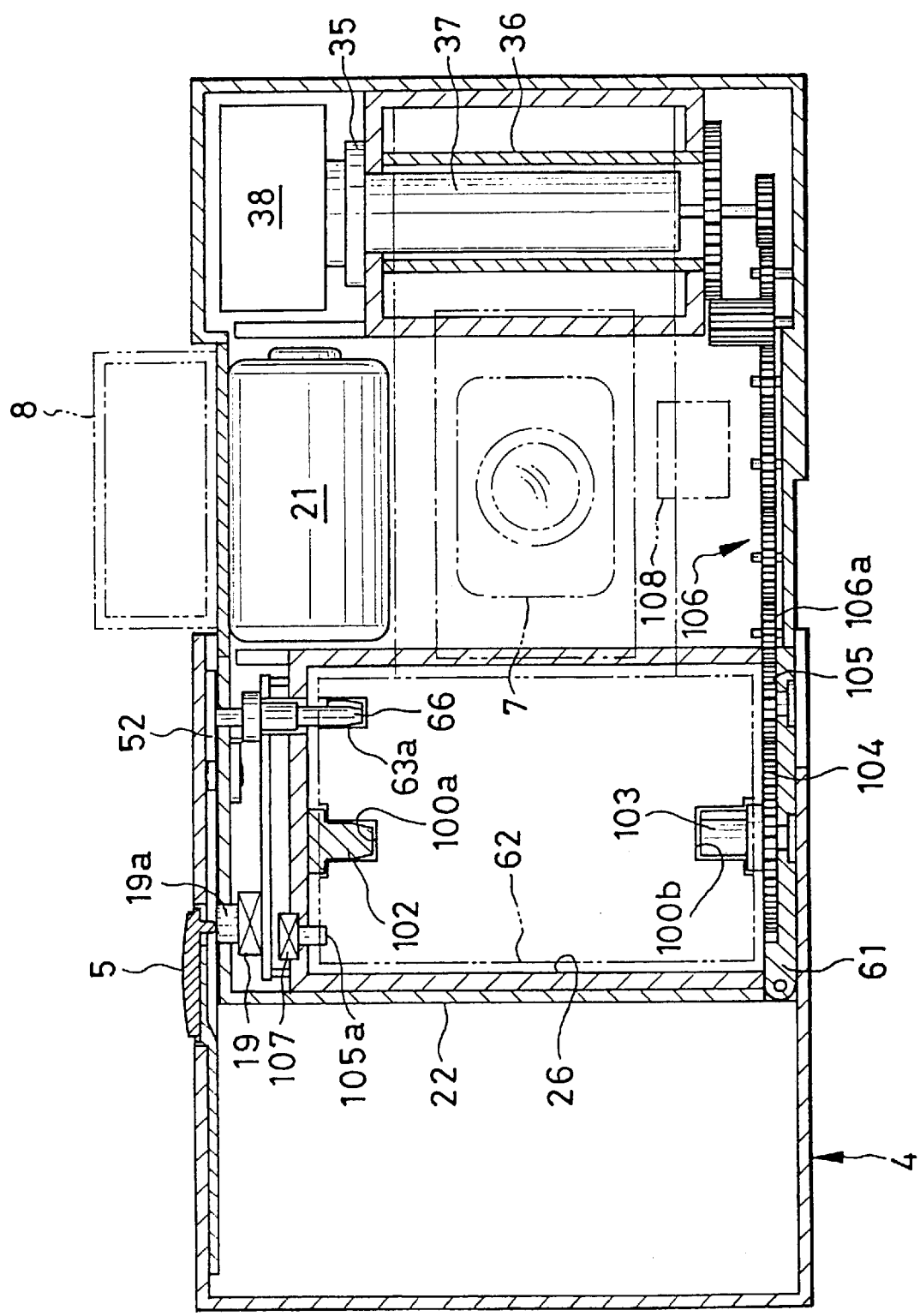
FIG. 31 is a sectional view of the compact camera in the working position.

FIG. 31 shows a film advancing mechanism and several switches necessary for controlling driving the film advancing mechanism. A bearing shaft 102 is provided on the inside of the upper wall of the cartridge chamber 26, whereas a drive shaft 103 is provided on the inside of the bottom lid 61 of the cartridge chamber 26. When the photo film cartridge 62 is put into the cartridge chamber 26, a key hole 100a of a spool 100 of the photo film cartridge 62, see FIG. 18, is fitted on the bearing shaft 102, and the key hole 63 of the door member 63 is fitted on the key shaft 66 that protrudes into the cartridge chamber 26. Thereafter when the bottom lid 61 is closed, the drive shaft 103 is fitted in another key hole 100b of the spool 100 of the photo film cartridge 62.

The drive shaft 103 is secured to a drive gear 104, and the drive gear 104 and a connecting gear 105 are rotatably mounted on the inside of the bottom lid 61. The connecting gear 105 interconnects the drive gear 104 with a power transmission mechanism 106 when the bottom lid 61 is closed. When the bottom lid 61 is closed, the connecting gear 105 meshes with an end gear 106a of the power transmission mechanism 106 that is provided in the bottom of the camera housing 22. The power transmission mechanism 106 transmits the driving power of the film winding motor 37 either to the drive shaft 103 or to the take-up spool 36. The take-up spool 36 is rotatably attached to the outside of the film winding motor 37.

The power transmission mechanism 106 rotates the spool 100 of the photo film cartridge 62 in a film advancing direction to advance the photo filmstrip 64 out of the photo film cartridge 62. After the advanced photo filmstrip 64 reaches to the film take-up chamber 27 and is coiled around the take-up spool 36, the photo filmstrip 64 is wound around the take-up spool 36 by rotating the take-up spool 36 at higher speed than the advancing speed of the photo filmstrip 64. Simultaneously, the power transmission mechanism 106 disconnects the film winding motor 37 from the drive gear 104.

The end gear 106a of the power transmission mechanism 106 is slidable up down along the its rotational axis, and is urged to move downward by a not-shown spring. Thus, if a tooth of the connecting gear 105 collides with a tooth of the end gear 106a when the bottom lid 61 is closed, the end gear 106a moves upward by the pressure applied from the connecting gear 105. Accordingly, the bottom lid 61 may be closed regardless of the stop positions of these gears 105 and 106a. Thereafter when the end gear 106 is rotated by the film winding motor 37, the end gear 65 is brought into a state of capable of meshing with the connecting gear 105, so the end gear 106a slides downward under the urging force of the spring, and meshes with the connecting gear 105.

Figure 32:
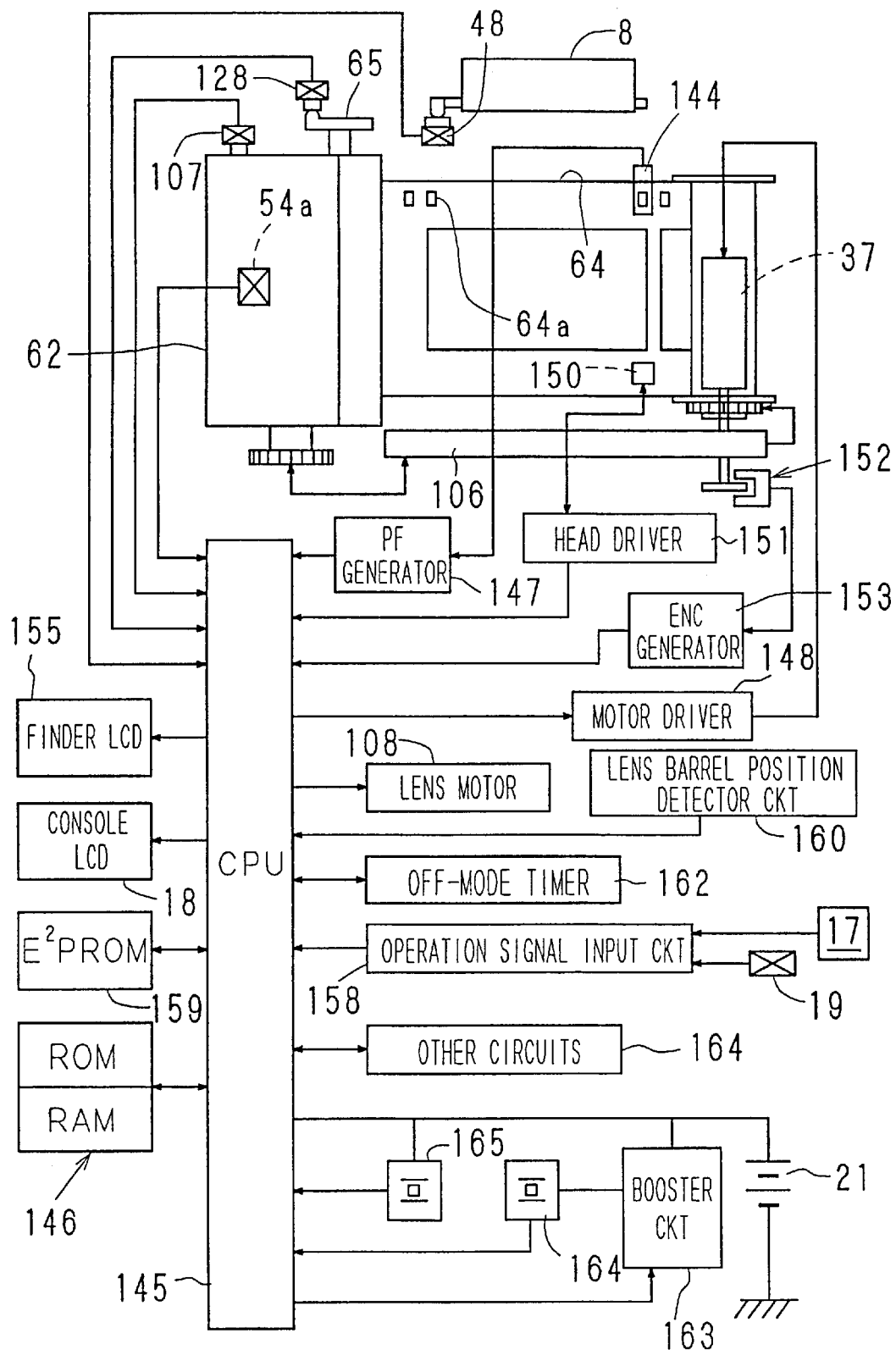
FIG. 32 is a block diagram illustrating the circuitry of the compact camera.

A cartridge detection switch 107 is provided in the top wall of the cartridge chamber 26. The cartridge detection switch 107 is a micro switch which is turned on when a button 107a is depressed by the photo film cartridge 62 as it is completely loaded in the cartridge chamber 26. A detection signal from the cartridge detection switch 107 is sent to a CPU 145, as shown in FIG. 32. Thus, it is electrically detected that the photo film cartridge 62 is completely loaded in the cartridge chamber 26. Designated by 108 is a lens motor which is used for driving the lens barrel 7 to move back and forth, as well as for focusing the taking lens 6. If the taking lens 6 is a zoom lens, the lens motor 108 is used for zooming. When the main switch 48 is turned on, the lens motor 108 drives the lens barrel 7 to protrudes out of the camera housing 22. When the main switch 48 is turned off, the lens motor 108 drives the lens barrel 7 to retract into the camera housing 22.

A camera case detection switch 54a is actuated through the projection 54. When the camera case 4 is separated from the camera body 3, the camera case detection switch 54a is turned off, and the lens motor 108 drives the lens barrel 7 to retract into the camera housing 22. When the camera case 4 is attached to the camera body 3, the camera case detection switch 54a is turned on and sends out a camera case detection signal to the CPU 145. Thereafter when the door operating lever 65 is rotated fully in the opening direction, a door opening detection switch 128 is turned on to send out a door opening detection signal to the CPU 145.

A bar code sensor and a spool sensor are provided in the top wall of the cartridge chamber 26, though they are not shown in the drawings. The bar code sensor reads bar code on a bar code disc 109 that is integrated into the photo film cartridge 62, see FIG. 18, and rotates together with the spool 100 of the photo film cartridge 62. The spool sensor detects a rotational position of the spool 100 by detecting a notch of the bar code plate 109. Because these sensors are well-known in the art, and are already used in several IX240 type cameras, for example, "EPION 250Z" (trade name, manufactured by Fuji Photo Film Co. Ltd.), the detail description thereof is omitted. Although it is not shown in the drawings, an indicator disc is securely coupled to the spool 100. The indicator disc is observed through one of four indication windows that are formed through the bottom face of the photo film cartridge 62 and represent four states of usage of the filmstrip 64 of the photo film cartridge 62: unexposed, partly exposed, fully exposed, and developed. Therefore, each after the filmstrip 64 is fully rewound into the cartridge shell, rotational angle of the spool 100 is adjusted to stop the indicator disc behind one of the indication windows that represents the present state of the filmstrip 64.

Responsive to the cartridge detection signal, the camera case detection signal and the door opening detection signal, the film winding motor 37 starts rotating the spool 100 of the photo film cartridge 62 in a rewinding direction reverse to the film advancing direction. While the spool 100 is rotated in the rewinding direction, information on the photo film cartridge 62 is read from the bar code of the bar code disc 109. Because the initial position of the spool 100 and thus the bar code disc 109 indicates the state of usage of the photo film cartridge 62, it is possible to check by the initial position of the bar code disc 109 whether the photo film cartridge 62 is usable or not.

After the film data is read from the bar code disc 109, the film winding motor 37 starts rotating the spool 100 and the take-up spool 36 of the camera 2 in the film advancing direction. A photo sensor 144 is provided in a film passageway, for detecting perforations 64a of the filmstrip 64. Because the perforations 64a are formed in correspondence with leading and trailing edges of each frame recording area, an initial frame recording area is positioned behind the exposure aperture 25 when the film winding motor 37 stops upon first detection of the perforation 42a. To advance the filmstrip 64 by one frame, the film winding motor 37 is driven until the photo sensor 144 detects succeeding two perforations 42a.

The CPU 145 executes the above described start frame setting and one-frame advancing according to a sequence program stored in a ROM section of a memory 146. Detection signals from the photo sensor 144 are subjected to waveform shaping through a PF generator 147, and are sent to the CPU 145. The CPU 145 controls the film winding motor 37 through a motor driver 148.

A transparent magnetic recording layer is provided on the back surface of the filmstrip 64, so data of each exposed frame, e.g. the date of photography and exposure conditions, is recorded on the filmstrip 64 through a magnetic head 150 during the one-frame advancing. The magnetic head 150 is driven by a head driver 151. To synchronize the magnetic recording with the film advancing, the rotational speed of the film winding motor 37 is monitored by an encoder 152, and the magnetic head 150 is driven synchronously with intervals of encoder pulses that are generated from an ENC generator 153 based on detection signals from the encoder 152. The magnetic head 150 also reads out data from the magnetic recording layer, to discriminate exposed frames from unexposed frame recording areas. Therefore, the camera 2 can work even when some of the frame recording areas of the filmstrip 64 of the loaded photo film cartridge 64 are previously exposed.

As described above, the shutter button 5 is disposed above the release switch 19 when the camera case 4 is slid to the working position, and the button member 19a of the release switch 19 is pressed down when the shutter button 5 is pressed down. The release switch 19 is a micro switch that is pressed in two steps. At the first step of the micro switch 19 where the button member 19a is depressed halfway, focusing and photometry are performed. That is, a subject distance is measured through the light emitting and light receiving windows 13 and 14 to measure the distance to the object. Simultaneously, a subject brightness is measured through the photometric window 12. Based on the measured subject distance, focusing of the taking lens 6 is performed by driving the lens motor 108. At the same time, a shutter speed and an aperture stop size are determined based on the measured subject brightness. At the second step of the micro switch 19 where the button member 19a is fully depressed, shutter release is performed at the determined shutter speed and aperture stop size.

As described above, the main switch 48 is turned on when the flash projector 8 springs up to the flashing position after the camera case 4 is slid from the resting position to the working position. Then, the lens barrel 7 is protruded forward from the camera body 3, and the CPU 145 is switched from an OFF mode to a photo mode where a photograph sequence is executed.

In the photo mode, the console LCD 18 displays present date and time and presently selected several photographic conditions. The information displayed on the console LCD 18 is recorded on a position allocated to each exposed frame. According to the present embodiment, the control panel 17 consists of four push buttons 17a to 17d. In the photo mode, the following functions are assigned to these push buttons 17a to 17d:

a) The push button 17a functions as a flash mode switch. Its default state is an auto-flash mode where the flash device automatically fires if the measured subject brightness is below a predetermined level. Upon each pressing, the flash mode is cyclically switched over between a pre-flash mode where a pre-flashing is made to prevent red-eye phenomenon, that is, light is projected before a main flashing made synchronously with the exposure, an active-flash mode where the flash device is always activated at each exposure, a non-flash mode where the flash device is deactivated, a landscape mode where the flash device is deactivated and the taking lens is focused on an infinity, and a night photography mode where the flash device makes the pre-flashing and the main flashing at each exposure.

b) The push button 17b functions as a self mode switch. In its default state, a self-timer is off. Upon each pressing of the push button 17b, the self-timer is alternately turned on and off. The self-timer starts counting upon each full depression of the shutter button 5.

c) The push button 17c functions as a print format switch. In its default state, a high-vision (H) size print is selected. Upon each pressing of the push button 17c, the print format is cyclically switched over between the H size, a conventional (C) size, and a panoramic (P) size. It is to be noted that the frame recording area of the IX240 type filmstrip 64 has an aspect ratio that corresponds to that of the H size print. If the C size or the P size is selected by the push button 17c, a C size print or a P size print is made by masking an H size frame.

d) The push button 17d functions as a rewinding switch. When the push button 17d is pressed for two seconds, the film winding motor 37 starts rewinding the filmstrip 64 into the cartridge shell.

The finder unit 38 is provided with a finder LCD 155 that displays a finder frame within a field of view of the view finder 11. The size of the finder frame varies according to the print format selected by the push button 17c of the control panel 17.

Besides the ON-OFF conditions of the door opening detection switch 128, the camera case detection switch 54a, the cartridge detection switch 107, and the main switch 48, the CPU 145 also monitors operations signals from the release switch 19 and the control panel 17 through an operation signal input circuit 158. The lens motor 108 is controlled by the CPU 145 based on signals from a lens barrel position detector circuit 160.

An OFF-mode timer 162 starts counting a predetermined time duration, e.g. five minutes, each time the camera 2 is switched to the photo mode. If no operation signal is input through the operation signal input circuit 158 while the OFF-mode timer 162 counts up to the predetermined time, the OFF-mode timer 162 inputs an OFF-mode signal to the CPU 145. Upon the OFF-mode signal, the camera 2 is reset to the OFF mode, as set forth in detail below.

When the main switch 48 is turned off in the photo mode, the camera 2 is switched to a sub mode. In the sub mode, the push buttons 17a to 17c of the control panel 17 have different functions from those in the photo mode. Also when the camera 2 is switched to the sub mode, the OFF-mode timer 162 starts counting a predetermined time duration, e.g. five minutes. If no operation signal is input through the operation signal input circuit 158 while the OFF-mode timer 162 counts up to the predetermined time, the OFF- mode timer 162 inputs the OFF-mode signal to the CPU 145.

In the sub mode, the following functions are assigned to the push buttons 17a to 17d:

a) The push button 17a functions as a date format selection switch. In its default state, the present date is displayed and recorded in a format of year/month/day. Upon each pressing of the push button 17a, the date format is cyclically switched over between "year/month/day", "month/day/year", "day/month/year", "time" and "no date display no date recording format". If the push button 17a is pressed for two seconds, the console LCD 18 is switched from a default date display mode to a date correction mode. If the push button 17a is pressed in the date correction mode, the console LCD 18 is reset to the date display mode.

b) The push button 17b functions as a digit selection switch in the date correction mode. In its default state, "year" is selected as the digit to correct. Upon each pressing of the push button 17b, the digit to correct is cyclically switched over between "year", "month", "day", "hour" and "minute". The digit to correct is indicated by displaying it in a winking fashion.

c) The push button 17c functions as a date correction switch in the date correction mode. Upon each pressing of the push button 17c, the numerical value of the selected digit is incremented one by one. If the push button 17c is pressed for one second, the numerical value of the selected digit is incremented successively at intervals of 125 msec.

d) The push button 17d functions as the rewinding switch in the same way as in the photo mode.

If the CPU 145 detects a change in switching condition of the main switch 48 or that of the door opening detection switch 128 in the date correction mode, the "year", "month", "day", "hour" and "minute" displayed on the console LCD 18 at that moment are fixed, and "second" data, as clock data for date-counting, is reset to "0". Thus the date correction mode is terminated.

While executing the sequence program, the CPU 145 activates other circuits 164 and monitors these circuits 164, including a motor for driving a program shutter of a shutter device, the automatic exposure control circuit, the AF circuit, a flash circuit of the flash device, and other circuits necessary for photography. Flags indicating conditions of these circuits 164 and other elements, the photometric data, data of the measured subject distance and other data are temporarily stored in a RAM section of the memory 46, and are referred to by the CPU 145 during the sequential operation.

Predetermined reference data and regulation data are previously stored in EEPROM 159 in the factory, and are referred to by the CPU 145, for example, for calculating a shutter speed and a subject distance from the photometric data and the subject distance data. Also those data and flags which are required to remain after the main switch 48 is turned off are stored in the EEPROM 159. Error data for classifying errors and malfunctions that may occur during the operation of the compact camera 2 and history data such as the number of exposed frames may also be stored in the EEPROM 159.

Figure 33:
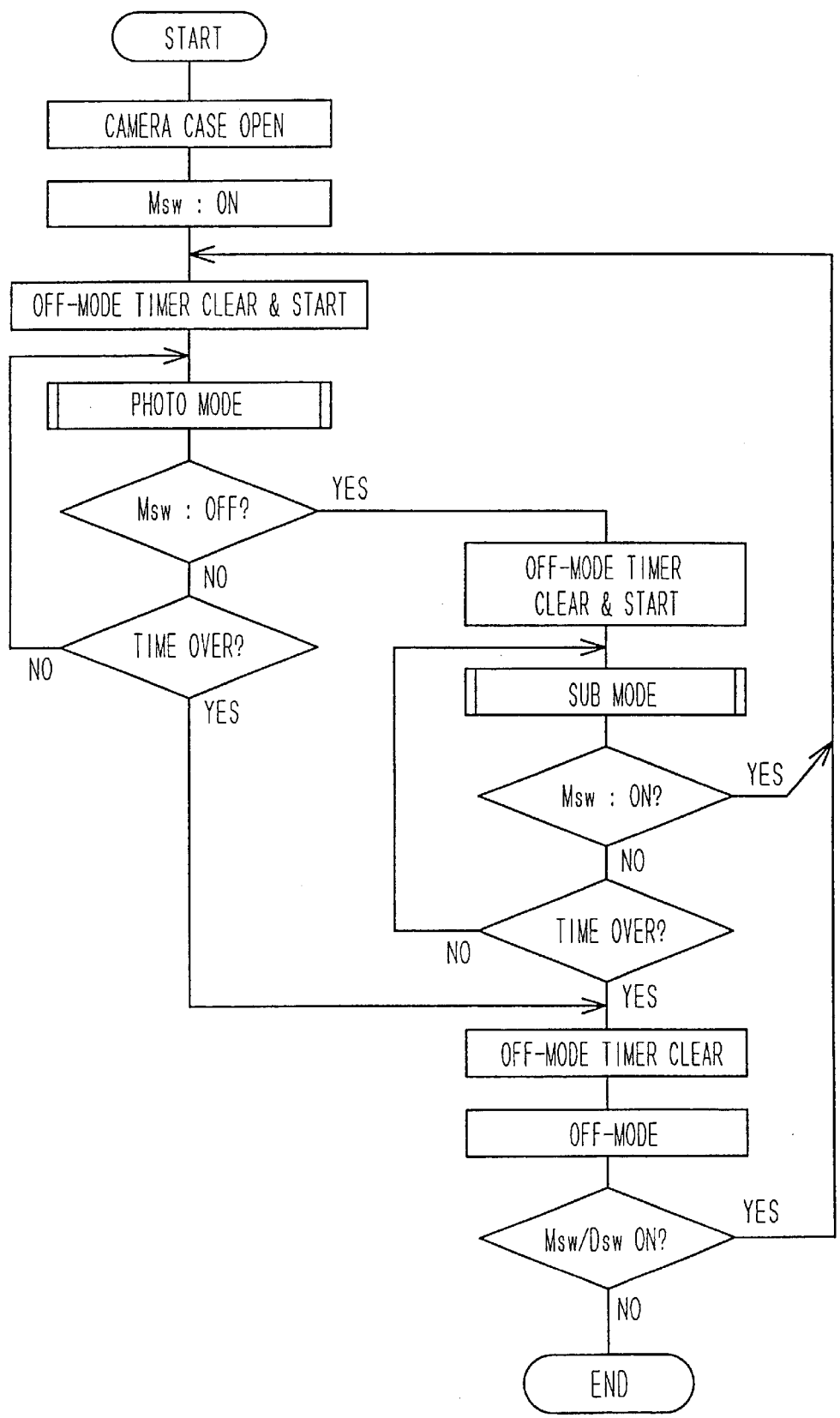
FIG. 33 is a flow chart illustrating a mode switching process of the compact camera.

Now the operation sequence for mode-switching of the compact camera 2 will be described in detail with reference to FIG. 33, wherein "Msw", "Dsw", "Bsw" and "Csw" respectively represent the main switch 48, the door opening detection switch 128, the camera case detection switch 54a and the cartridge detection switch 107.

When the camera case 4 is slid from the resting position to the working position, and the flash projector 8 is released from the confinement of the camera case 4, the flash projector 8 automatically moves to the flashing position according to the force of the spring 46, see FIG. 10. When the flash projector 8 reaches the flashing position, the main switch 48 is turned on. Upon the main switch 48 being turned on, the CPU 145 clears the OFF-mode timer 162, and lets the OFF-mode timer 162 start counting. Simultaneously, the CPU 145 activates a booster circuit 163 to boost up a power source voltage from the battery 21, and drives an oscillator 164 with the boosted voltage. This is because the battery 21 a lithium ion battery of 3 V, whereas the oscillator 164 needs a drive voltage of 5 V. The oscillator 164 generates an oscillation signal of 4 MHz, and a clock signal of 500 KHz is obtained from the signal from the oscillator 164. Thus, the CPU 145 operates at a high speed in the photo mode on the basis of the clock signal of 500 KHz.

In the photo mode, it is possible to take pictures by operating the shutter button 5, and also set up appropriate photographic conditions by operating the push buttons 17a to 17c, or rewind the filmstrip 64 into the cartridge shell by operating the push button 17d. Also the flash device starts being charged when the camera 2 is switched to the photo mode. If any of the main switch 48, the camera case detection switch 54a, the cartridge detection switch 107, and the door opening detection switch 128 changes its switching condition, the CPU 145 responds appropriately as set forth in detail later. Each time an operation signal is entered through the operation signal input circuit 158, i.e. from any of the push buttons 17a to 17c and the release switch 19, or any of the main switch 48, the camera case detection switch 54a, the cartridge detection switch 107 and the door opening detection switch 128 changes its switching condition in the photo mode, the OFF-mode timer 162 is cleared and restarts counting from zero.

If none of the main switch 48, the camera case detection switch 54a and the door opening detection switch 128 changes its switching condition, and none of the push buttons 17a to 17c and the release switch 19 is operated before the OFF-mode timer 162 counts up to the predetermined time, i.e. five minutes in this instance, the OFF-mode timer 162 is cleared, and the camera 2 is reset to the OFF mode. In the OFF mode, the CPU 145 does not monitor the release switch 19, so the operation on the shutter button 5 does not make any effect. In the OFF mode, the console LCD 18 and the finder LCD are both turned off.

It is to be noted that in the OFF mode the CPU 145 operates at a low speed on the basis of a clock signal of 16 KHz that is obtained from an oscillation signal of 35 KHz that is generated from another oscillator 165. Because the oscillator 165 can be driven by the power source voltage of 3 V, the booster circuit 163 is deactivated in the OFF mode. Accordingly, power consumption is reduced in the OFF mode compared to the photo mode.

By turning off and then turning on the main switch 48 again in the OFF mode, the camera 2 is set to the photo mode again. Also when the door opening detection switch 128 is turned on in the OFF mode, that is, when the door member 63 is opened in the OFF mode, the camera is switched to the photo mode.

If the main switch 48 is turned off by pushing the flash projector 8 into the stowed position in the photo mode before the OFF-mode timer 162 counts up to five minutes, the OFF-mode timer 162 is cleared and restarts counting from zero, and the camera 2 is switched from the photo mode to the sub mode. In the sub mode, the booster circuit 163 is still active, and the CPU 145 operates at the high speed in the same way as in the photo mode, but the operation on the shutter button 5 is ignored like in the OFF mode. As described above, the control panel 17 functions differently in the sub mode from the photo mode, and the date format or the numerical values of the displayed date and time may be changed by operating the push buttons 17a to 17c in the sub mode. Each time any of the push buttons 17a to 17d is operated, the OFF-mode timer 162 restarts counting from zero.

If the main switch 48 is turned on in the sub mode, the camera 2 returns to the photo mode, and the OFF-mode timer 162 is cleared and restarts counting from zero. Also in the sub mode, if none of the main switch 48, the camera case detection switch 54a and the door opening detection switch 128 changes its switching condition, and none of the push buttons 17a to 17c and the release switch 19 is operated before the OFF-mode timer 162 counts up to five minutes, the OFF-mode timer 162 is cleared, and the camera 2 is reset to the OFF mode.

Since the camera 2 is switched over between the photo mode and the sub mode simply by pushing the flash projector 8 into the stowed position or by releasing the flash projector 8 from the pressure, it is unnecessary to provide a specific operation member for switching over between the photo mode and the sub mode. Moreover, it is easy to discriminate between the photo mode and the sub mode by the position of the flash projector 8.

If the camera case 4 is removed from the camera body 3 in the photo mode, and the photo film cartridge 62 is newly loaded in the cartridge chamber 26, and thereafter the camera case 4 is attached to the camera body 3 again, and the switching conditions of the camera case detection switch 54a, the door opening detection switch 128 and the cartridge detection switch 107 change correspondingly, the CPU 145 executes the start frame setting process. In the start frame setting, the film winding motor 37 is driven to rotate the spool 100 of the photo film cartridge 62 first in the rewinding direction. Then, the initial stop position of the bar code disc 109 is determined, and the film type is read from the bar code. After confirming that the filmstrip 64 contained in the photo film cartridge 62 is not fully exposed, the CPU 145 drives the film winding motor 37 in the film advancing direction to position a start frame behind the exposure aperture 25.

Since the compact camera 2 of the present embodiment uses IX240 type photo film cartridge 62, and the camera case 4 is used for opening and closing the door member 63 of the photo film cartridge 62 and also for shielding the cartridge chamber 26 from ambient light, the CPU 145 keeps on monitoring the switching conditions of the cartridge detection switch (Csw) 107, the camera case detection switch (Bsw) 54a and the door opening detection switch (Dsw) 128. Among the following combination patterns of the switching conditions of these switches 107, 54a and 128, the CPU 145 regards combination patterns "C" and "G" as errors, and displays an error warning on the console LCD 18.

| PATTERN | A | B | C | D | E | F | G | H |
|---|---|---|---|---|---|---|---|---|
| Csw | OFF | OFF | OFF | OFF | ON | ON | ON | ON |
| Bsw | ON | ON | OFF | OFF | ON | ON | OFF | OFF |
| Dsw | ON | OFF | ON | OFF | ON | OFF | ON | OFF |

The combination patterns "C" and "G" represent a condition where the door member 63 is open though the camera case 4 is removed from the camera body 3. For example, the camera 2 gets to be in such a condition when the door operating lever 65 is manually rotated in the opening direction. The console LCD 18 continues displaying the error warning till the camera condition changes from "C" to "A" or "D", or from "G" to "E" or "H". Because the filmstrip 64 can be fogged in the condition "G", it is preferable to rewind the filmstrip 64 into the cartridge shell if the filmstrip 64 already has exposed frames thereon. If the camera case detection switch 54a is off, that is, if the camera case 4 is removed from the camera body 3, the CPU 145 does not executes the above described start frame setting and other operations that are normally effected when the door opening detection switch 128 is turned on, that is, when the door member 63 is opened.

FIGS. 34 to 38 show operation sequences executed by the CPU 145 in response to changes in switching conditions of the main switch (Msw) 48, the door opening detection switch (Dsw) 128 and the camera case detection switch (Bsw) 54a.

Figure 34:
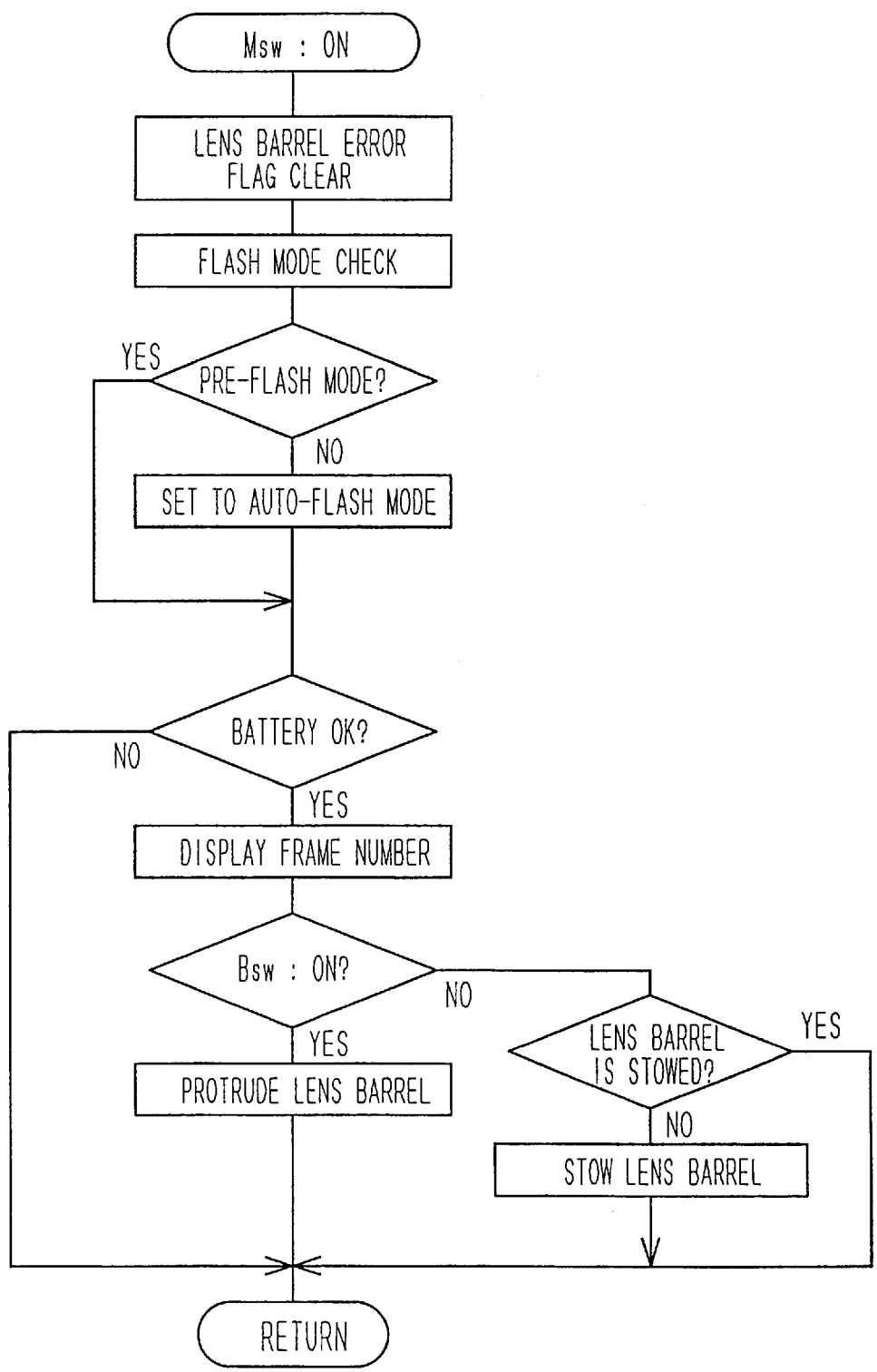

As shown in FIG. 34, when the camera 2 is set to the photo mode responsive to the main switch 48 being turned on, the CPU 145 checks if there is a lens barrel error flag. The lens barrel error flag is set when some malfunction has occurred in the preceding process of driving the lens barrel 7. If the lens barrel error flag is set, driving the lens motor 108 is banned. Therefore, the lens barrel error flag is cleared when the main switch 48 is newly turned on.

Thereafter, the CPU 145 checks what kind of flash mode is selected presently, and resets the camera 2 to the auto-flash mode except when the pre-flash mode is selected. That is, if the pre-flash mode is selected, the camera 2 is maintained in the pre-flash mode. After checking conditions of the battery 21, a frame number is read out from a frame counter that is provided in a location of the RAM section of the memory 46, and the frame number is displayed on the console LCD 18. If there is not any photo film cartridge 62 in the cartridge chamber 26, the console LCD 18 displays a cartridge mark in a winking fashion.

After checking the camera case detection switch (Bsw) 54a and confirming that the camera case 4 is attached to the camera body 3, the CPU 145 drives the lens motor 108 to protrude the lens barrel 7 out of the camera body 3. If the camera case detection switch 54a is off and the lens barrel 7 is stowed, the lens barrel motor 108 is not driven. If the camera case detection switch 54a is off and the lens barrel 7 protrudes, the lens barrel motor 108 is driven in a reverse direction to retract the lens barrel 7 into the camera body 3. Since the flash device starts being charged upon the camera 2 being switched to the photo mode, a flash charge completion flag is set when the flash device is charged up.

Figure 35:
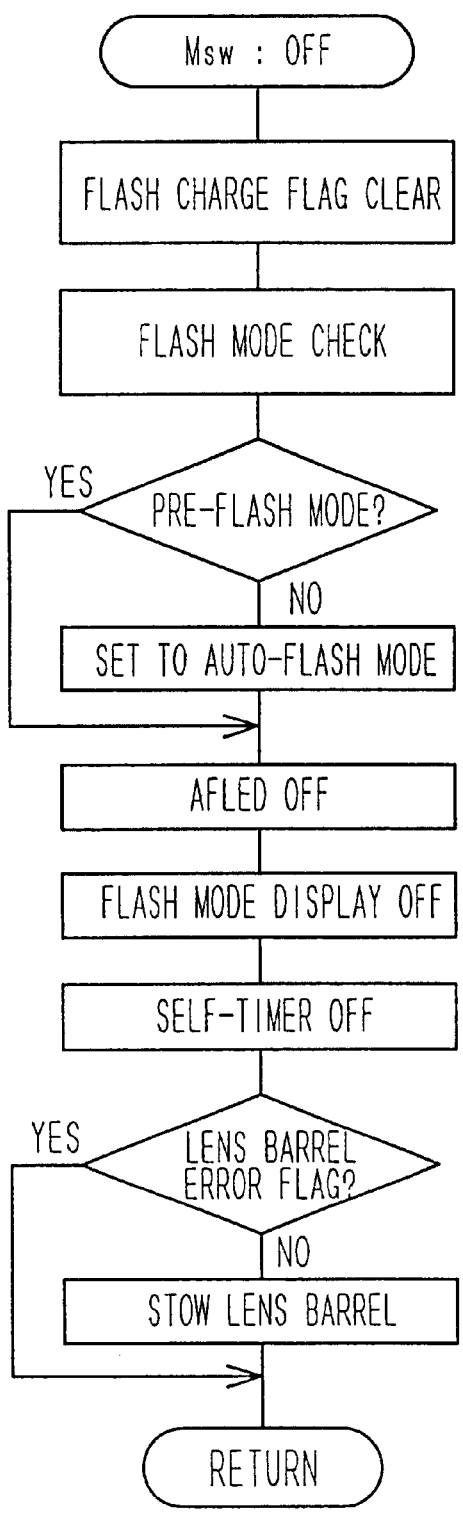
FIG. 35 is a flow chart illustrating a process executed upon the main switch being turned off.

If the main switch 48 is turned off in the photo mode, the camera 2 is switched to the sub mode, as shown in FIG. 35. If there is the flash charge completion flag at that time, the flash charge completion flag is cleared, so the flash device charging starts as soon as the main switch 48 is turned on for the next time.

Thereafter, the CPU 145 checks the presently set flash mode, and resets the camera 2 to the auto-flash mode except when the pre-flash mode is selected. If the pre-flash mode is selected, the camera 2 is maintained in the pre-flash mode. If the AF device is active and a light beam is being projected from the LED 33 through the light emitting window 13, the LED 33 is turned off. Also a flash mode indicia on the console LCD 18 is turned off. If a self-timer mode is selected at that time, the self-timer mode is canceled by turning off the self-timer. Then, the lens barrel 7 is retracted after it is confirmed that the lens barrel error flag is not set.

Since the lens motor 108 is hindered from being driven regardless of switching condition of the main switch 48 when the camera case detection switch 54a is turned off, that is, when the camera case 4 is removed from the camera body 3, unnecessary movement of the lens barrel 7 is eliminated.

Figure 36:
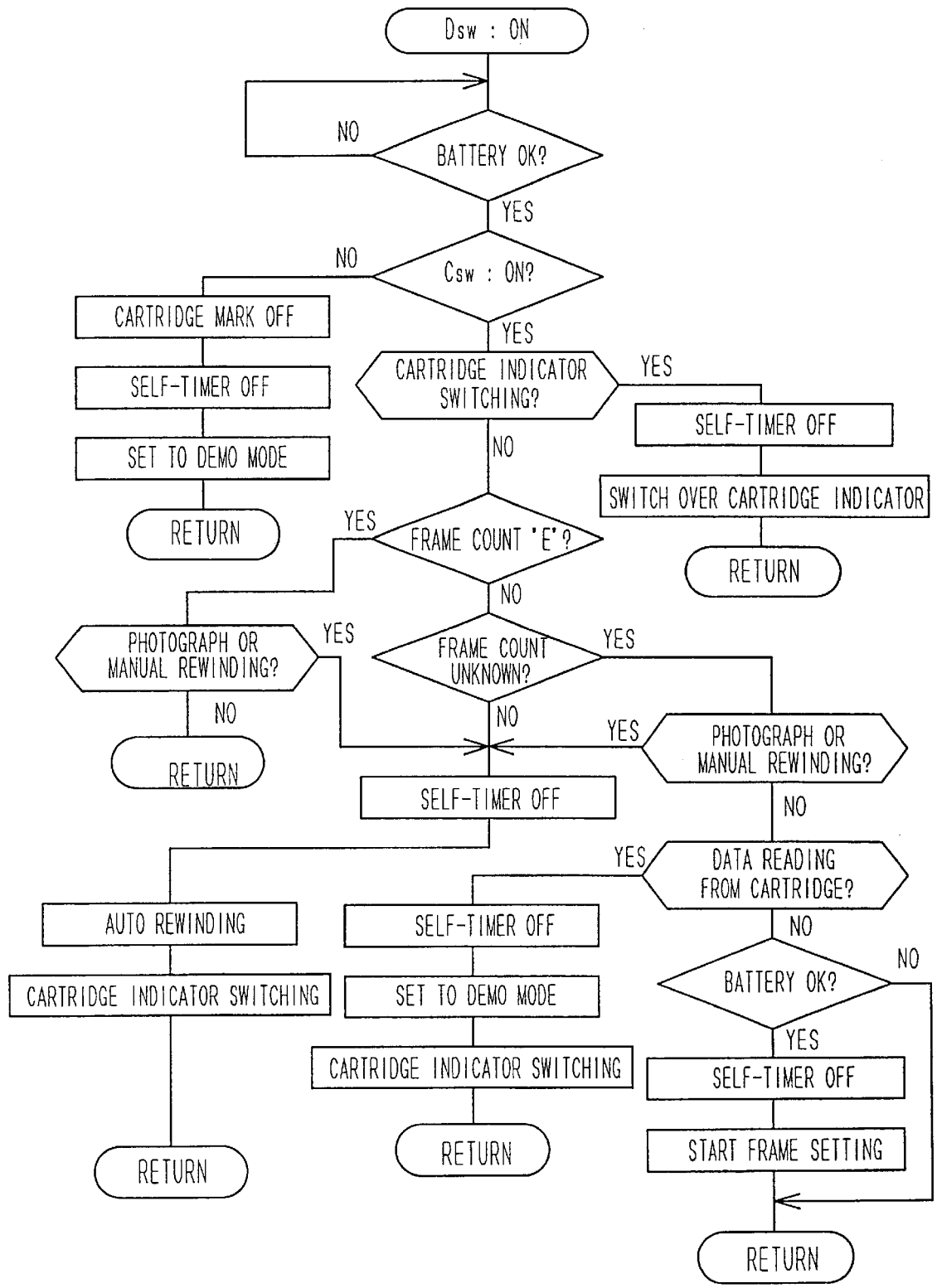

FIG. 36 shows an operation sequence that is executed when the door opening detection switch (Dsw) 128 is turned on, that is, when the door member 63 of the photo film cartridge 62 is opened by sliding the camera case 4 to an appropriate position on the camera body 3. After checking the battery 21, the CPU 145 checks switching condition of the cartridge detection switch (Csw) 107, to determine whether the photo film cartridge 62 is loaded or not. If the photo film cartridge 62 is not loaded, the cartridge mark on the console LCD 18 is turned off, and if necessary, the self-timer is turned off. Thereafter, the camera 2 is switched to a Demo mode.

In the Demo mode, the photograph sequence is executed based on demonstration data stored in the EEPROM 165, including predetermined film speed, film type and frame count number. In the Demo mode, operation on the push button 17d is ignored, and hence the film rewinding is not carried out.

If the photo film cartridge 62 is loaded, and the photo film cartridge 62 is subjected to a cartridge indicator switching process, the self-timer is turned off and the cartridge indicator switching operation is continued. In the cartridge indicator switching, the spool 100 of the photo film cartridge 62 is rotated in the rewinding direction after the entire length of the filmstrip 64 is located within the cartridge shell till the indicator disc is placed behind one of the indication windows that represents the present condition of the photo film cartridge 62.

If the photo film cartridge 62 is loaded, and the cartridge mark switching is not carried out, the CPU 145 reads out the frame number written in the frame counter.

If the frame count is "E", that is, where all available frame recording areas of the filmstrip 64 are already exposed, or if the frame count is unknown, that is, where the start frame setting is not yet carried out after the photo film cartridge 62 is newly loaded, whereas the normal photograph sequence already starts or a manual rewinding is being made responsive to the push button 17d, the CPU 145 switches over the camera 2 to an auto rewinding mode and, if necessary, turns off the self-timer. After the filmstrip 64 is completely wound into the cartridge shell, the indicator disc is positioned behind the indication window that represents that the filmstrip 64 is fully exposed.

This is a kind of error processing. The door opening detection switch 128 should not normally switch over from OFF to ON during the photograph sequence or the manual rewinding. Such a situation can occur only when the camera case 4 that is once set to the working position is moved in the uncovering direction to an extent that the camera case detection switch 54a is turned off, and thereafter moved back to the working position. In that case, light-tightness of the cartridge chamber 26 can be lowered so much that the risk of fogging the filmstrip 64 of the loaded photo film cartridge 62 is pretty high. Therefore, the filmstrip 64 is forcibly rewound into the cartridge shell, and the indicator disc is set to indicate that the photo film cartridge 62 is fully exposed. As a result, the photo film cartridge 62 becomes unusable.

Also it is not normally possible that the door opening detection switch 128 switches over from OFF to ON after some frames are exposed on the filmstrip 64 of the loaded photo film cartridge 62. Therefore, if such a situation is detected, the CPU 145 executes the same error processing as above. As a result, the filmstrip 64 is fully rewound into the cartridge shell and the indicator disc indicates that the photo film cartridge 62 is fully exposed.

If the door opening detection switch 128 switches over from OFF to ON when the frame count is unknown while the normal photograph sequence does not yet start and the manual rewinding is not made, the CPU 145 determines whether data is being read out from the bar code disc 109 of the photo film cartridge 62. If the data reading from the bar code disc 109 is carried out at that time, the CPU 145 effects an error processing, wherein the indicator disc is set to the position indicating "full-exposed". Since the normal photograph sequence does not start and thus the filmstrip 64 is not yet advanced out of the cartridge shell in this situation, film rewinding step is unnecessary in this error processing. In this way, even before the filmstrip 64 is advanced out of the cartridge shell, if light-tightness of the cartridge chamber 26 is broken for a time while the door member 63 is open, the photo film cartridge 62 is considered to be unusable.

First when the door opening detection switch 128 switches over from OFF to ON while the frame count is unknown, the normal photograph sequence does not yet start, the manual rewinding is not made, and the data reading from the bar code disc 109 is not carried out, the CPU 145 executes the above described start frame setting process after confirming that the condition of the battery 21 is adequate and, if necessary, turning off the self-timer. That is, data is read out from the bar code disc 109, the condition of the photo film cartridge 62 is detected from the rotational position of the spool 100, and thereafter the filmstrip 64 is advanced out to position a start frame behind the exposure aperture 25.

Figure 37:
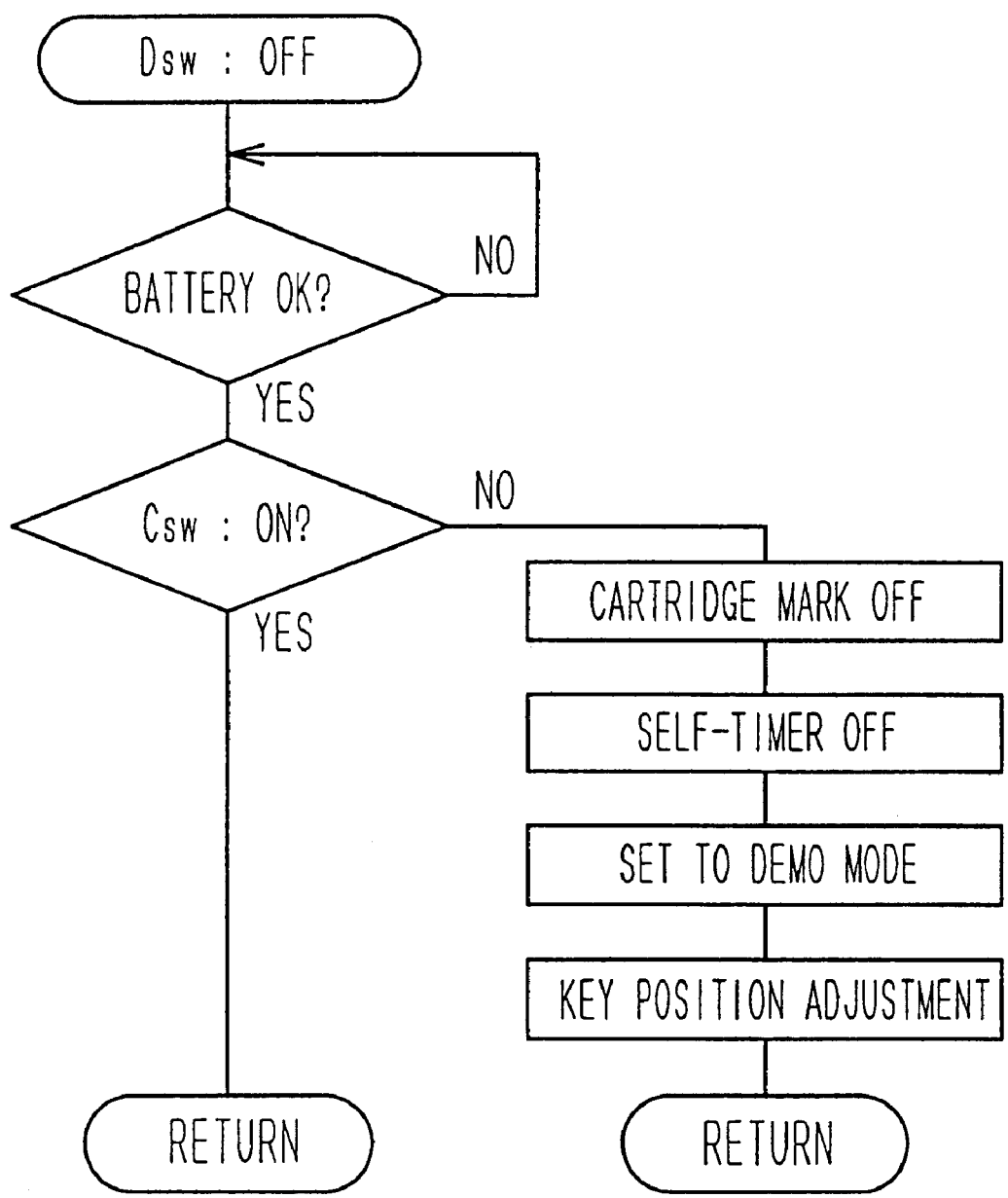
FIG. 37 is a flow chart illustrating a process executed upon the door opening detection switch being turned off.

FIG. 37 shows an operation sequence executed when the door opening detection switch (Dsw) 128 switches over from ON to OFF, that is, when the door member 62 is closed. At that time, the CPU 145 checks if the condition of the battery 21 is OK, and thereafter determines based on the condition of the cartridge detection switch (Csw) 107 if the photo film cartridge 62 is loaded in the cartridge chamber 26. If the photo film cartridge 62 is not loaded, the CPU 145 makes the steps as shown in FIG. 37. In the key position adjustment, rotational position of the drive shaft 103 is adjusted to the key hole of the spool 100 of the photo film cartridge 62 as it is unexposed and loaded in the cartridge chamber 26.

Since the interior of the cartridge chamber 26 is maintained light-tight unless the camera case 4 is pulled off to the position where the camera case detection switch 54a is turned off, it is possible to execute an error processing on the basis of the switching condition of the camera case detection switch 54a, instead of the above described error processing.

Figure 38:
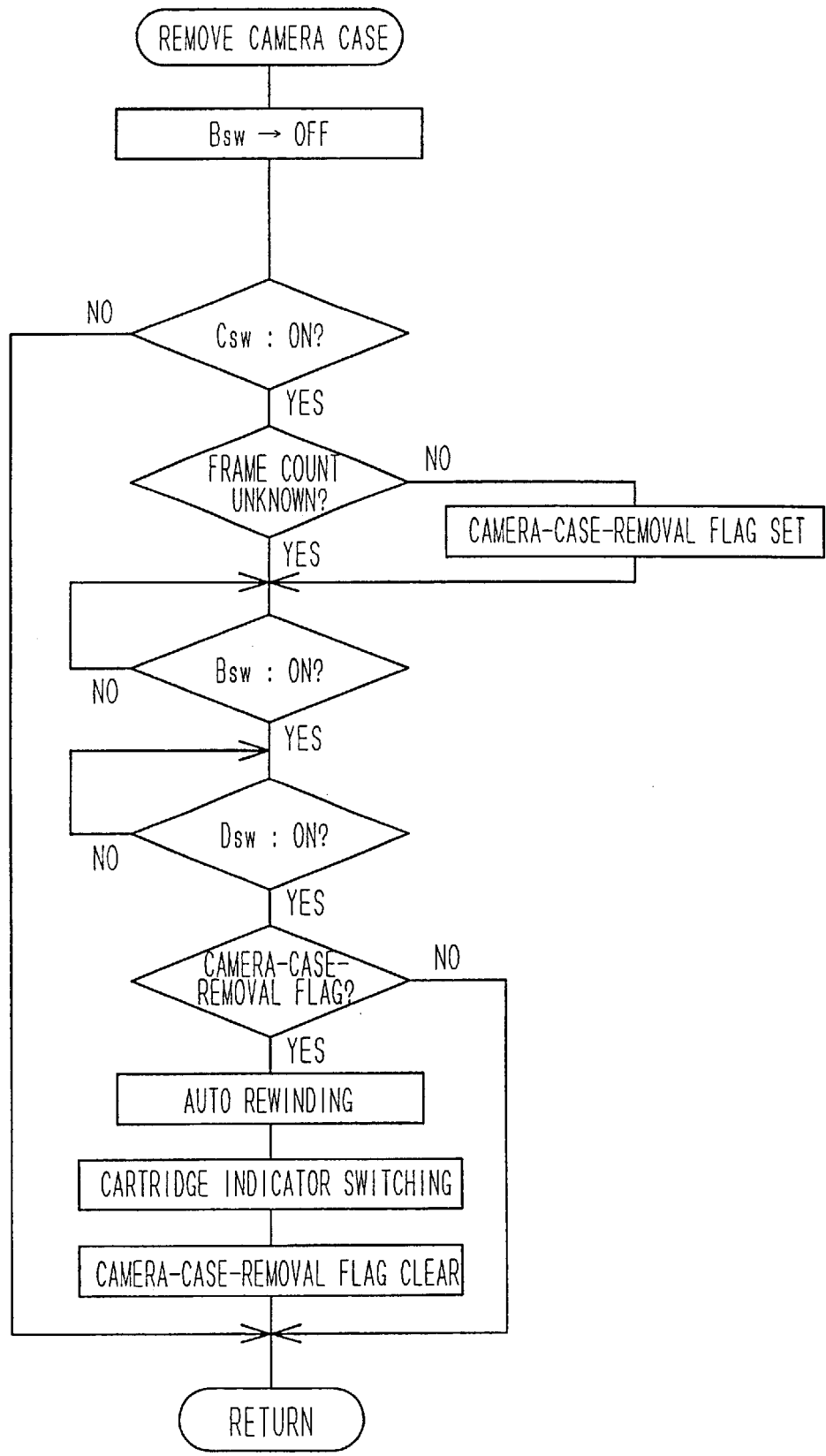
FIG. 38 is a flow chart illustrating a process executed upon removal of the camera case.

FIG. 38 shows an example of such an error processing that is executed when the camera case 4 is removed from the camera body 2 and thus the camera case detection switch (Bsw) 54a is turned off. If the photo film cartridge 62 is not loaded at that time, there is no problem if light-tightness of the cartridge chamber 26 is broken. But if the photo film cartridge 62 is loaded at that time, the same error processing as above is carried out.

To avoid redundancy, the flow chart of FIG. 38 illustrates only one case where the camera case detection switch 54a is turned off after some frames are photographed on the filmstrip 64 through the camera 2. If the camera case detection switch 54a is turned off when the number of exposed frames is written in the frame counter, a camera-case-removal flag is set in the RAM section of the memory 46. Even if the camera case 4 is attached again to the camera body 3, the CPU 145 checks if there is the camera-case-removal flag when the door opening detection switch (Dsw) 128 is turned on. If the camera-case-removal flag is present, the CPU 145 executes the auto rewinding step and, thereafter, switch over the indicator disc of the photo film cartridge 62 to the "fully-exposed" position. Thus, the photo film cartridge 62 is set to be unusable.

It is possible to check the presence of the camera-case-removal flag at a timing when the camera case detection switch 54a is turned on. As described with reference to FIG. 36, also when the frame count is "E" or unknown, it is possible to make the auto rewinding step as the error processing depending upon the camera-case-removal flag, if only the camera-case-removal flag is set when the camera case detection switch 54a is turned off while the door member 63 is open.

As described so far, according to the present invention, the main switch 48 is turned on when the flash projector 8 springs up to the flashing position by sliding the camera case 4 from the resting position to the working position. Since the camera 2 is set to the photo mode upon the main switch 48 being turned on, and is switched to the sub mode upon the main switch 48 being turned off, the camera 2 is automatically set to the photo mode by sliding the camera case 4 to the working position, and is switched to the sub mode by pushing down the flash projector 8 into the stowed position. Therefore, it is easy to know whether the camera 2 is in the photo mode or the sub mode. Since the control panel 17 takes different functions in the sub mode from those in the photo mode, the control panel 17 can be simple in construction and easy to operate.

Furthermore, when the camera 2 is left in the working position for a predetermined time without any operation, the camera 2 is automatically switched to the OFF mode, to avoid the waste of power. Since the camera 2 can be returned to the photo mode by turning off and then on the main switch 48 again by pushing the flash projector 8 into the stowed position and then releasing the flash projector 8 from the pressure, the switching operation is very handy.

In the working position as well as in the resting position, the camera case 4 also functions as a cover for preventing the bottom lid 61 of the cartridge chamber 26 from opening and also for shielding the interior of the cartridge chamber 26 in a light-tight fashion. The camera case 4 in the working position functions as a grip. Because the camera case 4 is also used as a member for actuating the door operating mechanism, the camera 2 of the present invention can be very compact. Since the position of the camera case 4 is monitored, and the film winding motor is driven depending upon whether the light-tightness of the cartridge chamber 26 is maintained or not, it is possible to interrupt photography when the filmstrip 64 seems to be fogged.

Although the present invention has been described with respect to the embodiments shown in the drawings, the present invention is not limited to the above described embodiment but, on the contrary, various modifications of the present invention will be possible to those skilled in the art without departing from the scope of appended claims. For example, the feature of switching over the camera between the photo mode and the sub mode by turning on and off the main switch in cooperation with the movement of the flash projector between the flashing position and the stowed position is applicable to cameras for use with a 135-type photo film cartridge or other type photo film cartridges.

It is also possible to mount a flash projector in a fixed position, and actuate the main switch directly by the sliding movement of the camera case, to switch over between the photo mode and the sub mode. Although the main switch 48 is turned on upon pushing the movable switch contact 48a by the crank arm 45 that rotates with the flash projector 8, it is possible to use a micro switch as the main switch.

Although the camera case should be completely separated from the camera body in the cartridge changing position for loading or unloading the photo film cartridge in the shown embodiments, it is possible to provide a cartridge changing position where the camera case is pulled off from the safety lock position but not separated from the camera body. For this purpose, a cartridge chamber lid should be located such that the lid can open up when the camera case is not completely separated from the camera body, or the camera case should have a cutout in its bottom side edge to allow the bottom lid to open up when the camera case is not completely separated from the camera body.

It is possible to interconnect the camera case with the camera body through chains, or straps. It is also possible to couple the camera case to the camera body through a pin-slot engagement, so that the camera case can be inclined upward after it is slid fully in the uncovering direction. Thereby, the camera case is prevented from being lost or deformed by unnecessary pressure.

In the above embodiment, the camera case is locked in the working position by the first and second locking mechanisms which are unlocked individually, it is alternatively possible to provide a single locking mechanism. The console LCD may be located such that the console LCD 18 is not covered by the camera case in the resting position, so that the number of available frames, the film type of the loaded photo film cartridge, and other information can be seen without the need for sliding the camera case to the working position.

The layout of the battery chamber and the flash projector is not always limited to the shown embodiment, and it is possible to provide a cartridge changing position between the working position and a battery changing position according to the layout of the battery chamber. Also the shape of the camera case is not limited to the rectangular cap-like shape shown in the drawings, but the camera case may have a barrel shape with convex surfaces, or may cover the front and top sides, the front, top and rear sides, or the front, top and bottom sides of the camera body.

What is claimed is:

1. A compact camera comprising:

a camera body having a taking lens and a cartridge chamber for holding a photo film cartridge;

a cartridge chamber lid for opening and closing said cartridge chamber to outside of said camera body;

a flash projector mounted on said camera body to be movable between a stowed position where said flash projector is stowed in a recess formed above said taking lens, and a flashing position where a front face of said flash projector is directed toward a photographic subject, said flash projector being urged to move to said flashing position;

a camera case attached to a camera body and slidable on said camera body between a resting position covering said taking lens, said flash projector and said cartridge chamber lid, a working position uncovering said taking lens and said flash projector but covering said cartridge chamber lid, and a cartridge changing position uncovering said cartridge chamber lid to enable loading or unloading said photo film cartridge;

a first locking mechanism for locking said camera case to stop at said working position while said camera case is moving from said resting position to said cartridge changing position;

a first unlocking mechanism for unlocking said camera case from said first locking mechanism;

a second locking mechanism for locking said camera case to stop at said working position while said camera case is moving from said cartridge changing position to said resting position; and a second unlocking mechanism for unlocking said camera case from said second locking mechanism.

2. A compact camera according to claim 1, wherein said first locking mechanism comprises a first locking claw mounted to be movable into and out of said camera body, said first locking claw being urged to protrude out of said camera body to interlock with a first engaging portion provided in said camera case when said camera case comes to said working position.

3. A compact camera according to claim 2, wherein said second locking mechanism comprises a second locking claw mounted to be movable into and out of said camera body, said second locking claw being urged to protrude out of said camera body to interlock with a second engaging portion provided in said camera case when said camera case comes to said working position.

4. A compact camera according to claim 3, wherein said camera body has a box shape, and said camera case has a cap-like shape with one side open to tightly cover up more than half of said camera body in said resting position.

5. A compact camera according to claim 4, wherein said first and second engaging portions are edges of stepped portions provided on inside of said camera case.

6. A compact camera according to claim 5, wherein at least one of said stepped portions is provided by a plate cemented on the inside of said camera case.

7. A compact camera according to claim 3, wherein at least one of said stepped portions is provided by a slot or a groove formed in the inside of said camera case.

8. A compact camera according to claim 3, wherein said first unlocking mechanism comprises a plate member with a knob, said knob is manually operable to move said plate member to a position actuating said first locking mechanism to move said first locking claw into said camera body.

9. A compact camera according to claim 8, further comprising a battery chamber disposed behind said recess, and an L-shaped battery chamber lid to cover top and rear sides of said battery chamber, wherein said plate member is mounted to inside of said battery chamber lid so as to be slidable in a room between a corner of said L-shaped battery chamber lid and a cylindrical periphery of a battery held in said battery chamber.

10. A compact camera according to claim 9, wherein said knob is exposed through a slot formed along the corner of the L-shaped battery chamber lid so as to be slidable along said slot, said knob does not protrude outward from an obverse surface of said battery chamber lid, so as not to interfere with said camera case.

11. A compact camera according to claim 3, wherein said second unlocking mechanism comprises an interconnection device for interconnecting said second locking claw with said flash projector such that said second locking claw moves into said camera body by pushing said flash projector into said stowed position.

12. A compact camera according to claim 11, wherein said flash projector is rotatable between the flashing position and the stowed position about a rotary shaft that rotates together with said flash projector, and said interconnection device is coupled to said rotary shaft.

13. A camera according to claim 3, wherein said camera case covers at least a part of said battery chamber lid to prevent said battery chamber lid from opening when said camera case is in said working position and in said resting position.

14. A compact camera comprising:
    a camera body having a taking lens and a cartridge chamber for holding a photo film cartridge, said photo film cartridge having a door member to open and close a film exit of said photo film cartridge;
    a cartridge chamber lid for opening and closing said cartridge chamber to outside of said camera body;
    a camera case attached to said camera body and slidable on said camera body between a resting position covering said taking lens and said cartridge chamber lid, a working position uncovering said taking lens but at least partly covering said cartridge chamber lid, and a cartridge changing position uncovering said cartridge chamber lid to enable loading or unloading said photo film cartridge; and
    a door operating mechanism mounted in said camera body and coupled to said door member, said door operating mechanism being urged in a closing direction to close said door member and actuated by said camera case to open said door member when said camera case is moved from said cartridge changing position to said working position.

15. A compact camera according to claim 14, wherein said door operating mechanism comprises:
    a shaft engaged with said door member and rotatable in an opening direction to open said door member and the closing direction to close said door member;
    a door operating lever rotatable together with said shaft, said door operating lever being engaged with said camera case and rotated by said camera case in the opening direction when said camera case is moved from said cartridge changing position to said working position; and
    a spring urging said door operating lever and said shaft to rotate in the closing direction.

16. A compact camera according to claim 14, wherein said door operating mechanism comprises:
    a shaft engaged with said door member and rotatable in an opening direction to open said door member and in the closing direction to close said door member;
    a door operating lever mounted on said shaft and rotatable relative to said shaft, said door operating lever being engaged with said camera case and rotated in the opening direction by said camera case when said camera case is moved from said cartridge changing position to said working position;
    a first spring urging said shaft to rotate in the closing direction;
    a second spring urging said door operating lever to rotate in the closing direction; and
    a transmission member for transmitting rotational movement of said door operating lever to said shaft only in the opening direction.

17. A compact camera according to claim 15, wherein a distal end of said door operating lever protrudes out of said camera body when said camera case is in said cartridge changing position, and said distal end is engaged with an edge of said camera case while said camera case is moving from said cartridge changing position to said working position.

18. A compact camera comprising:
    a camera body having a taking lens and a cartridge chamber for holding a photo film cartridge, said photo film cartridge having a door member to open and close a film exit of said photo film cartridge;
    a cartridge chamber lid for opening and closing said cartridge chamber to outside of said camera body;
    a camera case attached to said camera body and slidable on said camera body between a resting position covering said taking lens and said cartridge chamber lid, a working position uncovering said taking lens but at least partly covering said cartridge chamber lid, and a cartridge changing position uncovering said cartridge chamber lid to enable loading or unloading said photo film cartridge;
    a door operating mechanism mounted in said camera body and coupled to said door member, said door operating mechanism being urged in a closing direction to close said door member and actuated by said camera case to open said door member when said camera case is moved from said cartridge changing position to said working position; and
    a stopping mechanism for stopping said camera case from moving to said cartridge changing position in cooperation with said door operating mechanism if said door member is not closed while said camera case is moving from said working position to said cartridge changing position.

19. A compact camera according to claim 18, wherein said stopping mechanism comprises:
- an engaging portion provided in said camera case;
- a ratchet lever mounted rotatable on said camera body, said ratchet lever being urged to be interlocked with said engaging portion when said camera case comes to a safety lock position located between said working position and said cartridge changing position; and
- an interconnection device interconnecting said ratchet lever with said door operating mechanism such that said ratchet lever is kept interlocked with said engaging portion if said door member is open when said camera case comes to said safety lock position.

20. A compact camera according to claim 19, wherein said door operating mechanism comprises a shaft engaged with said door member and rotatable in an opening direction to open said door member and the closing direction to close said door member; and
- said stopping mechanism comprises an interconnection lever rotatable together with said ratchet lever and a cam member rotatable together with said shaft, said cam member blocking said interconnection lever from rotating in a disengaging direction to disengage said ratchet lever from said engaging portion when said door member is open, and said cam member allowing said interconnection lever to rotate in the disengaging direction when said door member is closed.

21. A compact camera according to claim 20, wherein said interconnection lever pushes said cam member to rotate in the closing direction to close said door member if said door member is slightly opened when said camera case is moved from said working position to said cartridge changing position.

22. A compact camera according to claim 20, wherein said door operating lever may be manually rotated in the opening direction, and after said door operating lever is rotated in the opening direction to open said door member beyond a predetermined angle, said cam member allows said interconnection lever and said ratchet lever to rotate in the disengaging direction, so that said camera case is released from said safety lock position even when said door member is not closed.

23. A compact camera according to claim 19, further comprising:
- a battery chamber provided in said camera body for holding a battery as a power source of the camera; and
- a battery chamber lid provided for opening and closing said battery chamber to the outside of said camera body, wherein said camera case at least partly covers said battery chamber lid in said working position and uncovers said battery chamber lid at said safety lock position, whereas said camera case at least partly covers said cartridge chamber lid at said safety lock position.

24. A compact camera according to claim 20, wherein said door operating mechanism further comprises:
- a door operating lever rotatable together with said shaft, said door operating lever being engaged with said camera case and rotated by said camera case in the opening direction when said camera case is moved from said cartridge changing position to said working position; and
- a spring urging said door operating lever and said shaft to rotate in the closing direction.

25. A compact camera according to claim 20, wherein said door operating mechanism further comprises:
- a door operating lever mounted on said shaft and rotatable relative to said shaft, said door operating lever being engaged with said camera case and rotated in the opening direction by said camera case when said camera case is moved from said cartridge changing position to said working position;
- a first spring urging said shaft to rotate in the closing direction;
- a second spring urging said door operating lever to rotate in the closing direction; and
- a transmission member for transmitting rotational movement of said door operating lever to said shaft only in the opening direction.

26. A compact camera according to claim 24, wherein said cam member is formed integrally with said door operating lever.

27. A compact camera according to claim 25, wherein said cam member is formed integrally with said transmission member.

28. A compact camera comprising:
- a box-shaped camera body having a taking lens and a cartridge chamber for holding a photo film cartridge, said photo film cartridge having a door member to open and close a film exit of said photo film cartridge;
- a cartridge chamber lid for opening and closing said cartridge chamber to outside of said camera body;
- a cap-like camera case attached to said camera body, said camera case tightly covering up more than half of said camera body in a resting position and slidable on said camera body from said resting position to a cartridge changing position uncovering said cartridge chamber lid to enable loading or unloading said photo film cartridge;
- a door operating mechanism mounted in said camera body and coupled to said door member, said door operating mechanism being urged in a closing direction to close said door member and actuated by said camera case to open said door member when said camera case is moved from said cartridge changing position to said resting position; and
- a stopping mechanism for stopping said camera case from moving to said cartridge changing position in cooperation with said door operating mechanism if said door member is not closed while said camera case is moving from said resting position to said cartridge changing position.

29. A compact camera according to claim 28, wherein said door operating mechanism comprises a door operating lever whose distal end protrudes out of said camera body when said camera case is in said cartridge changing position, said distal end being pushed by an edge of said open side of said camera case to rotate said door operating lever in an opening direction to open said door member when said camera case is moved from said cartridge changing position to said resting position.

30. A compact camera according to claim 28, wherein said stopping mechanism comprises:
- an engaging portion provided on inside of a top wall of said camera case;
- a ratchet lever mounted rotatable on a top wall of said camera body, said ratchet lever being urged to be interlocked with said engaging portion when said camera case comes to a safety lock position where said cartridge chamber lid is at least partly covered with said camera case; and an interconnection device interconnecting said ratchet lever with said door operating mechanism such that said ratchet lever is kept interlocked with said engaging portion if said door member is open when said camera case comes to said safety lock position.

31. A compact camera according to claim 30, wherein when said camera case comes to said resting position and said door operating lever is rotated in the opening direction to open said door member beyond a predetermined angle, said interconnection device allows said ratchet lever to rotate in a direction to remove away from said engaging portion.

32. A compact camera according to claim 31, further comprising a second engaging portion provided on the inside of the top wall of said camera case, said second engaging portion being engaged with said ratchet lever when said camera case comes to said resting position, thereby holding said camera case in said resting position.

33. A compact camera according to claim 32, wherein said engaging portions are provided by a locking plate that is cemented on the inside of the top wall of said camera case.

34. A compact camera according to claim 33, further comprising:
- a first locking mechanism for locking said camera case to stop at a working position uncovering said taking lens but at least partly covering said cartridge chamber lid, while said camera case is moving from said resting position to said cartridge exchanging position;
- a first unlocking mechanism for unlocking said camera case from said first locking mechanism;
- a second locking mechanism for locking said camera case to stop at said working position while said camera case is moving from said cartridge exchanging position to said resting position; and
- a second unlocking mechanism for unlocking said camera case from said second locking mechanism.

35. A compact camera according to claim 34, wherein said first and second locking mechanisms respectively comprise first and second locking claws mounted to be movable into and out of said camera body through slots formed through the top wall of said camera body, said first and second locking claws being urged to protrude out of said camera body to interlock respectively with edges of stepped portions provided by said locking plate when said camera case comes to said working position.

36. A compact camera according to claim 35, further comprising:
- a shutter switch provided in said camera body and accessible through a hole formed through the top wall of said camera body; and
- a shutter button mounted on a free end of a resilient blade whose opposite end is secured to the inside of the top wall of said camera case such that said shutter button may be resiliently pressed into said camera case, said resilient blade being formed as a part of said locking plate.

* * * * *